United States Patent
Lee et al.

(10) Patent No.: US 10,466,830 B2
(45) Date of Patent: Nov. 5, 2019

(54) ELECTRONIC DEVICE AND METHOD OF CONTROLLING ELECTRONIC DEVICE

(71) Applicant: Samsung Electronics Co., Ltd., Gyeonggi-do (KR)

(72) Inventors: Yo-Han Lee, Gyeonggi-do (KR); Han-Vit Kang, Gyeonggi-do (KR); Geon-Soo Kim, Gyeonggi-do (KR); Bo-Kun Choi, Seoul (KR); Doo-Suk Kang, Gyeonggi-do (KR); Kyu-Hong Kim, Gyeonggi-do (KR); So-Young Kim, Gyeonggi-do (KR); Seung-Min Choi, Gyeonggi-do (KR); Yong-Joon Jeon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 54 days.

(21) Appl. No.: 15/701,048

(22) Filed: Sep. 11, 2017

(65) Prior Publication Data
US 2018/0074636 A1    Mar. 15, 2018

(30) Foreign Application Priority Data
Sep. 9, 2016 (KR) .................. 10-2016-0116794

(51) Int. Cl.
*G06F 3/041* (2006.01)
*G06F 3/0481* (2013.01)
(Continued)

(52) U.S. Cl.
CPC .......... *G06F 3/0414* (2013.01); *G06F 1/1626* (2013.01); *G06F 3/0481* (2013.01);
(Continued)

(58) Field of Classification Search
CPC ......... H04M 1/72519; H04M 2250/12; H04M 2250/22; G06F 3/0414; G06F 1/1626;
(Continued)

(56) References Cited

U.S. PATENT DOCUMENTS

| 9,024,870 B2 * | 5/2015 | Kim | G06F 1/1626 345/156 |
| 9,304,621 B1 * | 4/2016 | Wakim | G06F 1/1692 |

(Continued)

FOREIGN PATENT DOCUMENTS

| EP | 2 725 472 | 4/2014 |
| KR | 10-2011-0031797 | 3/2011 |

(Continued)

OTHER PUBLICATIONS

European Search Report dated Jan. 3, 2018 issued in counterpart application No. 17190229.9-1879, 8 pages.

*Primary Examiner* — Julie Anne Watko
(74) *Attorney, Agent, or Firm* — The Farrell Law Firm, P.C.

(57) ABSTRACT

An electronic device, a method of controlling an electronic device, and a non-transitory computer-readable recording medium are provided. The electronic device includes a housing including a first surface, a second surface, and lateral sides; a touch screen display; a pressure sensor; a wireless communication circuit; at least one processor electrically, and the wireless communication circuit; and a memory electrically, wherein the memory stores instructions to cause the at least one processor to display a first user interface (UI) including at least one first item on the touch screen display, display a second UI including at least one second item while controlling or not controlling the first UI, and remove the second UI while reconstructing the first UI to restore a state before the controlling of the first UI or not reconstructing the first UI.

17 Claims, 46 Drawing Sheets

(51) Int. Cl.
  *G06F 3/0485* (2013.01)
  *H04M 1/725* (2006.01)
  *G06F 1/16* (2006.01)
  *G06F 3/0488* (2013.01)
  *G06F 3/0484* (2013.01)
  *G06F 3/0482* (2013.01)

(52) U.S. Cl.
  CPC .......... *G06F 3/0485* (2013.01); *G06F 3/0488* (2013.01); *G06F 3/04886* (2013.01); *H04M 1/72519* (2013.01); *G06F 3/0482* (2013.01); *G06F 3/04817* (2013.01); *G06F 3/04845* (2013.01); *G06F 2200/1636* (2013.01); *G06F 2203/04105* (2013.01); *H04M 2250/12* (2013.01); *H04M 2250/22* (2013.01)

(58) Field of Classification Search
  CPC .. G06F 3/0481; G06F 3/0488; G06F 3/04817; G06F 3/0482; G06F 3/04845; G06F 3/0485; G06F 2200/1636; G06F 2203/04105; G06F 3/04886
  See application file for complete search history.

(56) References Cited

U.S. PATENT DOCUMENTS

| | | | | |
|---|---|---|---|---|
| 9,652,133 | B2* | 5/2017 | Gwak | G06F 3/0416 |
| 9,785,272 | B1* | 10/2017 | Rosenberg | G06F 3/0414 |
| 9,983,742 | B2* | 5/2018 | King | G06F 1/1626 |
| 2010/0085317 | A1* | 4/2010 | Park | G06F 1/1626 |
| | | | | 345/173 |
| 2010/0283737 | A1* | 11/2010 | Miyazawa | G06F 3/0488 |
| | | | | 345/168 |
| 2011/0069024 | A1 | 3/2011 | Kim | |
| 2011/0163984 | A1* | 7/2011 | Aono | G06F 3/016 |
| | | | | 345/173 |
| 2011/0167391 | A1* | 7/2011 | Momeyer | G06F 1/1684 |
| | | | | 715/863 |
| 2011/0169765 | A1* | 7/2011 | Aono | G06F 3/016 |
| | | | | 345/173 |
| 2011/0181538 | A1* | 7/2011 | Aono | G06F 3/016 |
| | | | | 345/173 |
| 2011/0181539 | A1* | 7/2011 | Aono | G06F 3/0414 |
| | | | | 345/173 |
| 2012/0162114 | A1* | 6/2012 | Inoue | G06F 3/016 |
| | | | | 345/173 |
| 2013/0222338 | A1* | 8/2013 | Gim | G06F 3/041 |
| | | | | 345/174 |
| 2014/0204063 | A1* | 7/2014 | Kaida | G06F 1/169 |
| | | | | 345/184 |
| 2014/0317722 | A1 | 10/2014 | Tartz et al. | |
| 2015/0130742 | A1* | 5/2015 | Chen | G06F 3/044 |
| | | | | 345/174 |
| 2015/0138141 | A1* | 5/2015 | Huang | G06F 1/1626 |
| | | | | 345/174 |
| 2016/0026316 | A1* | 1/2016 | Choi | G06F 1/3231 |
| | | | | 345/173 |
| 2016/0034131 | A1* | 2/2016 | Kosaka | G06F 3/0488 |
| | | | | 715/765 |
| 2016/0253041 | A1* | 9/2016 | Park | G06F 3/0418 |
| | | | | 345/174 |
| 2018/0088793 | A1* | 3/2018 | Abdollahian | G06F 3/0483 |
| 2018/0164942 | A1* | 6/2018 | Huffman | G06F 1/3203 |
| 2018/0335936 | A1* | 11/2018 | Missig | G06F 3/02 |
| 2018/0336043 | A1* | 11/2018 | Walkin | G06F 9/451 |
| 2019/0050128 | A1* | 2/2019 | Lee | G06F 3/0487 |

FOREIGN PATENT DOCUMENTS

| | | |
|---|---|---|
| KR | 10-2013-0134782 | 12/2013 |
| KR | 10-2015-0069210 | 6/2015 |
| KR | 10-2015-0143671 | 12/2015 |

* cited by examiner

| System | explanation | AP | Power Circuits | Display | Input Controller |
|---|---|---|---|---|---|
| Off | no power supply | Off | Off | Off | Low Power |
| Sleep | sleep mode | Sleep | Active | Off | Active |
| Idle | no input for predetermined time | Active | Active | Active | Active |
| Active | processing corresponding to input | Active | Active | Active | Active |

FIG.7

ELECTRONIC DEVICE AND METHOD OF CONTROLLING ELECTRONIC DEVICE

PRIORITY

This application claims priority under 35 U.S.C. § 119(a) to a Korean Patent Application filed on Sep. 9, 2016 in the Korean Intellectual Property Office and assigned Serial No. 10-2016-0116794, the entire content of which is incorporated herein by reference.

BACKGROUND

1. Field of the Disclosure

The present disclosure relates generally to an electronic device and a method of controlling an electronic device for controlling the operation of the electronic device through a pressure input, and more particularly, to an electronic device and a method of controlling an electronic device capable of accurately determining a time and a control intention of a user gripping the electronic device based on pressure input.

2. Description of the Related Art

With the development of electronic technology, various types of electronic goods have been developed and supplied. Recently, the supply of portable electronic devices having various functions such as smart phones or tablet personal computers (PCs) has increased. Currently, an effort is underway to provide various services in electronic devices using a user's pressure input as well as a touch input.

An electronic device may recognize a manner in which a user grips a terminal, that is, a grip state, and as a result of the recognition, may perform a particular function or switch to a particular use environment. A grip operation for using an electronic device by a user may be performed regardless of a user's specific intention, but may occur in various forms depending on the user's tendency or usage habit. Since it is difficult to determine an intention associated with a grip operation, it is difficult to identify a situation corresponding to a user's intention.

SUMMARY

An aspect of the present disclosure is to grasp an intention of a user gripping an electronic device. Accordingly, the present disclosure provides an electronic device and a method of controlling an electronic device capable of accurately determining a time point and a control intention of the user performing the grip based on pressure input.

In accordance with an aspect of the present disclosure, an electronic device is provided. The electronic device includes a housing including a first surface facing a first direction, a second surface facing a direction opposite the first direction, and lateral sides surrounding a space between the first surface and the second surface; a touch screen display exposed through the first surface between the first surface and the second surface; a pressure sensor configured to detect at least one of a level and/or a position of pressure by an external object within a predetermined distance to at least two areas facing each other on the lateral sides; a wireless communication circuit; at least one processor electrically connected to the touch screen display, the pressure sensor, and the wireless communication circuit; and a memory electrically connected to the at least one processor and configured to store at least one application program, wherein the memory stores instructions, when executed, to cause the at least one processor to display a first user interface (UI) including at least one first item on the touch screen display, to detect at least one of the level and the position of the pressure by the external object through the pressure sensor, display a second UI including at least one second item at least partially based on at least one of the detected level and position while controlling or not controlling the first UI, and to remove the second UI while reconstructing the first UI to restore the state before the controlling of the first UI or not reconstructing the first UI at least partially based on a change in at least one of the detected level and the position.

In accordance with another aspect of the present disclosure, a method of controlling an electronic device is provided. The method includes displaying a first UI including at least one first item on a display of the electronic device; detecting at least one of a level and a position of pressure by an external object through at least one pressure sensor; displaying a second UI including at least one second item at least partially based on at least one of the detected level and position while controlling or not controlling the first UI; and displaying the first UI in a state before the controlling of the first UI at least partially based on a change in at least one of the detected level and the position and removing the second UI.

In accordance with another aspect of the present disclosure, a non-transitory computer-readable recording medium having programs recorded therein to be executed on a computer is provided. The programs include executable instructions, when executed by a processor, to cause the processor to display a first UI including at least one item on a display, and when a first pressure signal detected by at least one pressure sensor is received, display at least a part of a second UI including at least one second item and the first UI on the display.

BRIEF DESCRIPTION OF THE DRAWINGS

The above and other aspects, features, and advantages of the present disclosure will be more apparent from the following detailed description, taken in conjunction with the accompanying drawings, in which:

FIG. 7 is a chart of operational states of an electronic device according to an embodiment of the present disclosure;

DETAILED DESCRIPTION OF EMBODIMENTS OF THE PRESENT DISCLOSURE

Figure 1:
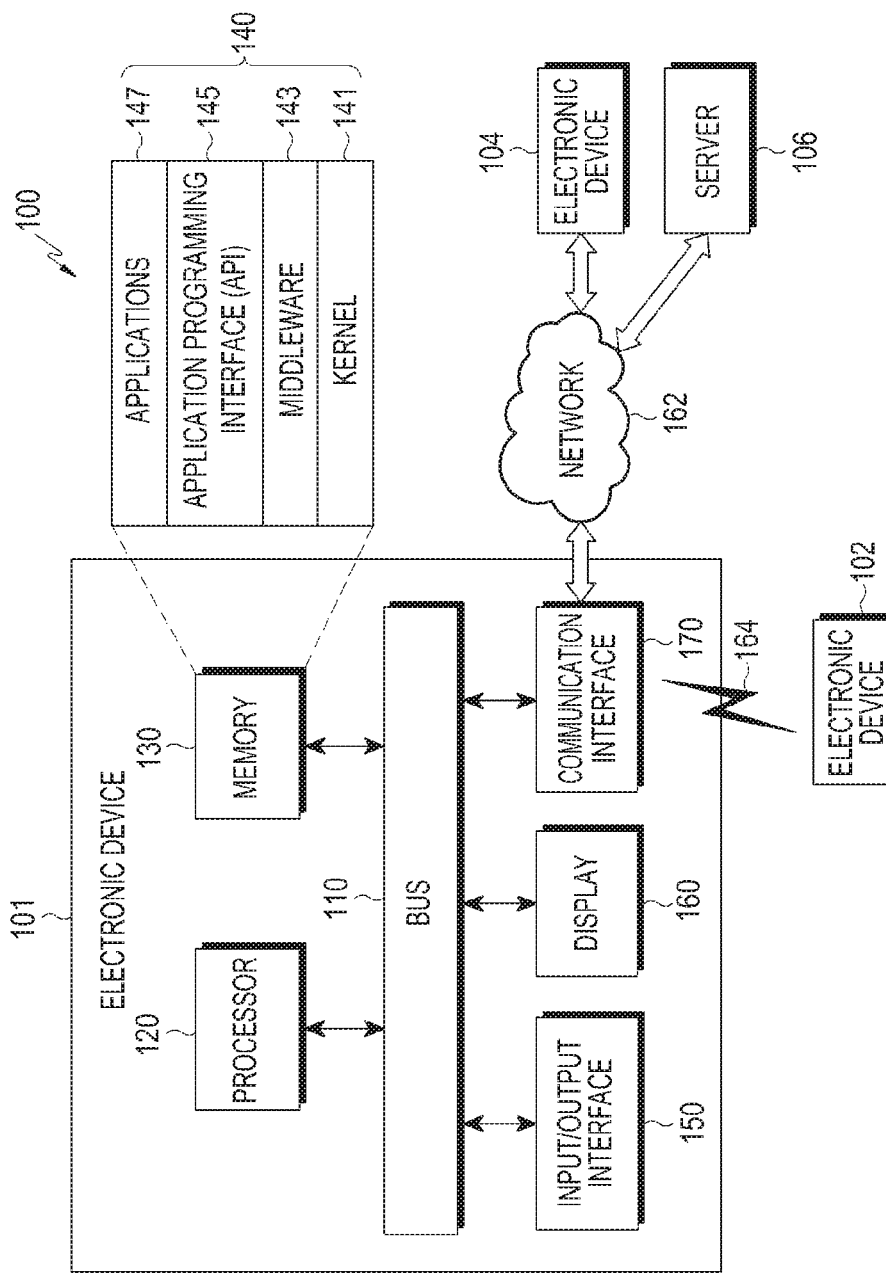
FIG. 1 is a block diagram of a network environment according to an embodiment of the present disclosure.

Hereinafter, various embodiments of the present disclosure are described with reference to the accompanying drawings. The embodiments of the present disclosure and the terms used herein are not intended to limit the present disclosure, but should be understood to include various modifications, equivalents, and/or alternatives to the present disclosure. In describing the accompanying drawings, similar reference numerals may be used to designate similar elements. A singular expression may include a plural expression unless they are definitely different in a context. As used herein, singular forms may include plural forms as well unless the context clearly indicates otherwise. The expressions "a first", "a second", "the first", and "the second" used in the present disclosure may modify various components regardless of the order and/or the importance but do not limit the corresponding components. When an element (e.g., a first element) is referred to as being "(functionally or communicatively) connected," or "directly coupled" to another element (e.g., a second element), the element may be connected directly to the other element or connected to the other element through yet another element (e.g., a third element).

The expression "configured to" as used in the present disclosure may be interchangeably used with, for example, "suitable for", "having the capacity to", "designed to", "adapted to", "made to", and "capable of" in terms of hardware or software, according to the circumstances. Alternatively, in some situations, the expression "device configured to" may indicate that the device, together with other devices or components, "is able to". For example, the expression "processor adapted (or configured) to perform A, B, and C" may indicate a dedicated processor (e.g., an embedded processor) only for performing the corresponding operations or a general-purpose processor (e.g., a central processing unit (CPU) or an application processor (AP)) that can perform the corresponding operations by executing one or more software programs stored in a memory device.

An electronic device according to an embodiment of the present disclosure may include at least one of, for example, a smart phone, a tablet PC, a mobile phone, a video phone, an electronic book reader (e-book reader), a desktop PC, a laptop PC, a netbook computer, a workstation, a server, a personal digital assistant (PDA), a portable multimedia player (PMP), a moving picture experts group (MPEG-1) audio layer-3 (MP3) player, a mobile medical device, a camera, and a wearable device. The wearable device may include at least one of an accessory type (e.g., a watch, a ring, a bracelet, an anklet, a necklace, glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). The electronic device may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV™), a game console (e.g., Xbox® and PlayStation®), an electronic dictionary, an electronic key, a camcorder, and an electronic photo frame.

In an embodiment of the present disclosure, an electronic device may include at least one of various medical devices (e.g., various portable medical measuring devices (e.g., a blood glucose monitoring device, a heart rate monitoring device, a blood pressure measuring device, a body temperature measuring device, etc.), a magnetic resonance angiography (MRA) device, a magnetic resonance imaging (MRI) device, a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automated teller machine (ATM) in banks, a point of sales (POS) device in a shop, and an Internet of things (IoT) device (e.g., a light bulb, various sensors, an electric or gas meter, a sprinkler device, a fire alarm, a thermostat, a streetlamp, a toaster, sporting goods, a hot water tank, a heater, a boiler, etc.). An electronic device may include at least one of a part of furniture or a building/structure, an electronic board, an electronic signature receiving device, a projector, and various types of measuring instruments (e.g., a water meter, an electric meter, a gas meter, a radio wave meter, and the like). An electronic device may be flexible, or may be a combination of one or more of the aforementioned various devices. An electronic device is not limited to the above described devices. In the present disclosure, the term "user" may indicate a person using an electronic device or a device (e.g., an artificial intelligence electronic device) using an electronic device.

FIG. 1 is a block diagram of an electronic device 101 within a network environment 100 according to an embodiment of the present disclosure.

Referring to FIG. 1, the electronic device 101 may include a bus 110, a processor 120, a memory 130, an input/output interface 150, a display 160, and a communication circuit 170. In an embodiment of the present disclosure, the electronic device 101 may omit at least one of the elements 110 to 170, or may further include other elements. The bus 110 may include, for example, a circuit that interconnects the elements 110 to 170 and transfers communication (for example, control messages and/or data) between the elements 110 to 170. The processor 120 may include one or more of a CPU, an AP, and a communication processor (CP). The processor 120, for example, may carry out operations or data processing relating to the control and/or communication of at least one other element 110 to 170 of the electronic device 101.

The memory 130 may include volatile and/or non-volatile memory. The memory 130 may store, for example, instructions or data relevant to at least one other element 110 to 170 of the electronic device 101. According to an embodiment of the present disclosure, the memory 130 may store software and/or a program 140. The program 140 may include, for example, a kernel 141, middleware 143, an application programming interface (API) 145, and/or application programs (or "applications") 147. At least a part of the kernel 141, the middleware 143, or the API 145 may be referred to as an operating system (OS). The kernel 141 may control or manage system resources (for example, the bus 110, the processor 120, or the memory 130) used for executing an operation or function implemented by other programs (for example, the middleware 143, the API 145, or the application programs 147). Furthermore, the kernel 141 may provide an interface through which the middleware 143, the API 145, or the application programs 147 may access the individual elements of the electronic device 101 to control or manage system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priorities for using the system resources (for example, the bus 110, the processor 120, the memory 130, or the like) of the electronic device 101 to one or more of the application programs 147, and may process the one or more task requests. The API 145 is an interface used by the application programs 147 to control a function provided from the kernel 141 or the middleware 143, and may include, for example, at least one interface or function (for example, an instruction) for file control, window control, image processing, character control, or the like. For example, the input/output interface 150 may forward instructions or data, input from a user or an external device, to the other element(s) of the electronic device 101, or may output instructions or data, received from the other element(s) of the electronic device 101, to the user or the external device.

The display 160 may include, for example, a liquid crystal display (LCD), a light-emitting diode (LED) display, an organic LED (OLED) display, a micro electromechanical system (MEMS) display, or an electronic paper display. The display 160 may display, for example, various types of content (e.g., text, images, videos, icons, and/or symbols) for a user. The display 160 may include a touch screen and may receive, for example, a touch input, a gesture input, a proximity input, or a hovering input using an electronic pen or a part of a user's body. The communication interface 170 may establish communication, for example, between the electronic device 101 and an external device (for example, a first external electronic device 102, a second external electronic device 104, or a server 106). For example, the communication interface 170 may be connected to a network 162 through wireless or wired communication to communicate with the second external electronic device 104 or the server 106.

The wireless communication may include, for example, cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), or the like. According to an embodiment of the present disclosure, wireless communication may include, for example, at least one of wireless fidelity (WiFi), Bluetooth (BT), BT low energy (BLE), ZigBee, near field communication (NFC), magnetic secure transmission (MST), radio frequency (RF), and body area network (BAN). Wired communication may include global navigation satellite system (GNSS). GNSS may be, for example, a GPS, a global navigation satellite system (Glonass), a Beidou navigation satellite system (Beidou), or the European global satellite-based navigation system (Galileo). Hereinafter, the term "GPS" may be used interchangeably with the term "GNSS". Wired communication may include, for example, at least one of a universal serial bus (USB), a high-definition multimedia interface (HDMI), recommended standard 232 (RS-232), and a plain old telephone service (POTS). The network 162 may include a telecommunications network, for example, at least one of a computer network (for example, a local area network (LAN) or a wide area network (WAN)), the Internet, and a telephone network.

Each of the first and second external electronic devices 102 and 104 may be of the same or a different type from the electronic device 101. According to an embodiment of the present disclosure, all or some of the operations executed in the electronic device 101 may be executed in the electronic devices 102 and 104 or the server 106. When the electronic device 101 must perform some functions or services automatically or in response to a request, the electronic device 101 may make a request for performing at least some functions relating thereto to the electronic device 102, the electronic device 104, or the server 106 additionally or instead of performing the functions or services by itself. The electronic device 102, the electronic device 104, or the server 106 may execute the requested functions or the additional functions, and may deliver the execution result to the electronic device 101. The electronic device 101 may process the received result as is or, additionally, may provide the requested function or service. To this end, for example, cloud computing, distributed computing, or client-server computing technology may be used.

Figure 2A:
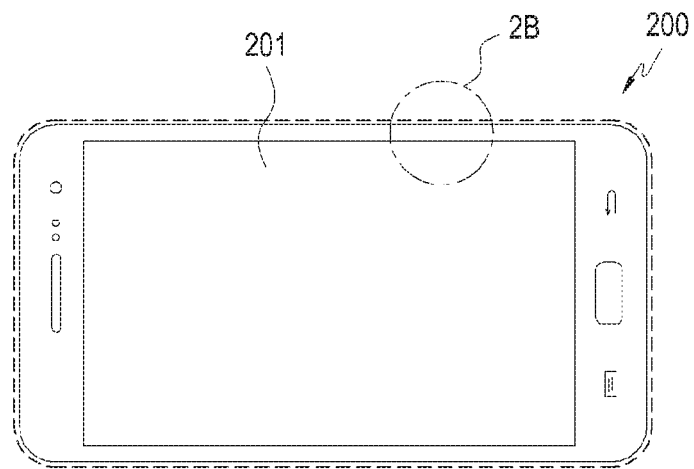
FIGS. 2A and 2B are illustrations of an electronic device according to an embodiment of the present disclosure.
Figure 2B:
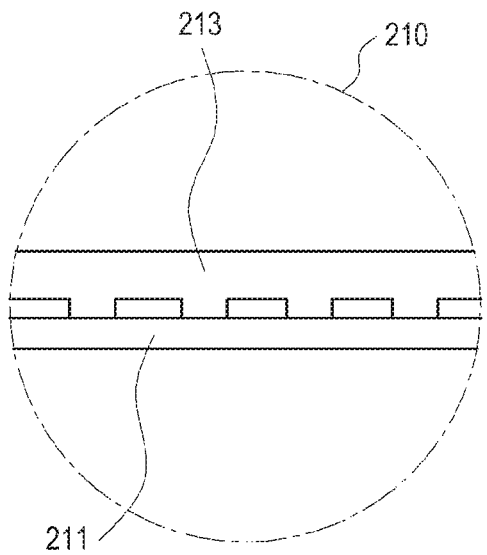
Figure 3A:
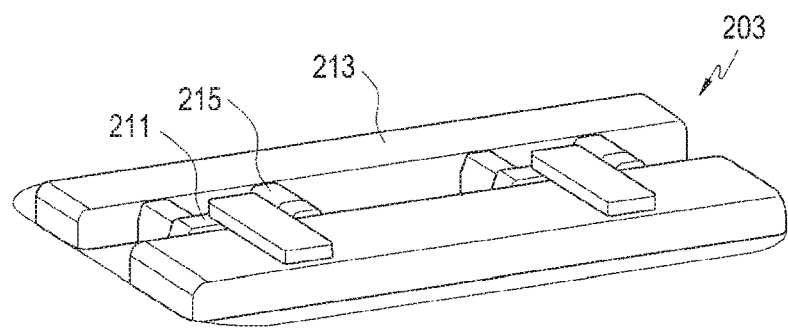
FIGS. 3AA, 3AB, 3BA, 3BB, 3CA, 3CB, 3DA, 3DB, 3EA, and 3EB are illustrations of at least one pressure sensor of an electronic device according to an embodiment of the present disclosure.
Figure 3A:
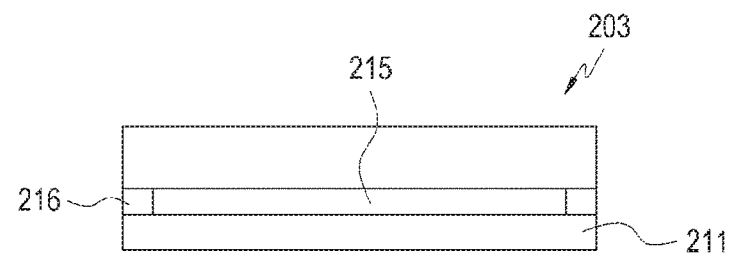

FIGS. 2A, 2B, 3AA, 3AB, 3BA, 3BB, 3CA, 3CB, 3DA, 3DB, 3EA, and 3EB are illustrations of at least one pressure sensor of an electronic device according to an embodiment of the present disclosure.

Referring to FIGS. 2A, 2B, 3AA, and 3AB, an electronic device 200 may include a first surface facing a first direction, a second surface facing a direction opposite the first direction, a housing 213 including lateral sides surrounding a space between the first surface and the second surface, and a touch screen display exposed through the first surface between the first surface and the second surface.

The electronic device may be equipped with a sensor module 203 including a pressure sensor 211 to detect at least one of a level and/or a position of pressure of an external object near at least two areas actually facing each other on the lateral sides of the housing 213.

The sensor module 203 may be arranged according to a grip type on at least one of left, right, upper, and lower lateral sides based on the first surface through which the display 201 is exposed. According to an embodiment of the present disclosure, the electronic device 200 may dispose one or more sensors 211 (for example, pressure sensors) in areas of the housing 213 at positions that a user's fingers grip, that is, positions at which the fingers make contact.

According to an embodiment of the present disclosure, the sensor module 203 may be implemented in various forms, as illustrated in FIGS. 3AA to 3EB, and at least one sensor 211 (for example, a pressure sensor) may be disposed in a lower area of the housing 213 (for example, at least one of a metal housing, a plastic housing, and a glass housing). The sensor module 203 may be configured by applying a capacitive sensor that senses a capacitance between a metal housing and an electrode or an inductive sensor that detects a current induced by a metal housing and a coil. When the housing is non-conductive, a conductive material acting as an electrode may be configured to be physically close to or adhered to the inside of the housing.

Referring to FIG. 3AA, according to an embodiment of the present disclosure, the sensor module 203 may form an empty space 215 between the sensor 211 and the housing 213 to precisely measure an intensity of pressure applied by a user's finger, and may arrange a support member 216 for supporting the housing 213 in a direction facing the housing 213 in order to form the empty space 215. The support member 216 may be disposed to form the empty space 215 in, for example, left and right areas on the sensor 211.

Figure 3B:
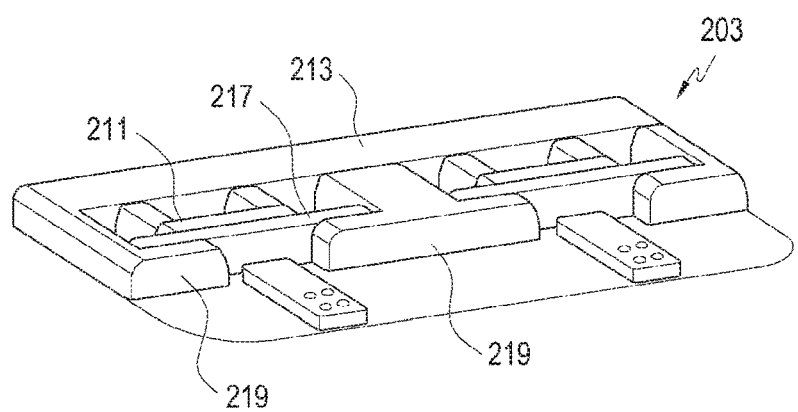
Figure 3B:
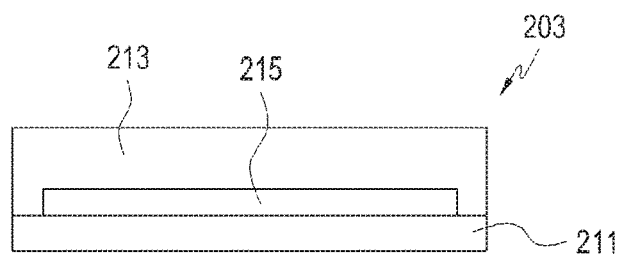

Referring to FIGS. 3BA and 3BB, according to an embodiment of the present disclosure, in order to form the empty space 215 between the sensor 211 and the housing 213, the sensor module 203 may configure an area, which is in contact with the sensor 211, by extending parts of left and right areas of the housing 213 in a direction facing the housing 213. The sensor module 203 may further include a reinforcement member 217 (for example, a stiffener) for stiffening the sensor 211 and a support part 219 located in a direction opposite the direction facing the housing 213.

Figure 3C:
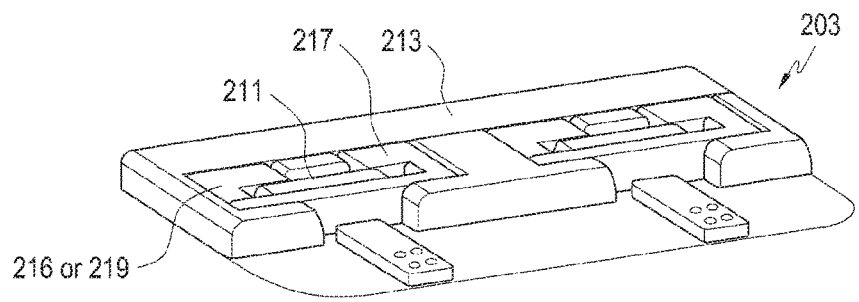
Figure 3C:
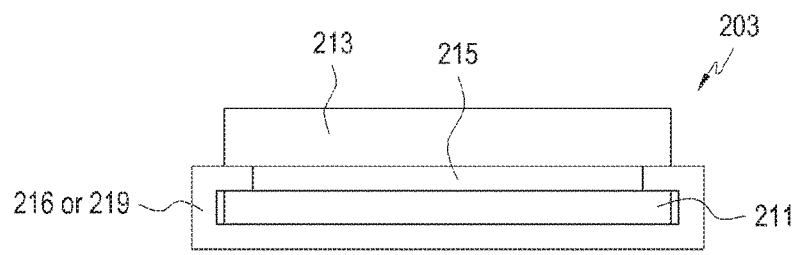

Referring to FIGS. 3CA and 3CB, according to an embodiment of the present disclosure, the sensor module 203 may include the support member 216 or the reinforcement member 217 configured in a form to seat the sensor 211. In this case, the support member 216 or the reinforcement member 217 may have an extension protrusion for supporting the housing 213 at the edge thereof, and may have a concave opening for seating the sensor 211 in an inner area of the extended protrusion. As the sensor 211 is seated in the support member 216 and the reinforcement member 217, and as the housing 213 is disposed on an upper area of the protrusion of the support member 216 and the reinforcement member 217, and is supported thereby, the sensor module 203 may form the space 215 between the sensor 211 and the housing 213.

Figure 3D:
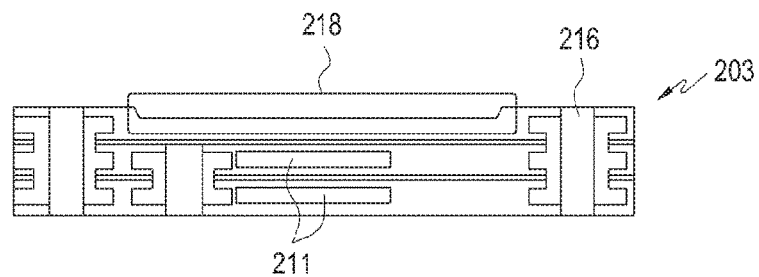
Figure 3D:
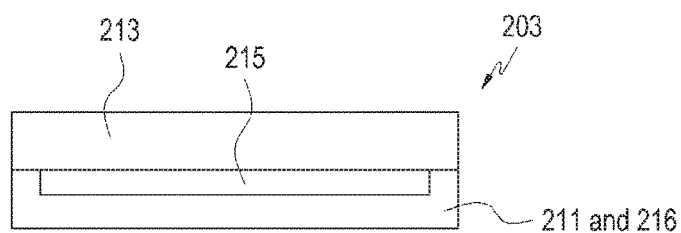

Referring to FIGS. 3DA and 3DB, according to an embodiment of the present disclosure, the sensor module 203 may be integrated with the support member 216 and the sensor 211. In this case, the sensor 211 may include at least one sensor coil, and the at least one sensor coil may be included within the support member 216. The support member 216 may have an opening 218 (copper cutout) formed in the part of an upper area on which the housing 215 is disposed. Accordingly, when the housing 215 is disposed on the upper area of the support member 216, the space 215 may be formed between the sensor 211 and the housing 215.

Figure 3E:
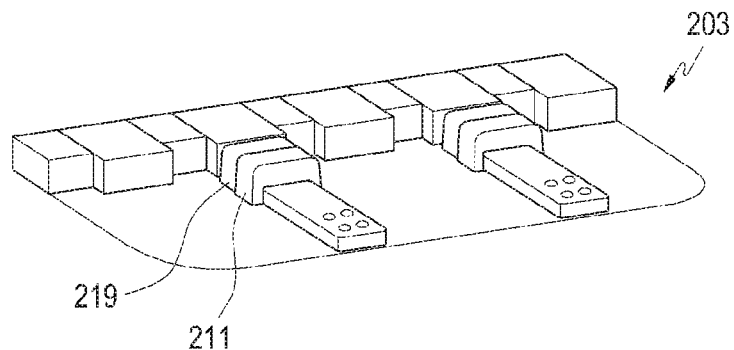
Figure 3E:
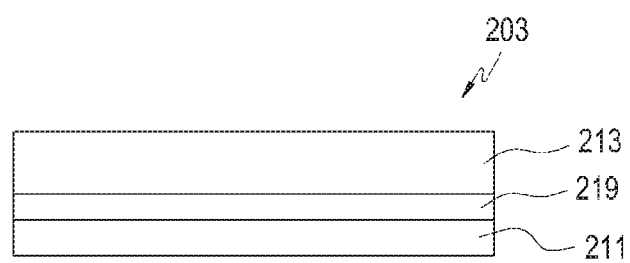

Referring to FIGS. 3EA and 3EB, according to an embodiment of the present disclosure, the sensor module 203 may include the sensor 211 that is adhered to the housing 215 by an adhesive 219. The sensor module 203 may detect a pressure signal according to a pressure level using a strain gauge or in a capacitive manner.

Figure 4A:
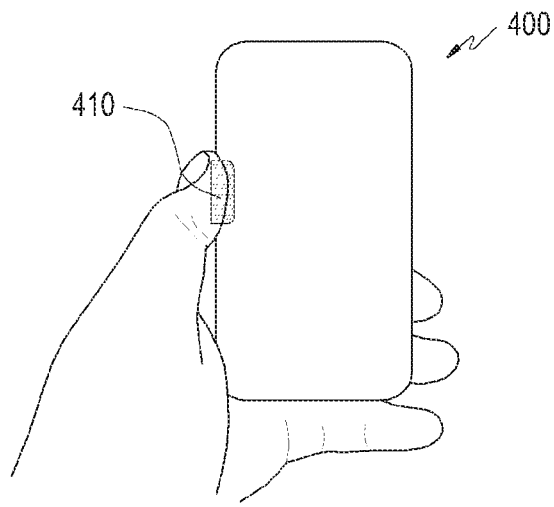
FIGS. 4A and 4B are illustrations of an electronic device according to an embodiment of the present disclosure.
Figure 4B:
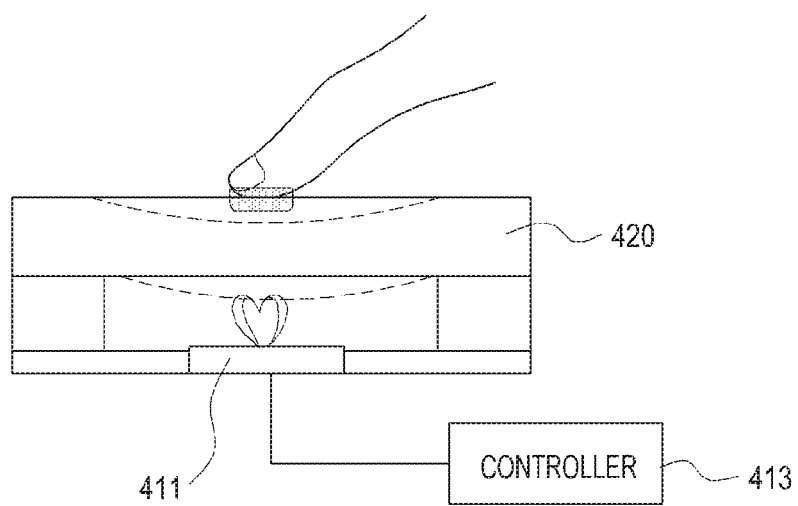

FIGS. 4A and 4B are illustrations of an electronic device 400 according to an embodiment of the present disclosure.

Referring to FIG. 4A, the electronic device 400 may detect pressure applied by a user's finger through a sensor module 410 including at least one sensor (for example, a pressure sensor) disposed in one area of a housing.

Referring to FIG. 4B, when a user's finger comes in contact with the housing 420 to apply pressure, a controller 413 of the electronic device 400 may receive a signal detected by a pressure sensor 411 according to the applied pressure and identify the applied pressure level or pressure intensity based on the received signal.

Further, according to an embodiment of the present disclosure, a sensor module (for example, the sensor module 203 of FIG. 3A) including the sensor 411 may be configured by applying a capacitive sensor that senses capacitance between a metal housing and an electrode or an inductive sensor that senses a current induced by the metal housing and a coil.

Figure 5A:
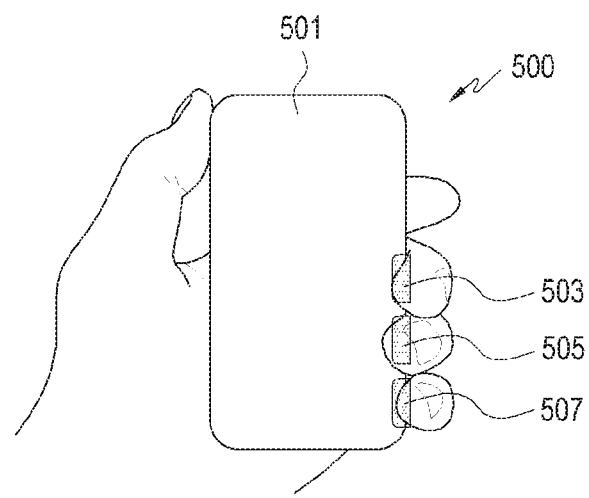
FIGS. 5A, 5B, and 5C are illustrations of a grip type of an electronic device according to an embodiment of the present disclosure.
Figure 5B:
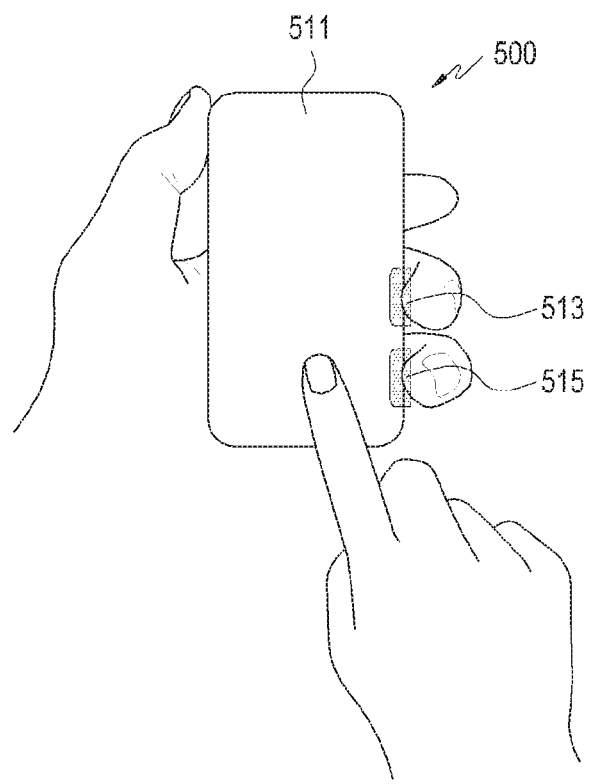

FIGS. 5A and 5B are illustrations of an electronic device 500 that detects a grip according to an embodiment of the present disclosure.

Referring to FIG. 5A, the electronic device 500 may identify a grip by an external medium (for example, a user's hand) through a pressure sensor or a touch sensor installed in each of multiple areas 501, 503, 505, and 507 on the right side of a housing. Alternatively, a pressure sensor or a touch sensor may be installed on the left side of the housing. In this case, the electronic device 500 may detect pressure applied by a user's finger in contact with at least one area (at least one of the areas 501, 503, 505, and 507) in which a pressure sensor, among the installed sensors, is installed. The electronic device 500 may include one of the sensor modules 203 illustrated in FIGS. 3AA to 3EB, which is installed in at least one of the areas 501, 503, 505, and 507 at which a grip is detected.

Referring to FIG. 5B, the electronic device 500 may have at least one of the sensor modules (i.e., sensor modules 203 illustrated in FIGS. 3AA to 3EB), which is installed in areas 511, 513, and 515 of the left and right sides of the housing and in at least one area of a touch screen of a display. The electronic device 500 may identify a grip of a user's fingers through each of the installed pressure sensor or touch sensor.

Figure 5C:
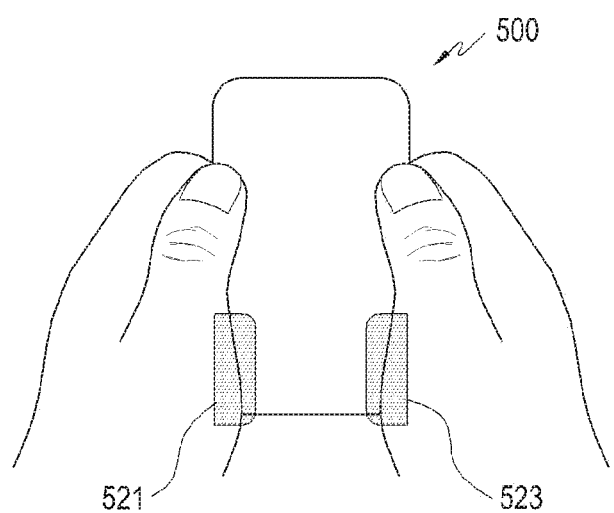

Referring to FIG. 5C, the electronic device 500 may have one of the sensor modules (i.e., sensor modules 203 illustrated in FIGS. 3AA to 3EB), which is installed in areas 521 and 523 of the left and right sides of the housing. The electronic device 500 may identify a grip of the user's hand or fingers through each of the installed sensors (for example, the pressure sensor and the touch sensor). According to an embodiment of the present disclosure, the electronic device 500 may detect pressure of a user's hand (for example, a palm of a hand) in contact with at least one area (521 and/or 523) in which a pressure sensor is installed.

Figure 6:
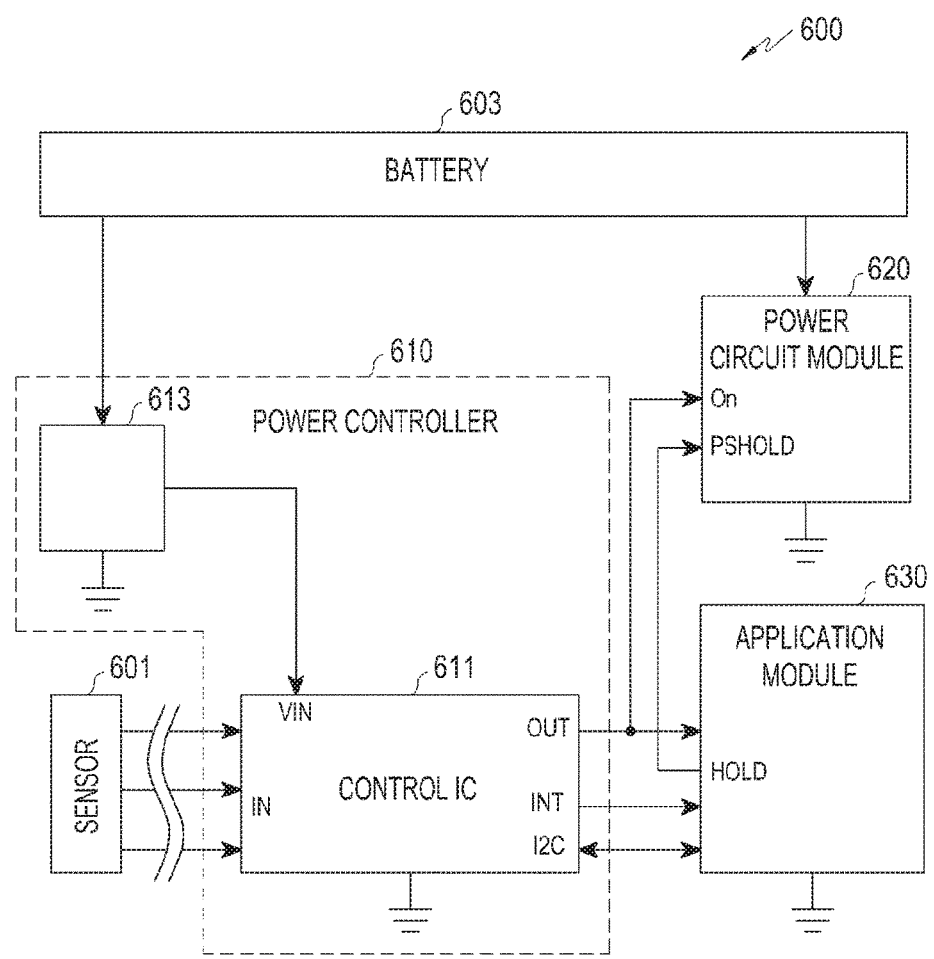
FIG. 6 is a block diagram of an electronic device according to an embodiment of the present disclosure.

FIG. 6 is a block diagram of an electronic device 600 according to an embodiment of the present disclosure, and FIG. 7 is a chart of operational states of an electronic device according to an embodiment of the present disclosure.

Referring to FIG. 6, the electronic device 600 may receive power in various operational states (or modes) of the chart illustrated in FIG. 7 in order to detect an ordinary signal from a sensor 601 (for example, the same as or similar to the sensor modules 203 of FIGS. 3AA to 3EB). The electronic device 600 may include a power controller 610, a power circuit module 620, and an application module 630 to receive power provided from a battery 603 in various states of the chart illustrated in FIG. 7.

The power controller 610 may perform control to receive power from the battery 603 in a state in which there is no power supply and thus receive a pressure signal detected by the sensor 601 at ordinary times. The power controller 610 may include a control integrated circuit (IC) 611, and may further include a low drop regulator 613. The low drop regulator 613 may allow the electronic device 600 to supply separate power in a power-off state of the power control module 620.

The power controller 610 may include the control IC (or chip) 611 which includes an output port (out) connected to the application module 630 and the power circuit module 620 to enable a power reset of the electronic device 600, a power port (vin) for receiving low power from the low drop regulator 613 connected to the battery 603, an input port (in) for receiving a signal detected by the sensor 601, and a communication port (an inter-integrated circuit (I2C)) for enabling communication in the remaining states except for the system off state.

As illustrated in FIG. 7, the operation states of the electronic device 600 may include a system off mode in which there is no power supply, a sleep mode (including a lock screen state) corresponding to a power-saving state, an idle mode in which there is no input for a predetermined time, and an active mode in which processing corresponding to input is performed. The system off mode and the sleep mode correspond to a state in which a display is turned off, and the system off state corresponds to a state in which the application module 630, the power circuit module 620, and a display are all turned off, and the power controller is in a low-power-supply state.

Figure 8:
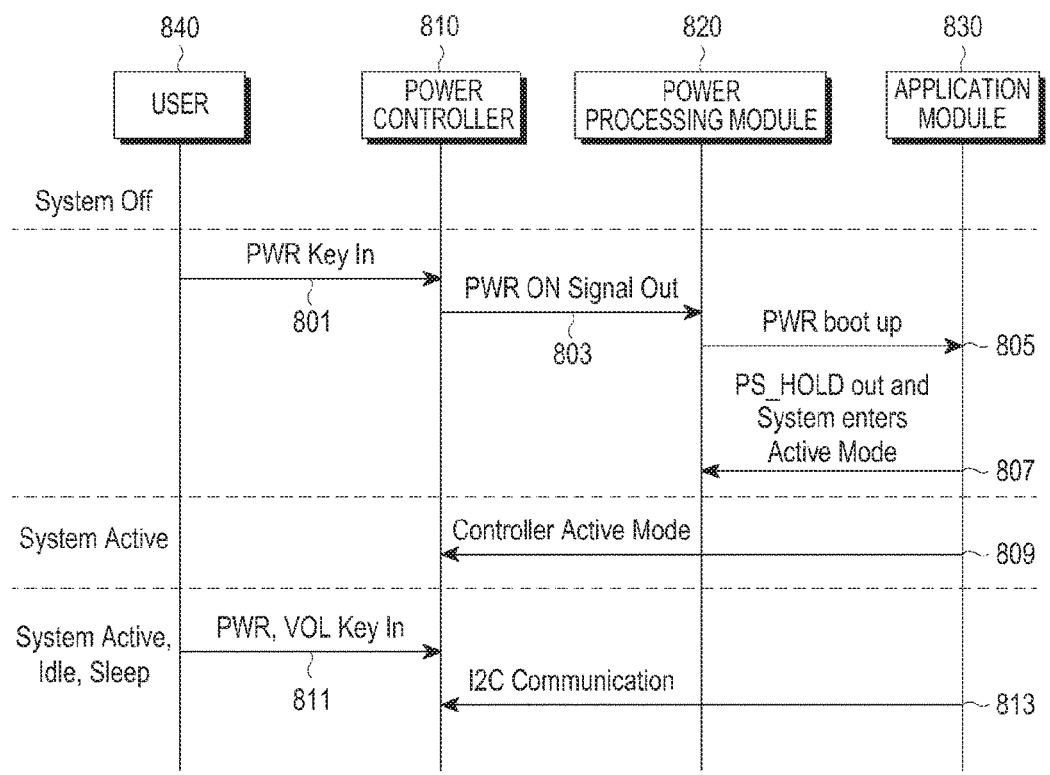
FIG. 8 is a flow diagram of an operation procedure of an electronic device according to an embodiment of the present disclosure.

FIG. 8 is a flow diagram of an operation procedure of an electronic device according to an embodiment of the present disclosure.

Referring to FIG. 8, when a user 840 inputs a power key (PWR Key In) in the system off state of FIG. 7, a power controller 810 (for example, the same as or similar to the power controller 610 of FIG. 6) of an electronic device (for example, the electronic device 600 of FIG. 6) may receive a power key input signal in step 801. In step 803, the power controller 810 may output a power supply request signal (PWR ON Signal Out) to a power processing module 820 (for example, the same as or similar to the power circuit module 620 of FIG. 6) in response to the Power Key In signal.

In step 805, the power processing module 820 may transmit a signal (PWR boot up) for booting an electronic device to an application module 830 according to the power supply. In step 807, the power processing module 820 may receive a signal (PS_HOLD out and System enters Active Mode) indicating switching to the system active state from the application module 830.

In step 809, the power controller 810 may receive a signal (controller active mode) for controlling the system active state from the application module 830. The power controller 810 may operate in the system active state.

When the system active state switches to the idle state or the sleep state and a particular key (PWR, VOL Key In) is input in step 811, the power controller 810 may communicate with the application module 830 through an I2C terminal of a control IC (the same as or similar to the control chip 611 of FIG. 6) in step 813.

Figure 9:
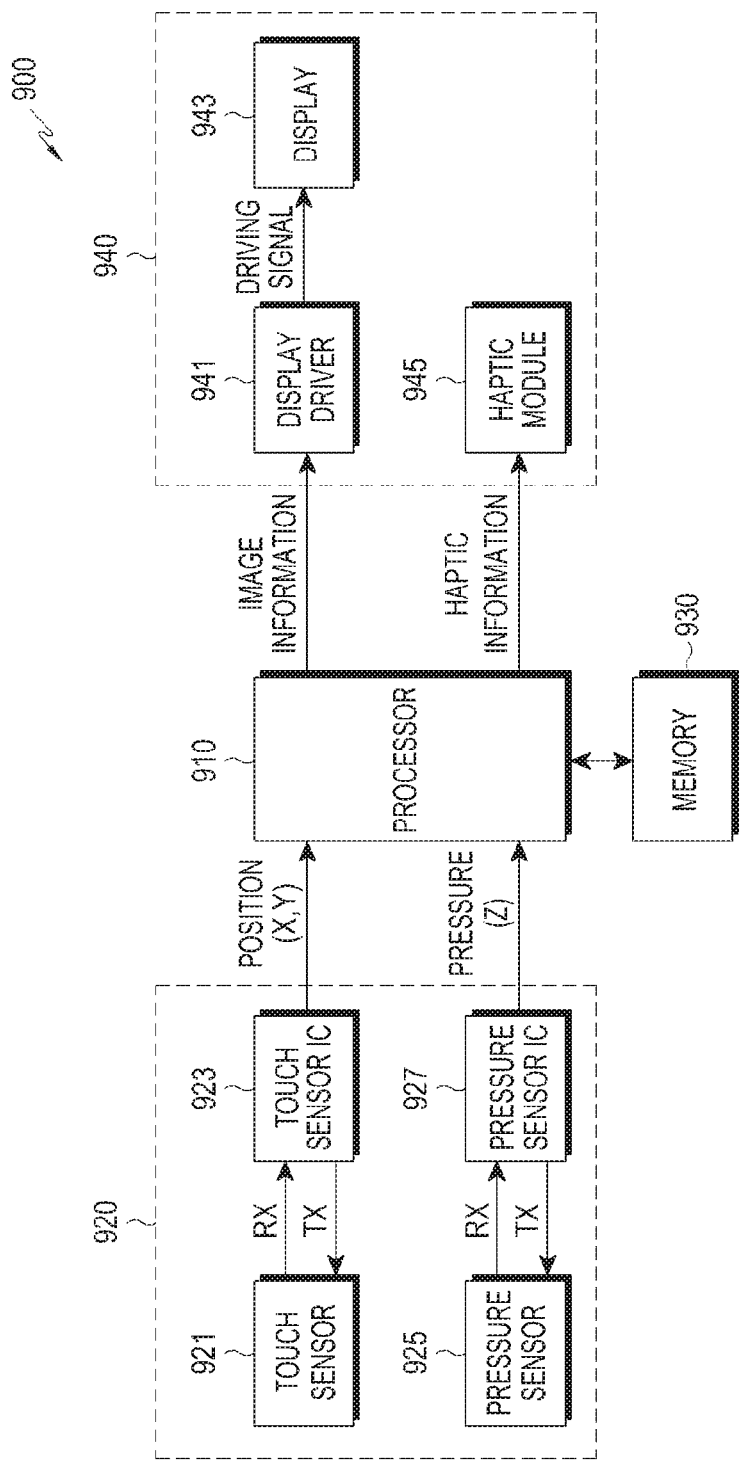
FIG. 9 is a block diagram of an electronic device according to an embodiment of the present disclosure.

FIG. 9 is a block diagram of an electronic device 900 according to an embodiment of the present disclosure.

Referring to FIG. 9, the electronic device 900 (for example, the same as or similar to the electronic device 101 of FIG. 1, the electronic device 203 of FIGS. 3AA-3EB, or the electronic device 400 of FIGS. 4B and 4B) may include an input device 920 including a touch sensor 921 and a pressure sensor 925, a processor 910, a memory 930, and an output device 940 including a display 943. The electronic device 900 may further include a communication module.

According to an embodiment of the present disclosure, the processor 910 (for example, the same as or similar to the processor 120 of FIG. 1) may process information according to the operation of the electronic device 900 and information according to the execution of programs, applications, or functions.

According to an embodiment of the present disclosure, the processor 910 may be electrically connected to, for example, other elements 920, 930, and 940 included in the electronic device 900, and may control the elements 920, 930, and 940 included in the electronic device 900 and/or perform calculations and data processing in connection with communication.

According to an embodiment of the present disclosure, the processor 910 may launch (or execute) an application program (an application) for displaying a UI on the display 943. The processor 910 may display an array of a plurality of items in a UI displayed on the display 943 in response to the launching of an application. Thereafter, the processor 910 may receive first data (data including location coordinates (X and Y) of a touch) generated by the touch sensor 921 and receive second data (data including pressure (Z) of the touch) generated by the pressure sensor 925.

According to an embodiment of the present disclosure, the processor 910 may activate at least a part of the pressure sensor 925 while the display 943 is turned off. Alternatively, the processor 910 may at least partially enable the pressure sensor 925 while the display 943 is turned off. For example, the processor 910 may activate all or part of the pressure sensor 925 in a case in which an element such as the display 910 is turned off and thus is in an idle state as well as a case in which the electronic device 900 is in an awake state. In addition, the processor 910 may at least partially disable the touch sensor 921 while the display 943 is turned off or the electronic device 900 is in an idle state.

According to an embodiment of the present disclosure, when a predetermined condition is met while the display 943 is turned off, the processor 910 may activate at least a part of the pressure sensor 925. For example, the processor 910 may activate the pressure sensor 925 after or until a predetermined time after the display 943 is turned off. For example, when the use of the electronic device 900 by a user is detected by a gyro sensor or a proximity sensor, the processor 910 may activate the pressure sensor 925. For example, when a temperature is less than a predetermined value for a predetermined time interval, when a touch is detected through a touch panel, when the electronic device 900 approaches another external device, or when a stylus within the electronic device 900 is withdrawn from the electronic device 900, the processor 910 may active the pressure sensor 925. For example, the processor 910 may activate the pressure sensor 925 while an application (for example, a music player), the operation of which is performed in an idle state, is executed.

According to an embodiment of the present disclosure, when a predetermined condition is met while the display 943 is turned off, the processor 910 may deactivate at least a part of the pressure sensor 925. For example, when it is detected that the electronic device 900 is put into a pocket or a bag, or that the electronic device 900 is upside down, through a proximity sensor, an illumination sensor, an acceleration sensor, and/or a gyro sensor, the processor 910 may deactivate the pressure sensor 925. For example, when the electronic device 900 is connected to an external device (for example, is connected to a desktop PC), the processor 910 may deactivate the pressure sensor 925.

According to an embodiment of the present disclosure, the processor 900 may activate only a predetermined area of the pressure sensor 925 while the display 943 is turned off. For example, in order to reduce power consumption in an idle state, the processor 910 may activate a predetermined partial area of the pressure sensor 925 (for example, a lower central area of the pressure sensor). Alternatively, when the pressure sensor 925 is implemented as a set of two or more sensors, the processor 910 may deactivate some of the two or more sensors.

As described above, by activating or enabling the pressure sensor 925, the processor 910 may detect pressure through the pressure sensor 925 while the electronic device 900 is in an idle state. For example, the processor 910 may receive data related to pressure applied to the display 943 by an external object from the pressure sensor 925 while the display 943 is turned off.

According to an embodiment of the present disclosure, the processor 910 may determine whether a pressure is greater than or equal to a selected level based on data related to the pressure, and when it is determined that the pressure is greater than or equal to the selected level, perform a function without fully turning on the display 943. For example, the processor 910 may perform the function when pressure greater than a predetermined level is detected. In this case, the processor 910 may turn on a part of the display 943. The processor 910 may determine the following functions to be performed based on at least one a position at which pressure is detected, an intensity of pressure, a number of pressure points, a speed, a direction, and a duration time. For example, when pressure is detected at a position corresponding to a lower center portion of the display 943, the processor 910 may wake up the electronic device 900. For example, when the pressure is detected at a position corresponding to an upper left portion of the display 943, the processor 910 may control the volume of a speaker of the electronic device 900. When the processor is detected at a position adjacent to hardware such as an earjack or a USB port, the processor 910 may perform a function related to the adjacent hardware. When pressure greater than or equal to a predetermined intensity is detected, the processor 910 may control the electronic device 900 such that the electronic device 900 enters an emergency mode. The processor 910 may perform different functions depending on the number of points at which pressure is simultaneously detected.

Although FIG. 9 illustrates that the pressure sensor 925 provides data on the pressure (Z) to the processor 910, the present disclosure is not limited thereto, and when the pressure sensor 925 is implemented as a set of two or more sensors, the processor 910 may detect the position at which pressure is applied based on a position of a sensor, a capacitance of which is changed, among the two or more sensors. For example, when the pressure sensor 925 is implemented as a set of six sensors arranged in a 3×2 array, the processor 910 may determine the position at which pressure is applied based on a change in a capacitance of each of the six sensors and a position of each of the six sensors. That is, the processor 910 may determine the position at which the pressure is applied without using the touch sensor 921. When pressure is detected by the pressure sensor 925, the processor 910 may activate the touch sensor 921 and detect a position at which pressure is applied through the touch sensor 921.

According to an embodiment of the present disclosure, when pressure of a first level by a touch is detected by the pressure sensor 925, the processor 910 may perform a first function. The processor 910 may determine the first function based on at least one of a position at which pressure of the first level is detected, an intensity of pressure, a number of pressure points, a speed, a direction, and a duration time, and may perform the determined first function. A pressure of a first level may indicate pressure having an intensity within a predetermined range.

When pressure of a second level by a touch is detected by the pressure sensor 925 while the first function is performed, the processor 910 may perform a second function related to the first function. The processor 910 may determine the second function based on at least one of a position at which pressure of the second level is detected, an intensity of pressure, a number of pressure points, a speed, a direction, and a duration time. A pressure of the second level may indicate pressure having an intensity in a predetermined range. The intensity of the pressure of the second level may be greater than or less than the intensity of the pressure of the first level. Further, the intensity of the pressure of the second level and the intensity of the pressure of the first level may be the same. When pressure is detected while the first function is performed, the processor 910 may perform the second function related to the first function being performed so as to execute various functions by pressure, corresponding to a one-dimensional input. Further, according to an amount of pressure applied to the electronic device 900 after one touch is made on the electronic device 900, a different function related to the performed function may be executed, which makes providing an input more convenient. According to an embodiment of the present disclosure, the processor 910 may perform control to display a first UI (for example, a graphical user interface (GUI)) including at least one first item on a screen of the display 943. In this case, the screen may be an area for displaying objects (for example, items) on a display panel, and may be configured by a software program. A screen may be the same as or similar to at least one of a layer, window, view, surface, canvas, and page. The first item may be the same as or similar to one of, for example, an object, an application icon, a button icon, a document icon, a shortcut key, a widget, a menu, an indicator, and an instruction. The first UI may be, for example, a home screen initially displayed after the electronic device is booted when power is applied, an application screen displayed according to the execution of a particular application (or function), or a screen in a screen lock state.

According to an embodiment of the present disclosure, the processor 910 may perform the first function related to the first UI. In this case, the first function may be, for example, a function executed before a grip is identified or a function executed by the identified grip, which corresponds to a function related to the first UI. When the first UI is, for example, a GUI for displaying a home screen, the first function may be at least one application program executed in connection with the home screen.

According to an embodiment of the present disclosure, when pressure is detected by at least one sensor module (for example, the same as or similar to the sensor modules 203 of FIGS. 3AA to 3EB) installed in a partial area of a lateral side of a housing, the processor 910 may receive the detected pressure signal and identify a pressure value indicated or included in the pressure signal, that is, a pressure level (for example, a preset value indicating an intensity, a level, or a position of the pressure) applied to the partial area of the lateral side of the housing by an external medium (for example, the user's hand). Further, the electronic device may compare the identified pressure value with at least one set threshold value. When it is identified that the detected pressure signal is greater than or equal to the set threshold value, the processor 910 may execute the second function (or application program) set in accordance with the detected pressure signal. Further, the processor 910 may perform control to display a second UI including a second item related to the second function on the display along with the first UI. In this case, the second item may be the same as or similar to one of, for example, an object, an application icon, a button icon, a document icon, a shortcut key, a widget, a menu, an indicator, and an instruction. Further, the second UI related to the second function may be displayed in an area in which the first UI is not displayed.

According to an embodiment of the present disclosure, the processor 910 may display a UI (for example, the first UI and the second UI) displayed on the display 943 in the form of accumulated layers or in the form of multiple screens. In this case, the form of multiple screens corresponds to a manner of dividing the screen of the display according to the number of functions to be activated or the number of UIs to be displayed and displaying the corresponding UIs in the divided display areas, respectively.

According to an embodiment of the present disclosure, when a pressure signal having a pressure value different from the pressure value indicated by or included in the previously detected pressure signal is detected, the processor 910 may execute a third function set in accordance with the pressure value included in the currently detected pressure signal, or may return to the previous state, that is, performing control to display only the first UI related to the first function on the display. Further, the processor 910 may execute the third function through an audio module or a haptic module. In this case, the processor 910 may not display a third UI for displaying items related to the third function, but may maintain the current display state of the display or change and display the first and/or second UI.

According to an embodiment of the present disclosure, the processor 910 may receive an input signal detected as a result of a user's touch or a gesture input through at least one touch sensor or various sensors that may detect a gesture in a state in which the first UI and the second UI are displayed on the display. Further, according to the detected touch or gesture input, the processor 910 may execute the third function for an item set or selected in accordance with a touch or a gesture input, and may perform control to display the third UI related to the third function on the display. When the third function is executed, the processor 910 may perform control to remove the first UI, stop the execution of the first function, execute the third function, and display the third UI in the area from which the first UI is removed. When it is identified that the currently detected pressure signal is less than a first threshold value or when no pressure signal is detected, the processor 910 may perform control to remove the displayed second UI, stop the execution of the second function, and display only the third UI on the display.

According to an embodiment of the present disclosure, for the state (for example, one-hand mode) in which the first item or the second items can be selected and controlled by one hand, the processor 910 may change and display a display position of the displayed first UI or second UI based on, for example, the contact of a set finger among gripping fingers or a pressure position on the display 943.

According to an embodiment of the present disclosure, the processor 910 is a hardware module or a software module (for example, an application program) and may be a hardware element (a function) or a software element (a program) including at least one of various sensors included in the electronic device, a data measurement module, an input/output interface, a mobile for managing the state or environment of the electronic device, and a communication module.

The above-described operation of the processor 910 is only an example, and the present disclosure is not limited thereto. For example, it may be understood that the operation of a processor described in other parts of the present disclosure is the operation of the processor 910. Further, in the present disclosure, it may be understood that at least some of the operations described as the operations of an electronic device are the operation of the processor 910.

According to an embodiment of the present disclosure, the input device 920 of the electronic device 900, for example, the input/output interface 150 of FIG. 1, may transmit, for example, various pieces of information such as number and character information input by a user, and signals input in connection with various function settings and function controls of the electronic device 900 to the processor 910. The input device 920 may support user input for executing a module or an application that supports a particular function. The input device 920 may include a key input means such as a keyboard or a keypad, a sensor module including various sensors, a sound source input means, and a photographing means (for example, a camera). The sensor module 920 may include a touch input means including the touch sensor 921 and a touch pad (such as touch sensor IC 923), a pressure input means including the pressure sensor 925 and a pressure sensor IC 927, and a gesture input means. In addition, the input device 920 may include all types of input means which are being developed currently or will be developed in the future.

The touch input means may receive a touch input signal (for example, information related to a touch position) detected by the touch sensor 921, and the pressure input means may receive a pressure input signal (for example, pressure intensity) detected by the pressure sensor 925. Each of the touch input means and the pressure input means may transmit an input signal to the processor 910. Accordingly, the processor 910 may process an event corresponding to the input signal and output a processing result corresponding to the input signal through the display 943 or a haptic module 945 of the output device 940.

The touch sensor 921 may undergo a change in a predetermined physical quantity (for example, voltage, light amount, resistance, charge amount, or capacitance) in response to a user's touch. According to an embodiment of the present disclosure, the touch sensor 921 may be arranged to overlap the display 943.

The touch sensor IC 923 may detect a change in a physical quantity of the touch sensor 921 and calculate a position (X and Y) at which a touch is made based on a change in physical quantity (for example, voltage, resistance, or capacitance). The calculated position (coordinates) may be provided (or reported) to the processor 910. For example, when a part of a user's body (for example, a finger) or an electronic pen comes into contact with a cover glass (210 of FIG. 2) of the display 943, a coupling voltage between a transmitting side (Tx) and/or a receiving side (Rx) included in the touch sensor 921 may be changed. For example, the change in the coupling voltage may be detected by the touch sensor IC 923, and the touch sensor IC 923 may transmit coordinates (X and Y) of the position at which the touch is made to the processor 910. Accordingly, the processor 910 may acquire data on the coordinates (X and Y) as the event for the user input.

The touch sensor IC 923 may be referred to as a touch IC, a touch screen IC, a touch controller, or a touch screen controller IC. According to an embodiment of the present disclosure, in an electronic device, which does not include the touch sensor IC 923, the processor 910 may perform the function of the touch sensor IC 923. The touch sensor IC 923 and the processor 910 may be implemented as a single element (for example, a single IC or chip).

The pressure sensor 925 may detect pressure (or force) applied by an external object (for example, a finger or an electronic pen). According to an embodiment of the present disclosure, the pressure sensor 925 may undergo a change in a physical quantity (for example, a capacitance) between a transmitting side (Tx) (for example, electrodes) and a receiving side (Rx) (for example, electrodes) in response to a touch.

The pressure sensor IC 927 may detect a change in a physical quantity (for example, capacitance) of the pressure sensor 925 and calculate pressure (Z) applied by a user's touch based on the change in physical quantity. The pressure (Z) may be provided to the processor 910 along with the position (X and Y) at which the touch is made. According to an embodiment of the present disclosure, the pressure sensor IC 927 may be referred to as a force touch controller, a force sensor IC, or a pressure panel IC. Further, the pressure sensor IC 927 may be implemented together with the touch sensor IC 923 as a single element or chip.

According to an embodiment of the present disclosure, the input device 920 may receive information input by a user through a touch panel of the display 943 or a camera and transmit the input information to the processor 910. The input device 920 may receive an input signal related to data to be transmitted to another electronic device from the user through the sound source input means (for example, a microphone) and transmit the input signal to the processor 910.

According to an embodiment of the present disclosure, the memory 930 (for example, the memory 130 of FIG. 1) of the electronic device 900 may temporarily store various types of data generated during the execution of a program as well as programs required for the function operation. The storage unit 930 may largely include a program area and a data area. The program area may store pieces of information related to driving of the electronic device 900, such as an OS that boots the electronic device 900. The data area may store transmitted/received data or generated data. Further, the memory 930 may include at least one storage medium of a flash memory, a hard disk, a multimedia card micro type memory (for example, a secure digital (SD) memory card or an extreme digital (xD) memory card), a random access memory (RAM), and a read only memory (ROM). The memory 930 may store information for communication with an access point or another electronic device and transmitted/received data. The memory 930 may store an instruction or data related to the operation of an element included in the electronic device 900. For example, the memory 930 may store at least one application program including a UI set to display a plurality of items on the display 943. Further, for example, the memory 930 may store instructions to cause the processor 910 to perform various operations described in the present disclosure when executed.

According to an embodiment of the present disclosure, the output device 940 of the electronic device 900 may include a display module (for example, the display 160 of FIG. 1) or an audio module (such as an input/output interface 150 of FIG. 1). The display module may include a display driver 941 (for example, a display driver IC (DDI)) and the display 943 (for example, a display panel). Further, the output device 940 may further include a means for outputting a vibration (for example, the haptic module (haptic actuator) 945) or a means for outputting a smell. Each of the means for outputting a vibration or the means for outputting a smell may output at least one of data transmitted/received through wireless data communication, the generation of a notification event according to the data transmission/reception, and information related to the generated notification event through a vibration or a smell.

The display driver 941 may supply an image-driving signal corresponding to image information received from the processor 910 (host) to the display 943 at a preset frame rate. The display driver 941 may drive the display 943 in a low-power mode. According to an embodiment of the present disclosure, the display driver 941 may include a graphic RAM, an interface module, an image-processing unit, a multiplexer, a display timing controller (T-con), a source driver, a gate driver, and/or an oscillator.

The display 943 may receive an image-driving signal supplied from the display driver 941. The display 943 may display various contents and/or items (for example, text, images (objects), videos, icons, function objects, or symbols) based on the image-driving signal. According to an embodiment of the present disclosure, the display 943 may be overlappingly combined with the touch sensor 921 and/or the pressure sensor 925, and may be referred to as a display panel. The display 943 may be driven in a low-power mode.

The haptic module 945 may provide the user with haptic feedback (for example, vibration) according to a control instruction of the processor 910. For example, when a touch input (for example, including touch, hovering, or force touch) is received from a user, the haptic module 945 may provide haptic feedback to the user.

According to an embodiment of the present disclosure, the communication module or communication interface 170 of FIG. 1) of the electronic device 900 may communicate with other devices on the wireless communication network under the control of the processor 910. The communication module may transmit and receive data related to the operation executed by the control of the processor 910 to and from an access point or another electronic device. The communication module may perform communication through a network connection or a connection between devices based on wired communication or wireless communication via a communication interface. The wireless communication may include at least one of, for example, WiFi, BT, ZigBee, Z-Wave, NFC, GPS and cellular communication (for example, LTE, LTE-A, CDMA, WCDMA, UMTS, WiBro, GSM or the like). The wired communication may include at least one of, for example, a USB, an HDMI, an RS-232, a POTS, a universal asynchronous receiver transmitter (UART), an I2C, a serial peripheral interface (SPI), and a controller area network (CAN). The communication module may include all types of communication schemes which are widely known or will be developed in the future as well as the aforementioned communication schemes.

As described above, an electronic device according to an embodiment of the present disclosure may activate a pressure sensor in a state in which a display is turned off. When an input is received using a touch sensor in a state in which a display is turned off, it is highly likely to cause a malfunction that is not intended by a user. Accordingly, through the reception of a input using a pressure sensor in a state in which a display is turned off, it is possible to reduce the incidence of an unintended malfunction when an input is received while an electronic device is in an idle state. In addition, recently, interest in electronic devices that do not include physical keys has increased in order to increase the size of a display or improve the design of such electronic devices. Through the reception of an input using a pressure sensor from a user while an electronic device is in an idle state, it is possible to provide a similar user experience to the user as if the user were using a physical key. When pressure having a predetermined intensity is detected within a predetermined area, an electronic device may execute a function corresponding to the corresponding area and intensity of pressure.

As described above, according to an embodiment of the present disclosure, main elements of an electronic device have been described through the electronic device 900 of FIG. 9. However, not all of the elements illustrated in FIG. 9 are necessary elements, and the electronic device 900 may be implemented using more or less elements than the illustrated elements. Further, locations of the main elements of the electronic device 900 illustrated in FIG. 9 may vary in various embodiments of the present disclosure.

An electronic device according to an embodiment of the present disclosure may include a housing including a first surface facing a first direction, a second surface facing a direction opposite the first direction, and lateral sides surrounding a space between the first surface and the second surface; a touch screen display exposed through the first surface between the first surface and the second surface; a pressure sensor arranged to detect at least one of a level and/or a position of pressure by an external object close to at least two areas actually facing each other on the lateral sides; a wireless communication circuit; at least one processor electrically connected to the display, the pressure sensor, and the wireless communication circuit; and a memory electrically connected to the processor and configured to store at least one application program. The memory may store instructions, when executed, to cause the processor to display a first UI including at least one first item on the display, to detect at least one of the level and the position of the pressure by the external object through the pressure sensor, to display a second UI including at least one second item at least partially based on at least one of the detected level and position while controlling or not controlling the first UI, and to remove the second UI while reconstructing the first UI to restore the state before the controlling or not reconstructing at least partially based on a change in at least one of the detected level and the position or without the reconstruction.

According to an embodiment of the present disclosure, a processor may perform control to remove the first UI from an area in which the first UI is displayed at least partially based on a state of the electronic device, and may display a third UI.

According to an embodiment of the present disclosure, a state may be associated with a screen displayed on a display and/or an application program executed when at least one of a level and a position of pressure is detected.

According to an embodiment of the present disclosure, a processor may display a second UI in a first display area (portion) of a display, and may control the first UI to fit a second display area of the display. A second display area may be a part in which the second UI is not displayed.

According to an embodiment of the present disclosure, a processor may control a first UI by resizing, moving, shifting, rearranging, and/or scrolling at least one first UI or at least one first item.

According to an embodiment of the present disclosure, a processor may display a second UI along with at least a part of a controlled first UI before removing the second UI.

According to an embodiment of the present disclosure, a first UI may include a home screen and at least one first item including an icon indicating an application program, and a second UI includes a menu (menu pane), and one or more graphic elements indicating at least one of at least one phone application program, an email application program, a browser application program, a search application program, a voice recognition application program, and a program selected by a user.

According to an embodiment of the present disclosure, a first UI may include a UI of an application program and at least one first item related to the application program, and a second UI may include a menu (menu pane) and one or more graphic elements indicating at least one of at least one phone application program, an email application program, a browser application program, a search application program, a voice recognition application program, a program selected by a user, and a function related to an application program.

According to an embodiment of the present disclosure, a first UI may include a UI of a lock screen program and at least one first item related to the lock screen program, and a second UI may include a menu (menu pane) and one or more graphic elements indicating at least one of at least one phone application program, an email application program, a browser application program, a search application program, a voice recognition application program, a program selected by a user, and a function related to an application program.

According to an embodiment of the present disclosure, a second UI may include at least one piece of text indicating a user's instruction to perform an operation of an electronic device.

An electronic device according to an embodiment of the present disclosure may include a housing including a first surface facing a first direction, a second surface facing a direction opposite the first direction, and lateral sides surrounding a space between the first surface and the second surface; a touch screen display exposed through the first surface between the first surface and the second surface; a pressure sensor arranged to detect at least one of a level and/or a position of pressure by an external object close to at least two areas actually facing each other on the lateral sides; and a processor electrically connected to the display and at least one pressure sensor.

A processor may display a first UI including at least one first item on a display, and when a first pressure signal detected by at least one pressure sensor is received, may display at least a part of a second UI including at least one second item and the first UI on the display.

According to an embodiment of the present disclosure, when a detected first pressure signal is received in a state in which a first function for operation of an electronic device related to a first UI is performed, a processor may perform a second function for operation of the electronic device that is set in accordance with a first pressure signal and is related to a second UI.

According to an embodiment of the present disclosure, a processor may have a pressure value greater than or equal to a preset first threshold value.

According to an embodiment of the present disclosure, when a second pressure signal detected by at least one sensor is received, a processor may perform a third function for operation of an electronic device that is set in accordance with a received pressure signal, and a second pressure signal may have a pressure value greater than or equal to a second threshold value.

According to an embodiment of the present disclosure, a processor may remove a first UI from a display and display a third UI in a display area from which the first UI is removed.

According to an embodiment of the present disclosure, when a first pressure signal is not detected, a processor may remove a second UI and display only a third UI.

According to an embodiment of the present disclosure, when a second pressure signal detected by at least one sensor is received, a processor may exchange a display position of a first UI and a display position of a second UI.

According to an embodiment of the present disclosure, when a second pressure signal detected by at least one sensor is received, a processor may change a display position of a first UI or a second UI displayed in a first display area of a display adjacent to areas gripped by an external object to a position close to a particular area of the gripped areas, and may display a part of the first UI or a part of the second UI at the changed display position.

According to an embodiment of the present disclosure, when an input signal by a change in orientation of an electronic device or by a motion sensor, or a touch input signal on a display is received in a state in which a first UI and a second UI are displayed, a processor may perform a third function for operation of the electronic device set in accordance with the received input signal, remove the first UI, and display a third UI related to the third function in a display area in which the first UI is displayed.

Figure 10:
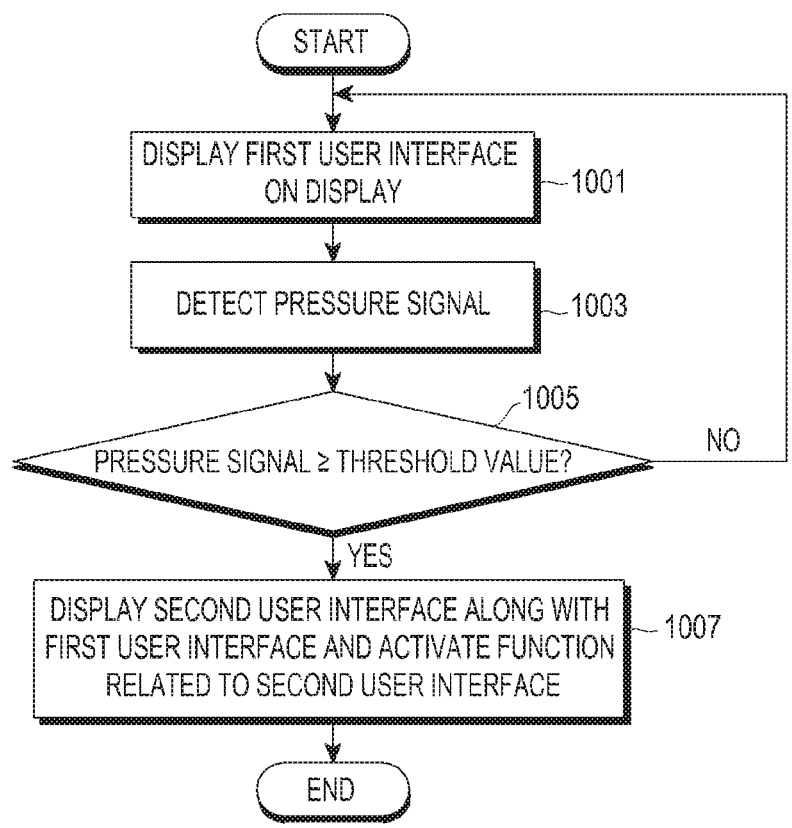
FIG. 10 is a flowchart of an operation procedure of an electronic device according to an embodiment of the present disclosure.

FIG. 10 is a flowchart of an operation procedure of an electronic device according to an embodiment of the present disclosure.

Referring to FIG. 10, the electronic device (for example, the electronic device 101 of FIG. 1, the electronic device 203 of FIGS. 3AA-3EB, or the electronic device 400 of FIGS. 4A and 4B) may operate in an active state in response to a particular key input.

In step 1001, the electronic device may display a first UI including at least one first item on a display. The first item may be the same as or similar to one of, for example, an object, an application icon, a button icon, a document icon, a shortcut key, a widget, a menu, an indicator, and an instruction.

The first UI displayed in step 1001 may be, for example, a lock screen initially displayed after the electronic device is booted as power is applied or an application screen displayed according to the execution of a particular application (or function). Further, in step 1001, the electronic device may perform a first function related to the first UI. In this case, the first function may be, for example, a function executed before a grip is identified or a function executed by the identified grip, which corresponds to a function related to the first UI. When the first UI is, for example, a GUI for displaying a home screen, the first function may be at least one application executed in connection with the home screen. The application executed in connection with the home screen may include, for example, at least one of a function (or program) for executing the home screen, a function for displaying changed information in connection with a particular item (for example, a message icon) included in the home screen, and a function for displaying real-time information (for example, the current time) of an item (for example, a watch) displayed on an indicator of the home screen. According to an embodiment of the present disclosure, when the first UI is, for example, a GUI for displaying the lock screen, the first function may be at least one application executed in connection with the lock screen. At least one application executed in connection with the lock screen may be, for example, a function for executing the lock screen or a function for displaying changed information in connection with a particular item included in the lock screen. The particular item displayed on the lock screen may be information related to a time, a notification, a pin number input, a keypad, a fingerprint input, an iris input, and news.

In step 1003, the electronic device may detect a pressure signal indicating a level of pressure (for example, intensity, level, or position) applied to a sensor module (for example, the same as or similar to the sensor modules 203 of FIG. 3AA to 3EB) installed in at least one area of a housing through at least one sensor (for example, a pressure sensor).

In step 1005, the electronic device may determine whether the detected pressure signal is greater than or equal to a first threshold value (for example, a preset value indicating a pressure intensity, level, or position).

In step 1007, when the detected input signal is greater than or equal to the first threshold value, the electronic device may display a second UI including at least one second item on display along with the first UI. The second item may be the same as or similar to one of, for example, an object, an application icon, a button icon, a document icon, a shortcut key, a widget, a menu, an indicator, and an instruction.

According to an embodiment of the present disclosure, an electronic device may display UIs (for example, a first UI and a second UI) displayed on a display in the form of accumulated layers or in the form of multiple screens. In this case, the form of multiple screens corresponds to a manner of dividing the screen of a display according to a number of functions to be activated or a number of UIs to be displayed and displaying the corresponding UIs in the respective divided display areas.

According to an embodiment of the present disclosure, when UIs are displayed in a form of accumulated layers, an electronic device may graphically process and generate a first UI including at least one item and display the generated first UI on a bottom layer (for example, a background layer) of a display, which is a first layer. Further, when a detected pressure signal is greater than or equal to a first threshold value in a state in which a first layer is displayed, an electronic device may activate a second function set in accordance with the detected pressure signal, and may graphically process and generate a second UI related to the activated second function. The electronic device may display the generated first UI on a second layer accumulated on the first layer. The electronic device may display at least one second item in a first display area of the second layer and transparently display a second display area such at least one displayed first item included in the first layer can be identified or selected by the user.

According to an embodiment of the present disclosure, when UIs are displayed in the form of multiple screens, an electronic device may compare a detected pressure signal to a first threshold value in a state in which a first user interface is displayed on a display. For example, when the detected pressure signal is greater than or equal to a first threshold value, the electronic device may split a screen of the display according to a number of currently activated functions or a number of UIs to be displayed, and may divide the screen into a plurality of display areas. When the screen of the display is split, the electronic device may display the first UI in the split first display area and display the second UI corresponding to the newly activated second function in the second display area. As a pressure signal greater than or equal to a second threshold value is detected, the electronic device may generate or change the first UI and the second UI to have sizes and display forms suitable for the corresponding display areas, and may display the generated or changed first UI and second UI. The electronic device may display the UI in accordance with a position of a grip of a user's hand. For example, the electronic device may display a UI even in adjacent areas above or below positions of a hand grip or arrange icons in adjacent areas based on positions of the hand grip. Further, when configuring a multi-screen, the electronic device may set a display start position (for example, a pixel value) of a UI to be displayed in each display area. For example, a first UI displayed in a state in which a pressure signal is less than a first threshold value may be displayed on an entire screen as a pixel value of screen coordinates (0, 0) is set as a start position. For example, the first UI, displayed in a state in which a pressure signal is greater than or equal to the first threshold value, may be displayed on an entire second display area split from the display screen as a pixel value of screen coordinates (0, 1280) is set as a start position.

When a pressure signal having a pressure value different from a pressure value indicated by or included in a previously detected pressure signal is detected after step 1007 of FIG. 10, an electronic device may execute a third function, set in accordance with the pressure value included in the currently detected pressure signal, or may return to a previous state, that is, may display only a first UI related to a first function on a display.

In addition, when a current operation state of an electronic device corresponds to an off state (for example, the off mode of FIG. 7), the electronic device may omit step 1001 of FIG. 10 since the off state is not an operation state in which the electronic device can perform the function. In this case, the electronic device may receive low power from the power controller 613 of FIG. 6 and always detect a signal generated from at least one pressure sensor. Accordingly, the electronic device may perform steps 1003 and 1005 of FIG. 10, and when a detected pressure signal is greater than or equal to a threshold value, may switch the current operation state (for example, the off mode of FIG. 7) of the electronic device to an active state (for example, the active mode of FIG. 7) and execute a function for activating a display. According to an embodiment of the present disclosure, the electronic device may display a basic user interface, such as a home screen, on the activated display. The basic user interface may correspond to the second UI in step 1007, and only the basic user interface may be displayed on a display according to a currently executed function, since there is no previously displayed UI on the display.

According to an embodiment of the present disclosure, when an electronic device performs an operation procedure according to a system off mode and then switches to an active mode, whereby a basic user interface is displayed, the electronic device may perform an operation procedure which is the same as the operation procedure of FIG. 10. The basic user interface may be displayed as a first UI.

Figure 11:
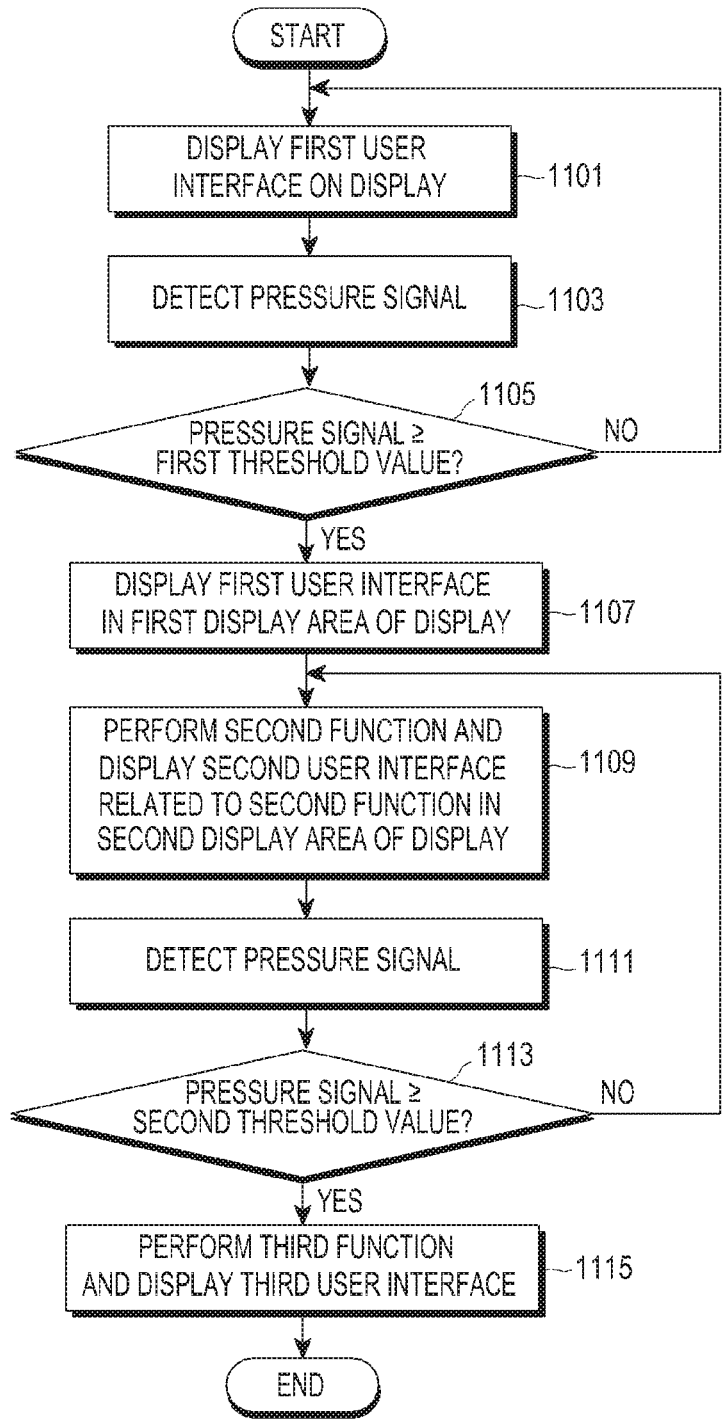
FIG. 11 is a flowchart of a method of transmitting and receiving a message between an electronic device and an access point according to an embodiment of the present disclosure.

FIG. 11 is a flowchart of an operation procedure of an electronic device according to an embodiment of the present disclosure of the present disclosure.

Referring to FIG. 11, the operation procedure of the electronic device may be one of the various embodiments of the present disclosure based on FIG. 10.

When a plurality of UIs is displayed on a display, the electronic device (for example, the electronic device 101 of FIG. 1, the electronic device 203 of FIGS. 3AA-3EB, or the electronic device 400 of FIGS. 4A and 4B) may display the UIs, for example, in the form of accumulated layers or in the form of multiple screens.

In step 1101, the electronic device may display a first UI including at least one first item on a display. The first UI may be, for example, a lock screen or a home screen initially displayed after the electronic device is booted as power is applied, or an application screen displayed according to the execution of a particular application (or function). The electronic device may perform a first function related to the first UI. In this case, the first function may be, for example, a function executed before a grip is identified or a function executed in response to the identified grip, which corresponds to a function related to the first UI.

In step 1103, the electronic device may detect a pressure signal indicating a level of pressure (for example, intensity, level, or position) applied to a sensor module (for example, the same as or similar to the sensor modules 203 of FIGS. 3AA to 3EB) installed in at least one area of a housing through at least one sensor (for example, the pressure sensor) in a state in which the first UI is displayed. According to an embodiment of the present disclosure, when a grip of a user's hand is identified, the electronic device may identify housing areas in contact with partial areas of the fingers or palm of the identified grip, and identify a pressure value to be compared with a preset threshold value based on pressure signals detected by at least one pressure sensor arranged in the identified housing areas. For example, when fingers come in contact with three areas of the housing areas in which the pressure sensors are installed, a processor of the electronic device may identify a pressure value included in each pressure signal detected by the pressure sensors installed in positions of the three areas or positions adjacent thereto. The electronic device may select the pressure value having the largest value among the identified pressure values, an average value of all the identified pressure values, or a pressure value received from the pressure sensor at a particular position set in accordance with the corresponding grip type as the pressure value to be compared with the threshold value.

In step 1105, the electronic device may determine whether the detected pressure signal, that is, the pressure value identified by the pressure signal, is greater than or equal to a first threshold value (for example, a preset value indicating a pressure intensity, level or position).

When the detected pressure signal is greater than or equal to the first threshold value based on the result of the determination, the electronic device may display at least one first item included in the first UI in a first display area on the display in step 1107. In contrast, when the detected pressure signal is less than the first threshold value, the electronic device may perform step 1101 again.

In step 1109, the electronic device may perform a second function and display a second UI related to the second function. The second UI may be displayed along with the first UI according to the operation in the form of accumulated layers or in the form of multiple screens. At least one second item included in the second UI may be displayed in a second display area.

According to an embodiment of the present disclosure, when the UIs are displayed in the form of accumulated layers, the electronic device may display the second UI on the displayed first UI in step 1109. In this case, the electronic device may transparently process and display a partial area (for example, a partial area in which the second items are not arranged) of the second UI corresponding to the first display area of the display.

According to an embodiment of the present disclosure, when the UIs are displayed in the form of multiple screens in step 1109, the electronic device may split the screen of the display into a plurality of display areas, and may change and display the size of the first UI in the split first display area or display a portion of the area of the first UI. The electronic device may display the second UI in the split second display area. The remaining areas of the first UI which are not displayed in the first display area may be displayed in the first display area according to a user's particular gesture (for example, a scroll or swipe).

In step 1111, the electronic device may detect a pressure signal through at least one pressure sensor in a state in which the first UI and the second UI are displayed together on the display.

In step 1113, the electronic device may determine whether the detected pressure signal is greater than or equal to a second threshold value. For example, the electronic device may compare the pressure value indicated by or included in the pressure signal to the second threshold value.

When the pressure signal is less than the second threshold value based on a result of the determination, the electronic device may maintain the display states of the displayed UIs displayed in step 1109, and perform step 1111. In contrast, when the pressure signal is greater than or equal to the second threshold value based on the result of the determination, the electronic device may perform step 1115.

In step 1115, the electronic device may perform a third function, set in accordance with the detected pressure signal, and display a third UI related to the third function. According to an embodiment of the present disclosure, the electronic device may display only the third UI on the display, or may display the second UI and the third UI together.

In step 1115, according to an embodiment of the present disclosure, when the third function is performed through an audio module or a haptic module, the electronic device may not display the third UI, but may maintain the current display state of the display or change and display the first and/or second UIs.

When the pressure signal is less than the first threshold value or there is no pressure signal (the state in which a hand grip is released) after step 1115, the electronic device may remove the displayed first UI or second UI, stop the execution of the first function or the second function, and then display only the third UI on the display.

Figure 12A:
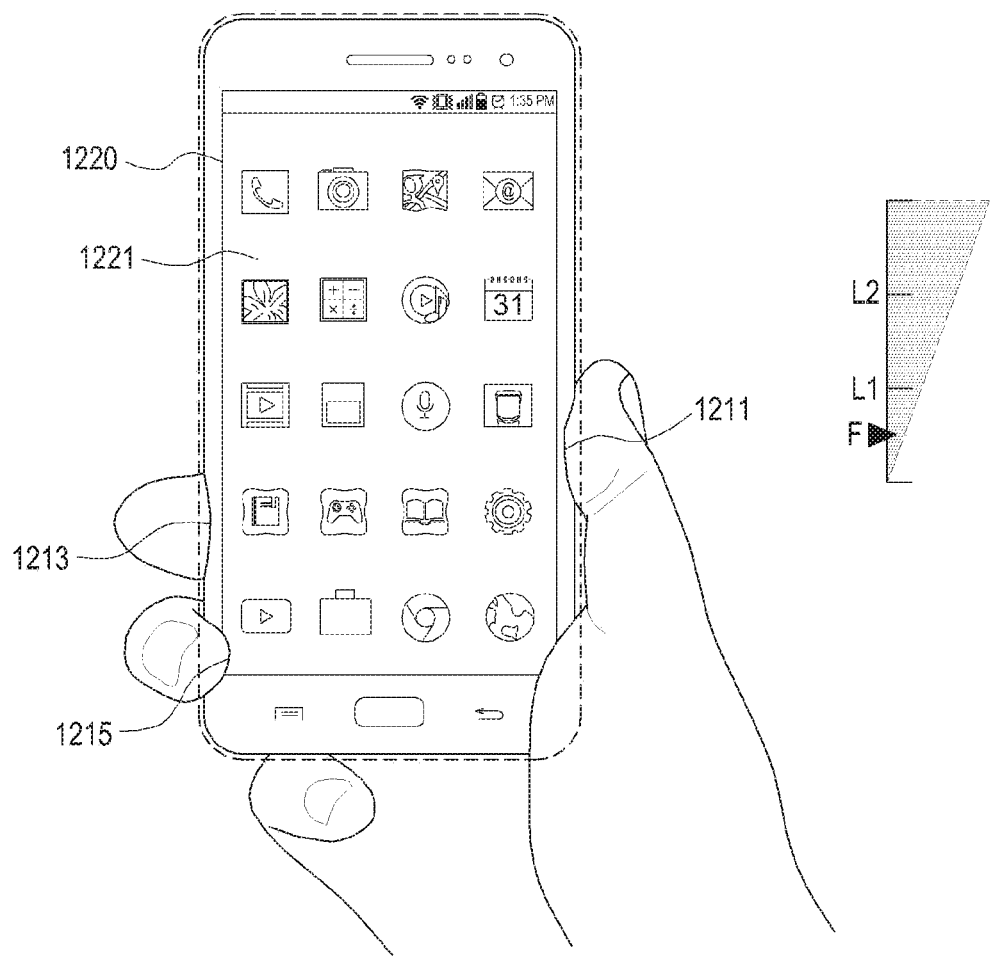
FIGS. 12A and 12B are illustrations of UIs on a display of an electronic device according to an embodiment of the present disclosure.
Figure 12B:
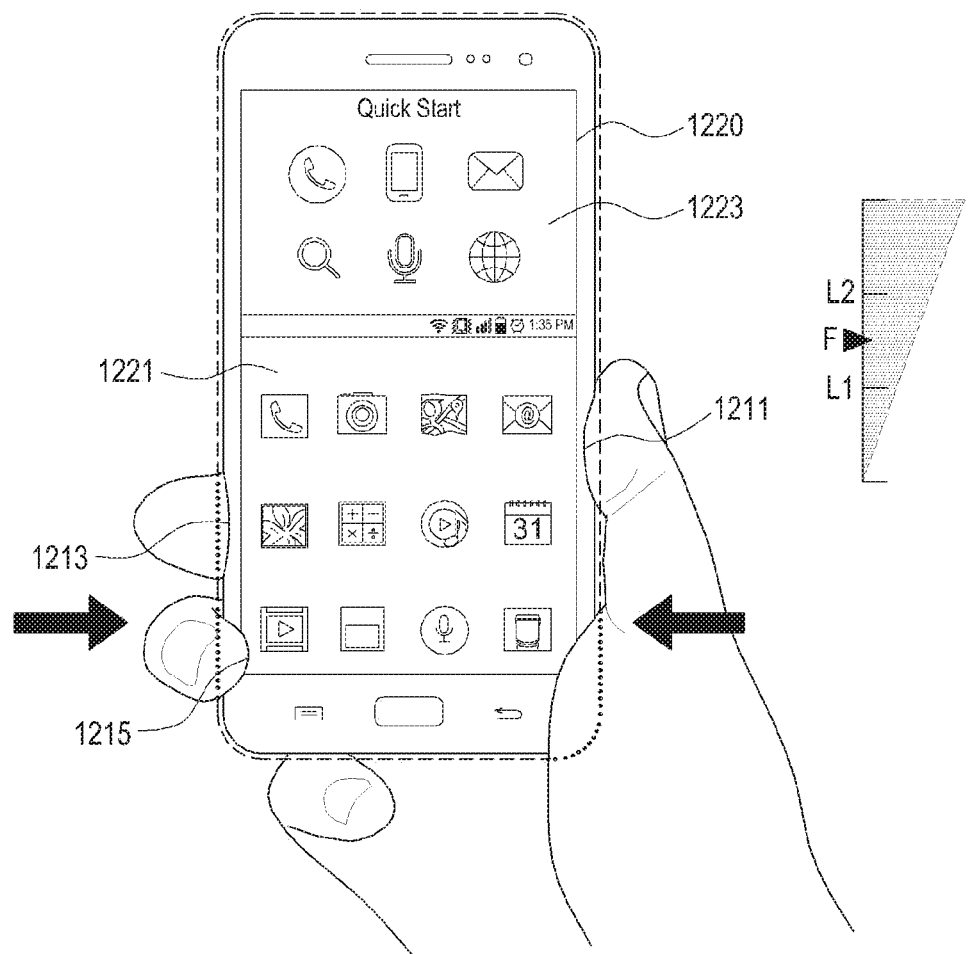

FIGS. 12A and 12B are illustrations of UIs on a display of an electronic device according to an embodiment of the present disclosure of the present disclosure.

Referring to FIG. 12A, in an idle state (for example, the idle mode of FIG. 7), the electronic device may detect a signal (for example, a grip detection signal) for a grip from, for example, at least one pressure sensor arranged in areas of a housing 1211, 1213, and 1215 in contact with a user's fingers, at least one touch sensor, or another sensor that may detect a grip When the grip by the user is detected, the electronic device may display a first UI 1221 including first items related to a first function (for example, home screen execution) on a display 1220. A first pixel value of screen coordinates (0, 0) may be set as a start position, and the first UI 1221 may be displayed on an entire area of the screen of the display 1220. Further, when the sensor arranged in the area of the housing 1211, 1213, and 1215 in contact with the user's finger is, for example, the pressure sensor, the electronic device may identify that a pressure value (F) indicated by or included in the detected signal (for example, grip detection signal) is less than a first threshold value (L1).

Referring to FIG. 12B, the electronic device according to an embodiment of the present disclosure may detect a pressure signal (a first pressure signal) from, for example, at least one pressure sensor arranged in the areas of the housing 1211, 1213, and 1215 in contact with the user's fingers in the state in which the first UI 1221 is displayed. In this case, the electronic device may identify that the pressure value (F) indicated by or included in the currently detected first pressure signal is greater than or equal to the first threshold value (L1). Accordingly, the electronic device may perform a second function (for example, quick start) set in accordance with the pressure value (F) and generate a second UI 1223 including second items related to the second function. Further, the electronic device may display a portion of the first UI 1221 including the first items in a first display area of the display 1220 and display the generated second UI 1223 in a second display area of the display 1220. A second pixel value of screen coordinates (0, 1280) is set as a start position, and the first UI 1221 may be displayed in the first display area of the screen of the display 1220.

Figure 13A:
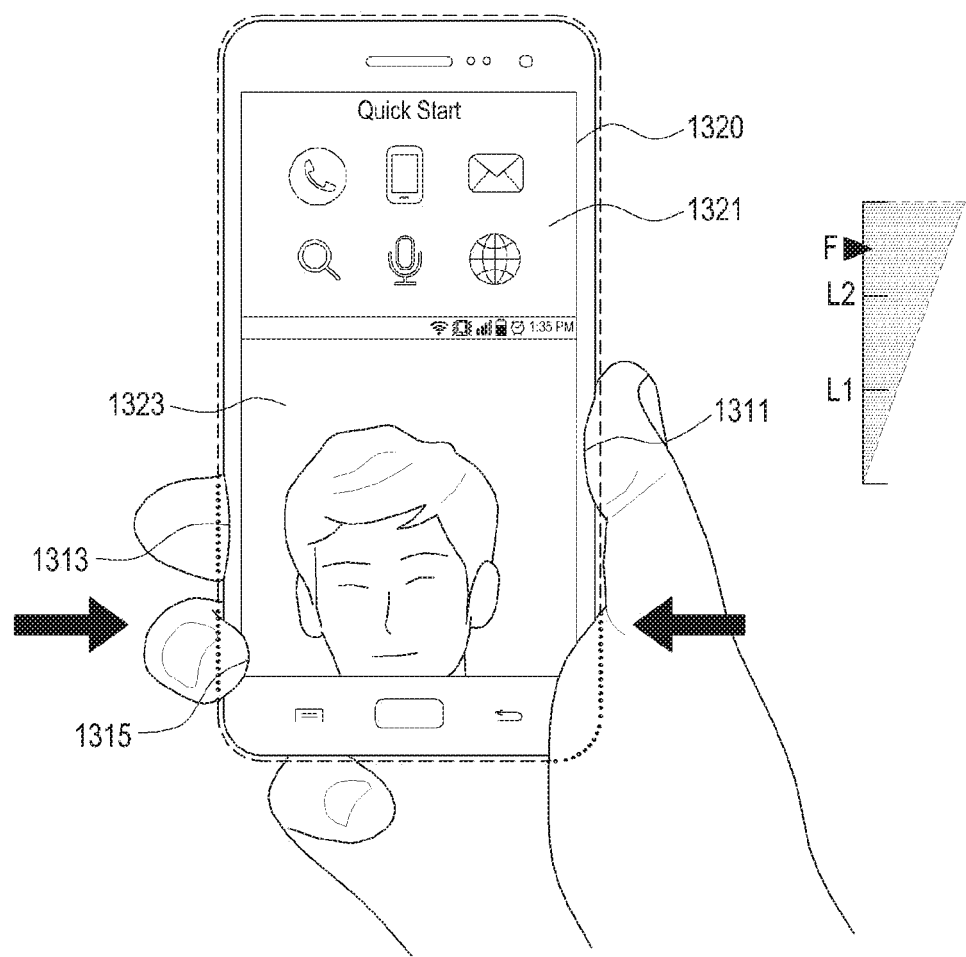
FIGS. 13A and 13B are illustrations of UIs on a display of an electronic device according to an embodiment of the present disclosure.
Figure 13B:
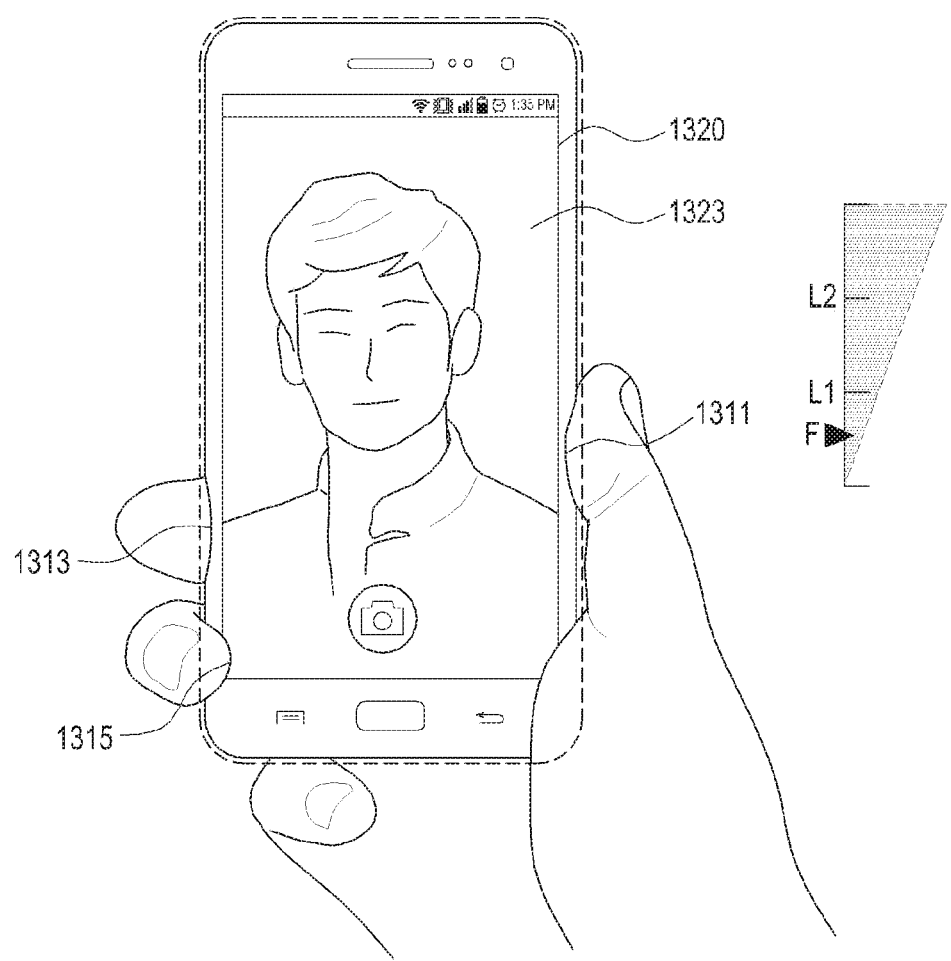

FIGS. 13A and 13B are illustrations of UIs on a display of an electronic device according to an embodiment of the present disclosure.

FIG. 13A illustrates a case in which greater pressure is applied in the display state of the display 1220 of FIG. 12B.

Referring to FIG. 13A, the electronic device may detect a pressure signal (a second pressure signal) from, for example, at least one pressure sensor arranged in areas of the housing (at least one of areas 1311, 1313, and 1315) in contact with a user's fingers. In this case, the electronic device may identify that a pressure value (F) indicated by or included in the detected second pressure signal is greater than a second threshold value (L2). Accordingly, the electronic device may perform a third function (for example, a camera function) set in accordance with the pressure value (F), and may remove the first UI displayed in the first display area of the display 1320 or stack a third UI 1323 related to the third function on the first UI, so as to display the third UI 1323 in the first display area. Further, the electronic device may maintain and display the second UI 1321 in the second display area. When a user's particular input (for example, a gesture input) is detected in the state in which the second pressure signal is maintained, the third UI 1323 is displayed, and the third function is performed, the electronic device may remove the third UI 1323 currently displayed in the first display area, display the previously displayed first UI again, and maintain the execution of the third function. In this case, the electronic device may perform the first function related to the first UI along with the currently performed third function.

Referring to FIG. 13B, the electronic device may detect a pressure signal (a third pressure signal (for example, the grip detection signal) from, for example, at least one pressure sensor arranged in areas of the housing 1311, 1313, and 1315 in contact with the user's fingers, or may detect no pressure in the state in which the third function is performed. In this case, the electronic device may identify that a pressure value (F) indicated by or included in the currently detected third pressure signal is less than the first threshold value (L1). Accordingly, the electronic device may display the third UI 1323 in an entire screen area of the display 1320 with a first pixel at screen coordinates (0, 0) as a start position while continuously performing the third function. The electronic device may stop the second function when the second UI 1321 is removed from the display 1320.

Figure 14A:
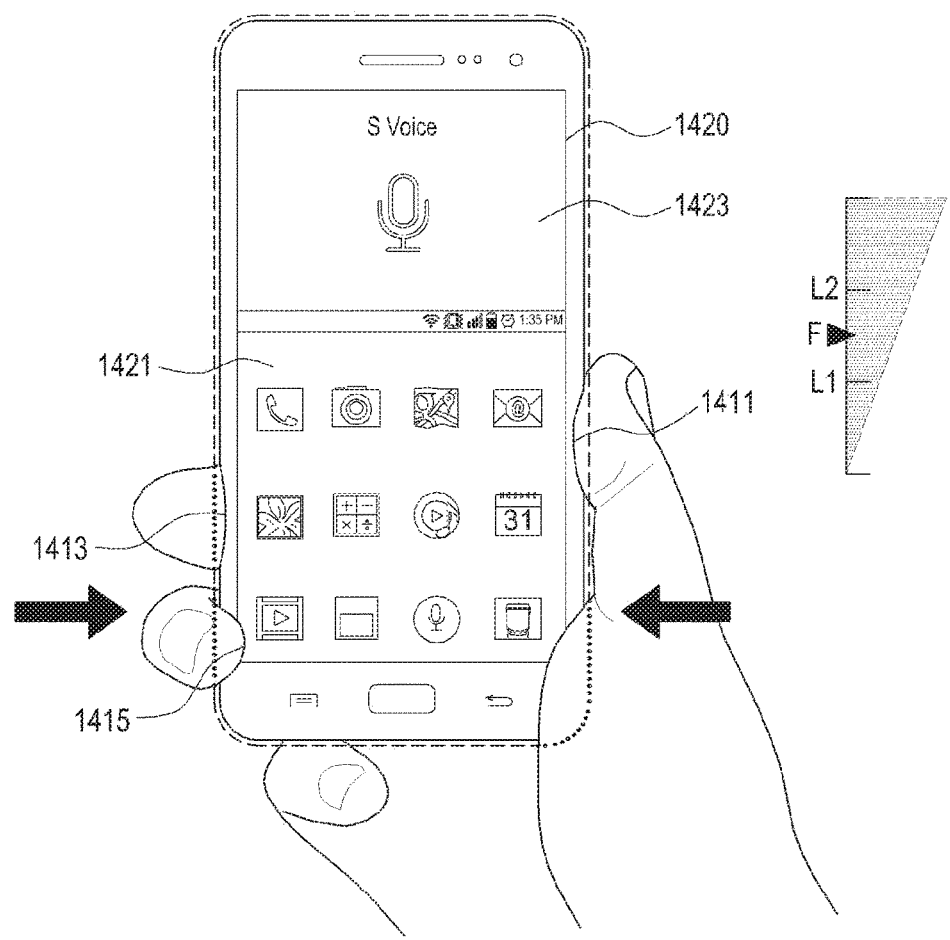
FIGS. 14A and 14B are illustrations of UIs on a display of an electronic device according to an embodiment of the present disclosure.
Figure 14B:
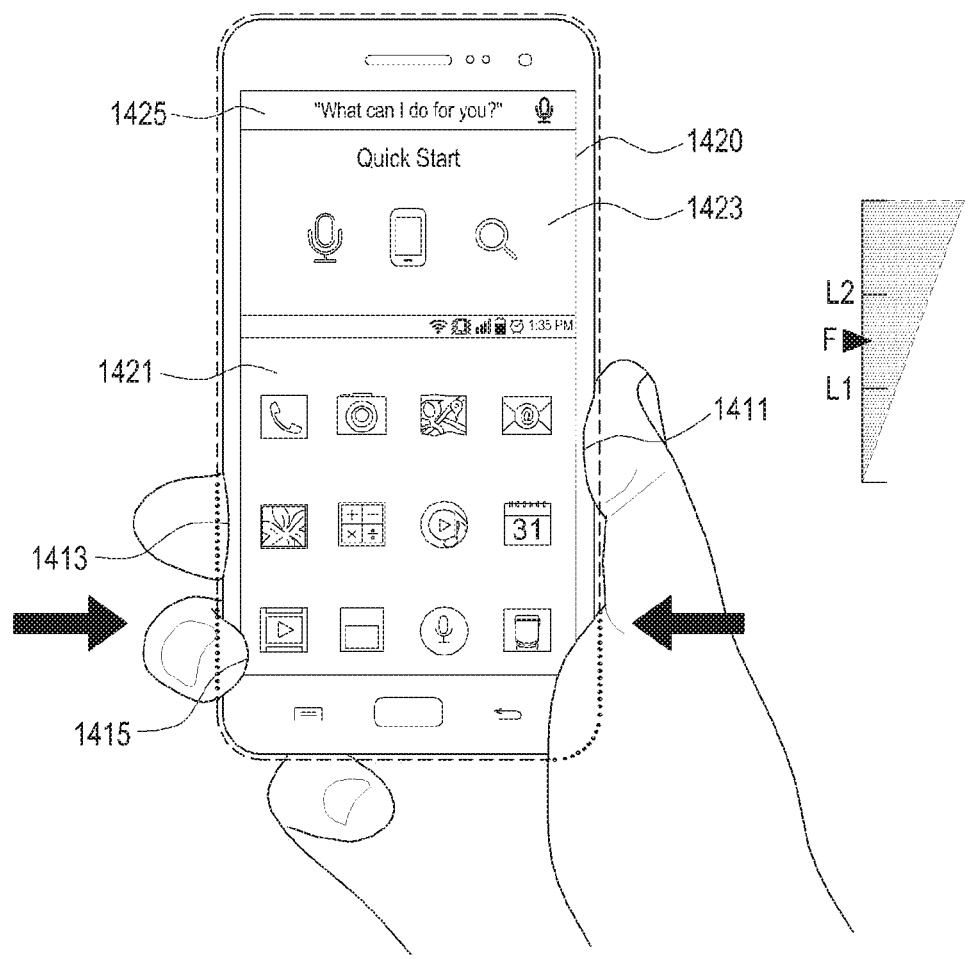

FIGS. 14A and 14B are illustrations of UIs on a display of an electronic device according to an embodiment of the present disclosure.

Referring to FIG. 14A, the electronic device may detect, for example, a first pressure signal from a pressure sensor arranged in areas of the housing (at least one of areas 1411, 1413, and 1415) in contact with the user's fingers. The electronic device may identify that a pressure value (F) indicated by or included in the first pressure signal is greater than or equal to the first threshold value (L1) and smaller than the second threshold value (L2). The electronic device may execute a second function (for example, a voice recognition function) according to the detection of the first pressure signal, and display a second UI 1423 related to the second function in a second display area of the display. A first UI 1421 may be displayed in a first display area of the display 1420 with, for example, a pixel value of particular coordinates (0, 1280) on the screen as a start position. The second UI 1423 may be displayed in the second display area of the display 1420 with, for example, a pixel value of particular coordinates (0, 0) on the screen as a start position. The electronic device may display the first display area and the second display area such that the first display area and the second display area are divided based on the specific housing area 1411.

Further, referring to FIG. 14B, the electronic device may detect, for example, the first pressure signal from at least one pressure sensor arranged in the areas of the housing 1411, 1413, and 1415 in contact with the user's fingers in the state in which the first UI 1421 and the second UI 1423 are displayed. In this case, the electronic device may identify that the pressure value (F) indicated by or included in the currently detected first pressure signal is greater than or equal to the first threshold value (L1) and less than the second threshold value (L2). Accordingly, the electronic device may perform a plurality of second functions set in accordance with the pressure value (F). For example, the electronic device may perform a quick start function, and may simultaneously or sequentially perform a plurality of second functions as functions for at least one of the items included in the quick start. The electronic device may display a plurality of second UIs 1423 and 1425 related to the second functions on the display. For example, the electronic device may simultaneously or sequentially display the UI 1423 for the quick start function and the UI 1425 for the function of at least one item included in the quick start. The electronic device may display a part of the first UI 1421 in the first display area of the display 1420, the second UI 1423 in the second display area of the display 1420, and the other second UI 1425 of the plurality of second UIs in a third display area of the display 1420. A first UI 1221 may be displayed in a first display area of the display 1420 with, for example, a pixel value of particular coordinates (0, 1280) on the screen as a start position. The second UI 1423 may be displayed in the second display area of the display 1420 with, for example, a pixel value of particular coordinates (0, 144) on the screen as a start position. Further, the other second UI 1425 may be displayed in the third display area of the display 1420 with, for example, a pixel value of particular coordinates (0, 0) on the screen as a start position.

In addition, as illustrated in FIGS. 14A and 14B, when the plurality of second functions is performed in the state in which the first UI 1421 and the second UI 1423 are displayed, the electronic device may maintain the display state of the display in the state of the screen example illustrated in FIG. 14A without displaying the other second UI related to the other second function of the plurality of second functions and perform the other second function. For example, when a voice recognition function is executed as the other second function, the electronic device may output information related to at least one item (for example, voice recognition information) included in the quick start through the audio module or the vibration module.

Figure 15A:
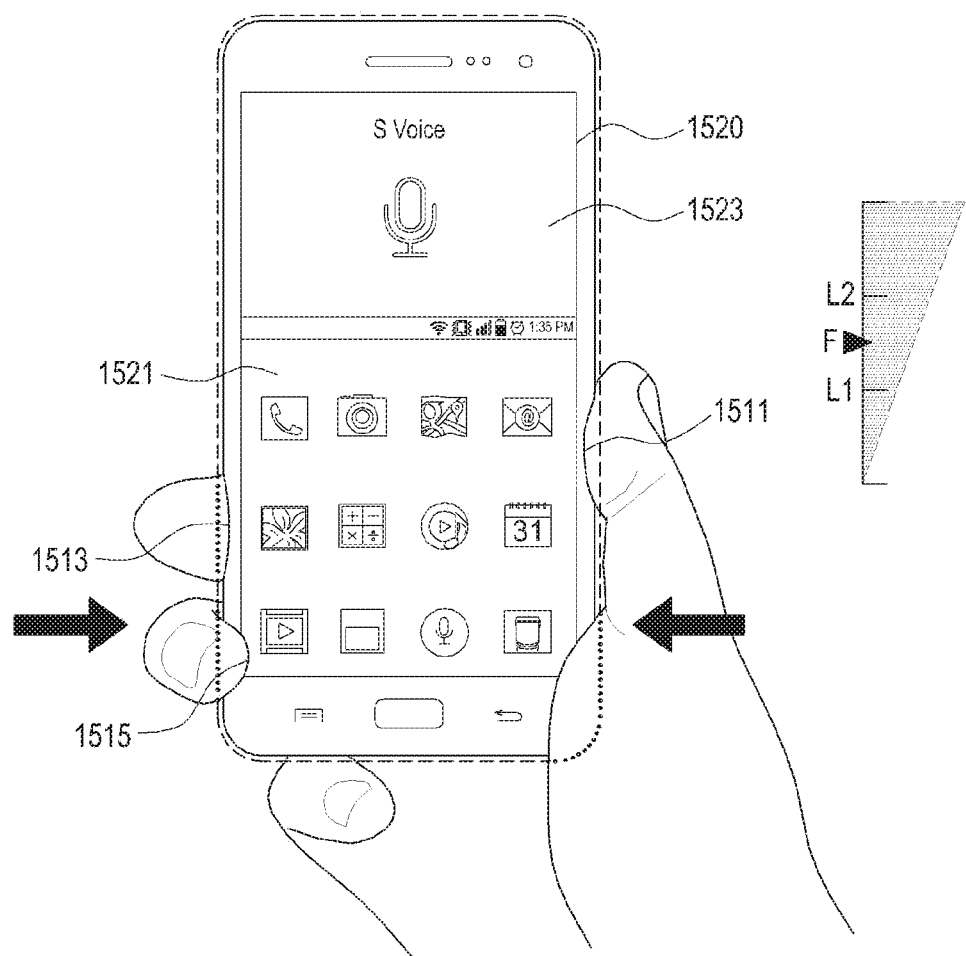
FIGS. 15A and 15B are illustrations of UIs on a display of an electronic device according to an embodiment of the present disclosure.
Figure 15B:
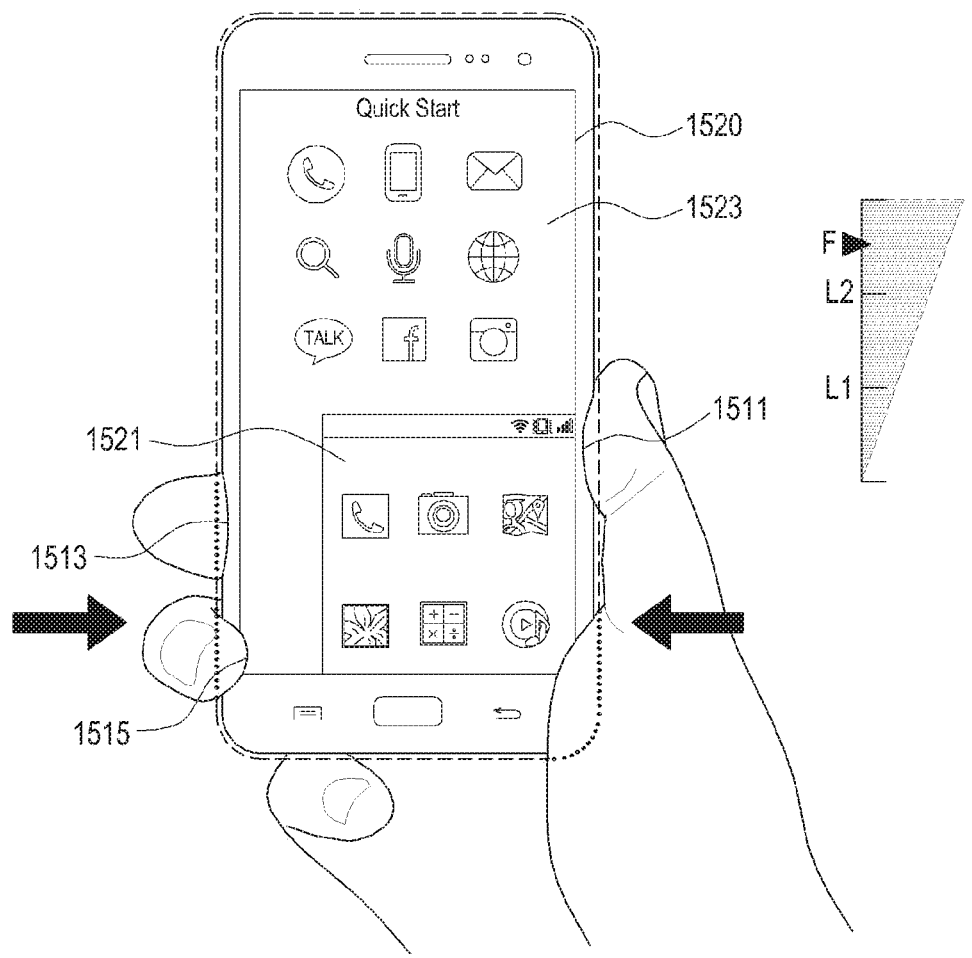

FIGS. 15A and 15B are illustrations of UIs on a display of an electronic device according to an embodiment of the present disclosure.

Referring to FIG. 15A, the electronic device may detect, for example, a first pressure signal from a pressure sensor arranged in areas of the housing (at least one of areas 1511, 1513, and 1515) in contact with the user's fingers. When the first pressure signal is detected, the electronic device may be executed in a first one-hand mode. The electronic device may identify that a pressure value (F) indicated by or included in the first pressure signal is greater than or equal to the first threshold value (L1) and less than the second threshold value (L2). The electronic device may execute a second function (for example, a voice recognition function) according to the detection of the first pressure signal, and display a second UI 1523 related to the second function in a second display area of the display. The second UI 1523 may be a UI related to an item such as an application program related to, for example, a call, a camera, voice recognition, a search, the Internet, a message or, a chat message as well as the function for the voice recognition. A first UI 1521 may be displayed in a first display area of the display 1220 with, for example, a pixel value of particular coordinates (0, 1280) on the screen as a start position. The second UI 1523 may be displayed in the second display area of the display 1520 with, for example, a pixel value of particular coordinates (0, 0) on the screen as a start position.

Referring to FIG. 15B, when a second pressure signal (for example, a pressure signal greater than or equal to the second threshold value (L2) is detected in the state in which the UIs 1521 and 1523 are displayed, that is, in the first one-hand mode state as illustrated in FIG. 15A, the electronic device may switch the first one-hand mode to a second one-hand mode, and may move the display position of the first UI 1521, change the size, or reconfigure the first UI 1521 such that at least one item included in the first user display area 1521 can be selected. The electronic device may display again the first UI 1521, which has been moved, the size of which has been changed, or which has been reconfigured, in the display area, which can be selected by the finger 1511 gripping the area 1511 of the housing in the second one-hand mode state. The re-displayed first UI 1521 may be displayed in a partial area 1525 of the first display area with, for example, a pixel value of coordinates (144, 1680) changed from the pixel value of the particular coordinates (0, 1280) on the screen as a start position. The first and second one-hand modes may be modes for controlling the terminal with one hand, and may refer to, for example, modes in which items displayed on the display can be controlled through a particular finger 1511 of one hand gripping the electronic device.

Figure 16A:
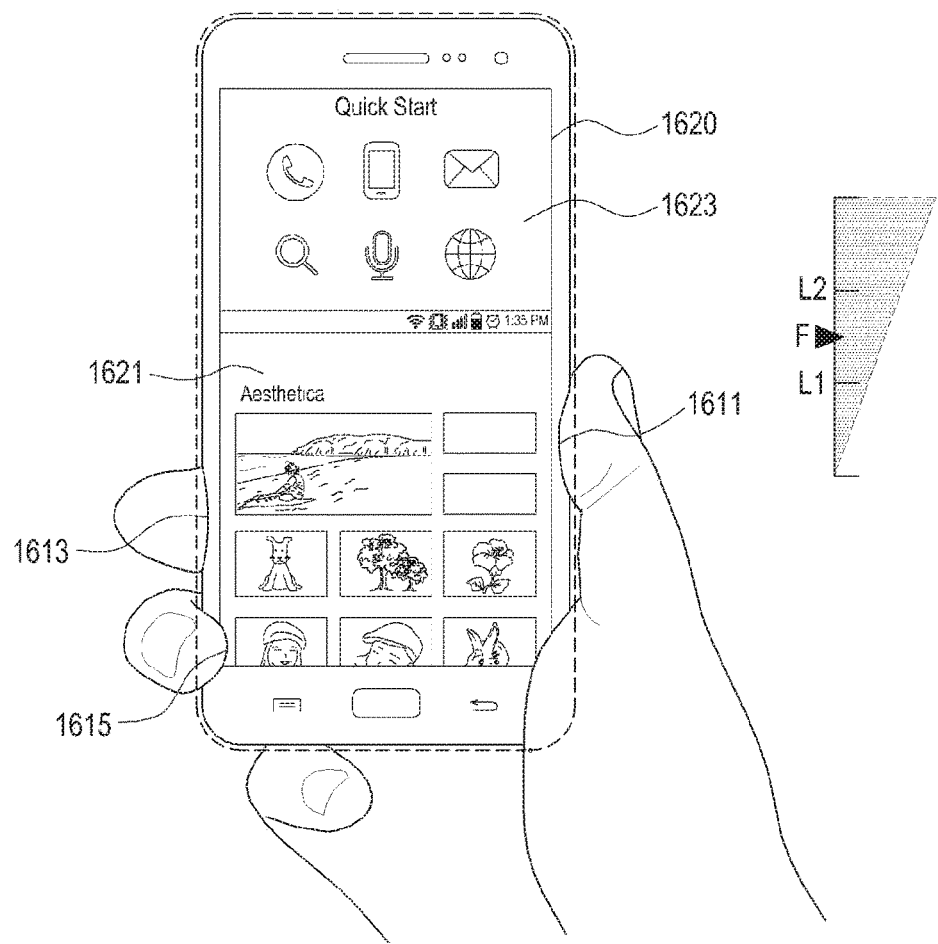
FIGS. 16A and 16B are illustrations of UIs on a display of an electronic device according to an embodiment of the present disclosure.
Figure 16B:
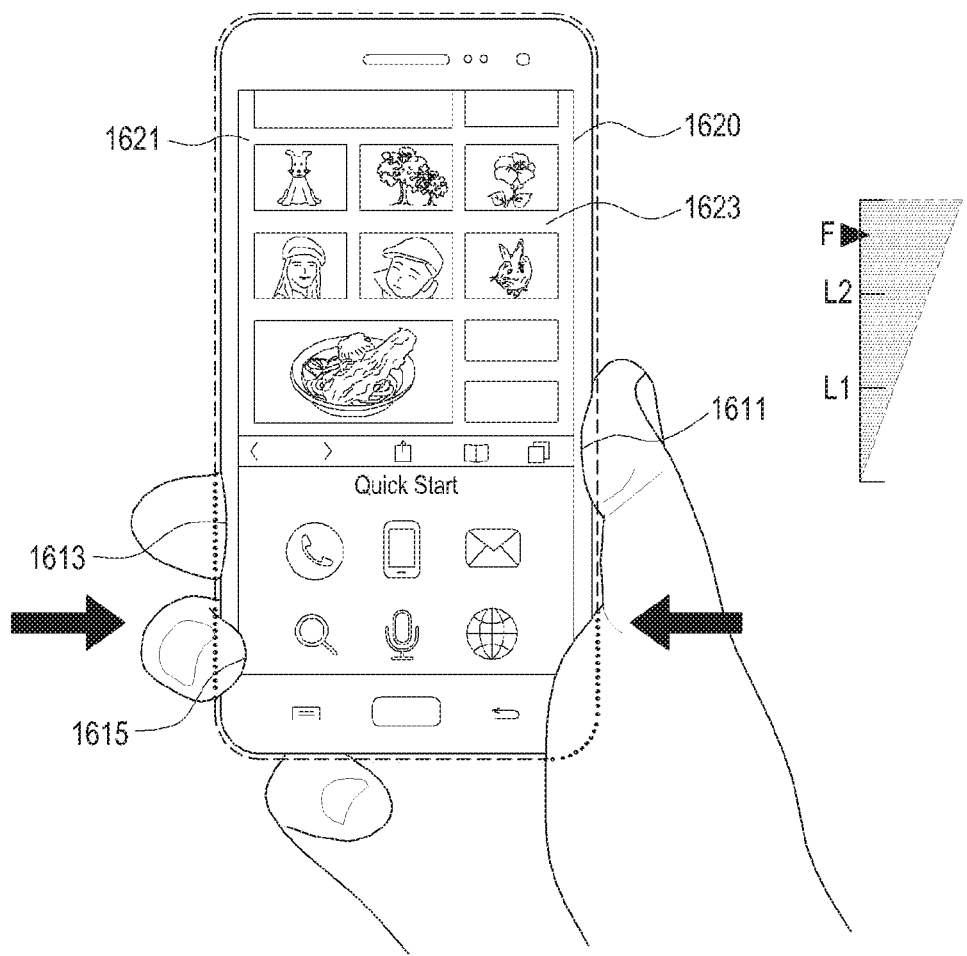

FIGS. 16A and 16B are illustrations of UIs on a display of an electronic device according to an embodiment of the present disclosure.

Referring to FIG. 16A, the electronic device may detect, for example, a first pressure signal from a pressure sensor arranged in areas of the housing (at least one of areas 1611, 1613, and 1615) in contact with the user's fingers in the state in which a first UI 1621 related to a first function (for example, the Internet) is displayed. The electronic device may identify that a pressure value (F) indicated by or included in the first pressure signal is greater than or equal to the first threshold value (L1) and less than the second threshold value (L2). The electronic device may execute a first one-hand mode as the first pressure signal is detected. The electronic device may perform a second function (for example, a quick start function) in the first one-hand mode state, and may display a second UI 1623 related to the second function in a second display area of the display. In this case, the electronic device may control the first UI 1621 (for example, at least one of changing the size, moving the display position, and reconfiguring the first UI 1621) and display the controlled first UI in the first display area. The first UI 1621 may be displayed in the first display area of the display 1620 with, for example, a pixel value of particular coordinates (0, 1280) on the screen as a start position. The second UI 1623 may be displayed in the second display area of the display 1620 with, for example, a pixel value of particular coordinates (0, 0) on the screen as a start position.

Referring to FIG. 16B, in the state in which the UIs 1621 and 1623 are displayed on the display 1620 as illustrated in FIG. 16A, the electronic device may detect a second pressure signal from the pressure sensor arranged in the areas of the housing 1611, 1613, and 1615 that are in contact with the user's fingers. When the second pressure signal is detected, the electronic device may switch the first one-hand mode to a second one-hand mode. The electronic device may identify that a pressure value (F) indicated by or included in the second pressure signal is greater than or equal to the second threshold value (L2). The electronic device may exchange and display the display positions of the first user display area 1621 and the second user display area 1623 in the second one-hand mode state. When the display positions are exchanged and displayed, the electronic device may expand the display area (for example, the first display area) to display the second UI 1623 and the display area (for example, the second display area) to display the first UI 1621 in the second one-hand mode, and reconfigure the display areas of the screen. Further, when the display positions are exchanged and displayed, the electronic device may stack and display the second UI 1623 on the first UI 1621. In addition, the electronic device may transparently process a partial area of the second UI 1623 accumulated on the top, for example, a partial area of the second UI 1623 corresponding to the second display area of the display 1620. Accordingly, at least a part of the first UI 1621 displayed on the bottom may be displayed through the partial area of the second UI 1623, which has been processed as being transparent.

Figure 17:
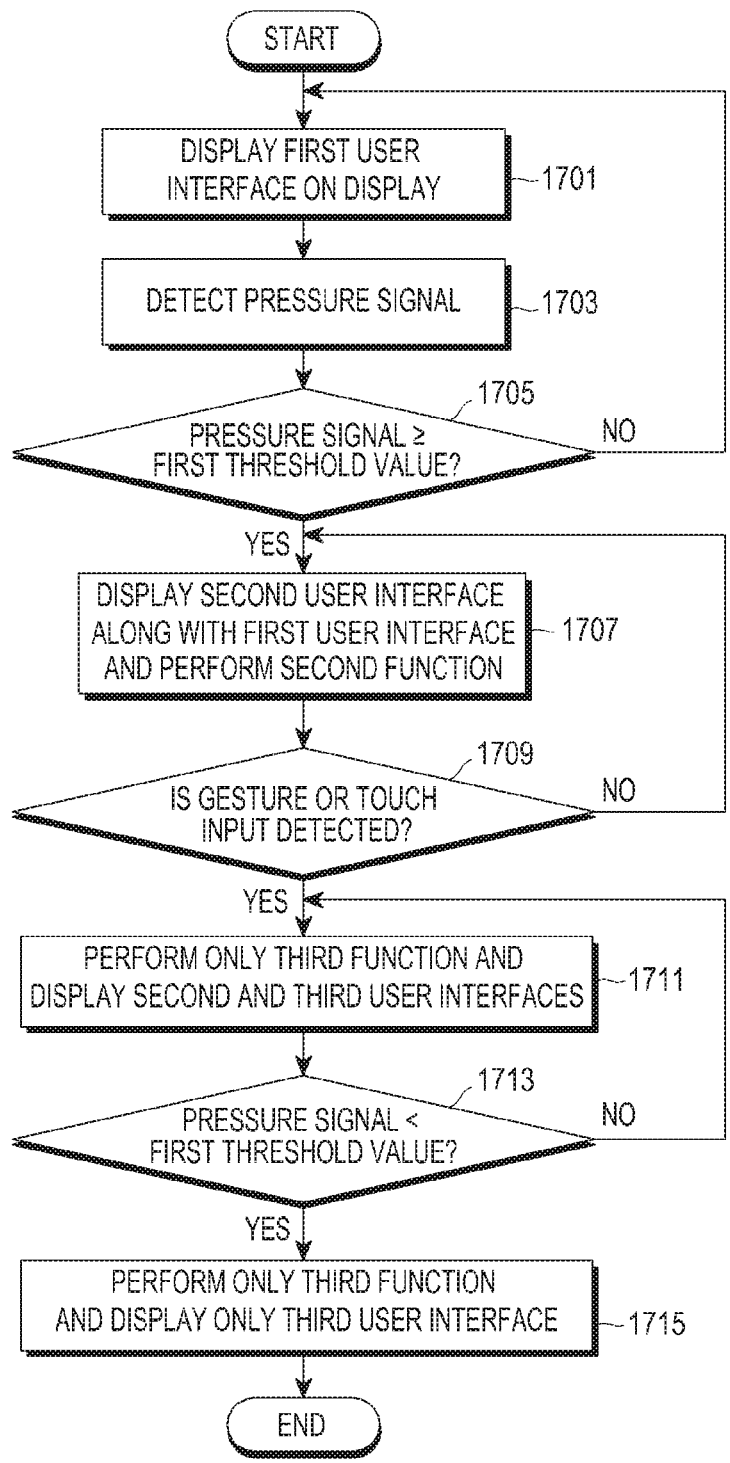
FIG. 17 is a flowchart of an operation procedure of an electronic device according to an embodiment of the present disclosure.

FIG. 17 is a flowchart of an operation procedure of the electronic device according to an embodiment of the present disclosure.

Referring to FIG. 17, the operation procedure of the electronic device may be one of the various embodiments of the present disclosure based on FIG. 10.

When a plurality of UIs is displayed on a display, the electronic device (for example, the electronic device 101 of FIG. 1, the electronic device 203 of FIGS. 3AA-3EB, or the electronic device 400 of FIGS. 4A and 4B) of the electronic device may display the UIs, for example, in the form of accumulated layers or in the form of multiple screens.

In step 1701, the electronic device may display a first UI including at least one first item on the display. The first UI may be, for example, a home screen initially displayed after the electronic device is booted and operated as power is applied or an application screen displayed according to the execution of a particular application (or function). Further, the electronic device may perform a first function related to the first UI. In this case, the first function may be, for example, a function executed before a grip is identified or a function executed in response to the identified grip, which corresponds to a function related to the first UI.

In step 1703, the electronic device may detect a pressure signal indicating a level of pressure (for example, intensity, level, or position) applied to a sensor module (for example, the same as or similar to the sensor modules 203 of FIGS. 3AA to 3EB) installed in at least one area of the housing through at least one sensor (for example, the pressure sensor) in the state in which the first UI is displayed. When a grip by the user's hand is identified, the electronic device may identify housing areas in contact with a partial area of the fingers or palm of the identified grip. The electronic device may identify a pressure value to be compared with a preset threshold value based on pressure signals detected by at least one pressure sensor arranged in the identified housing areas. For example, when the fingers come into contact with three areas of the housing areas in which the pressure sensors are installed, the processor of the electronic device may identify a pressure value included in each pressure signal detected by the pressure sensors installed at positions of the three areas or adjacent positions. The electronic device may select the pressure value having the greatest value among the identified pressure values, the average of all the identified pressure values, or a pressure value received from the pressure sensor at a particular position set in accordance with the corresponding grip type as the pressure value to be compared with the threshold value.

In step 1705, the electronic device may determine whether the detected pressure signal, that is, the pressure value identified by the pressure signal, is greater than or equal to the first threshold value (for example, a preset value indicating a pressure intensity, level or position) in the state in which the first UI is displayed.

When the detected pressure signal is less than the first threshold value based on a result of the determination, the electronic device may perform step 1701. In contrast, when the detected pressure signal is greater than or equal to the first threshold value, the electronic device may perform step 1707.

In step 1707, the electronic device may perform a second function and display a second UI related to the second function. The second function may be a function for detecting, for example, a user's gesture or touch input through a motion sensor of the electronic device. The second UI may be displayed along with the first UI according to the operation in the form of accumulated layers or in the form of multiple screens. At least one second item included in the second UI may be displayed in a second display area. When the pressure signal is detected, the electronic device may perform the second function in the state in which the first function is performed.

According to an embodiment of the present disclosure, when the UIs are displayed in the form of accumulated layers, the electronic device may accumulate and display the second UI on the first UI in step 1707. In this case, the electronic device may transparently process and display some areas (for example, some areas in which the second items are not arranged) of the second UI corresponding to the first display area of the display.

According to an embodiment of the present disclosure, when the UIs are displayed in the form of multiple screens, the electronic device may split the screen of the display into a plurality of display areas and reconfigure the screen as multiple screens, and may change and display the size of the first UI in the split first display area or display a partial area of the first UI in step 1707. The remaining areas of the first UI, which are not displayed in the first display area, may be displayed to be shown in the first display area according to a user's particular gesture (for example, scroll or swipe). Further, the electronic device may display the second UI in the split second display area.

In step 1709, the electronic device may identify whether a predetermined touch or gesture input is detected through at least one touch sensor or various sensors capable of detecting a gesture. When no touch or gesture input is detected based on a result of the identification, the electronic device may perform step 1707. When the touch or the gesture input is detected, the electronic device may perform step 1711. According to an embodiment of the present disclosure, the electronic device may detect a gesture input or a touch input for selecting at least one item included in the first UI or the second UI displayed on the display according to the execution of the second function.

When the predetermined gesture input or touch input is detected, the electronic device may perform a third function and display a third UI related to the third function on the display in step 1711. In this case, the electronic device may remove the first UI displayed on the display, and display the third UI along with the second UI. Further, the electronic device may stop the first function corresponding to the first UI.

In step 1713, the electronic device may identify whether the pressure signal is changed within a predetermined range or more in the state in which the third function is performed. According to an embodiment of the present disclosure, when the currently detected pressure signal is greater than or equal to the first threshold value, or is greater than or equal to the first threshold value and less than the second threshold value, the electronic device may maintain the current state and continuously perform step 1711. When the currently detected pressure signal is changed to be less than the first threshold value based on the result of the identification, the electronic device may perform step 1715. When the pressure signal is continuously detected by at least one pressure sensor and is then not detected any longer for a predetermined time, the electronic device may perform step 1715.

In step 1715, the electronic device may identify that the pressure applied to at least one area of the gripped areas is changed, maintain the execution of a function for an item set or selected in accordance with the touch or the gesture input in response to the detected touch or gesture input, and display only the third UI related to the third function on the display. In this case, according to an embodiment of the present disclosure, since the currently detected pressure signal is less than the first threshold value or no input signal is detected, the electronic device may remove both the first UI and the second UI displayed in step 1707, stop the execution of the first function and the second function, execute only the third function, and then display only the third UI on the display.

Figure 18A:
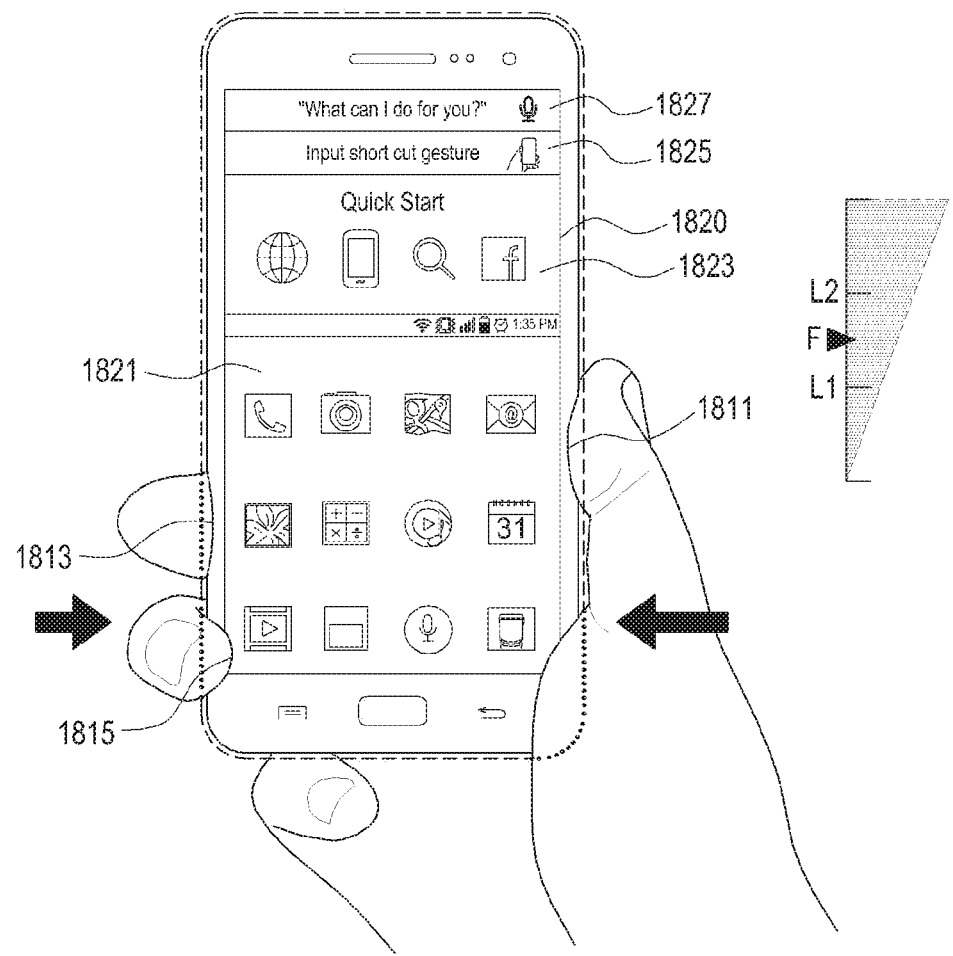
FIGS. 18A, 18B, and 18C are illustrations of UIs on a display of an electronic device according to an embodiment of the present disclosure.
Figure 18B:
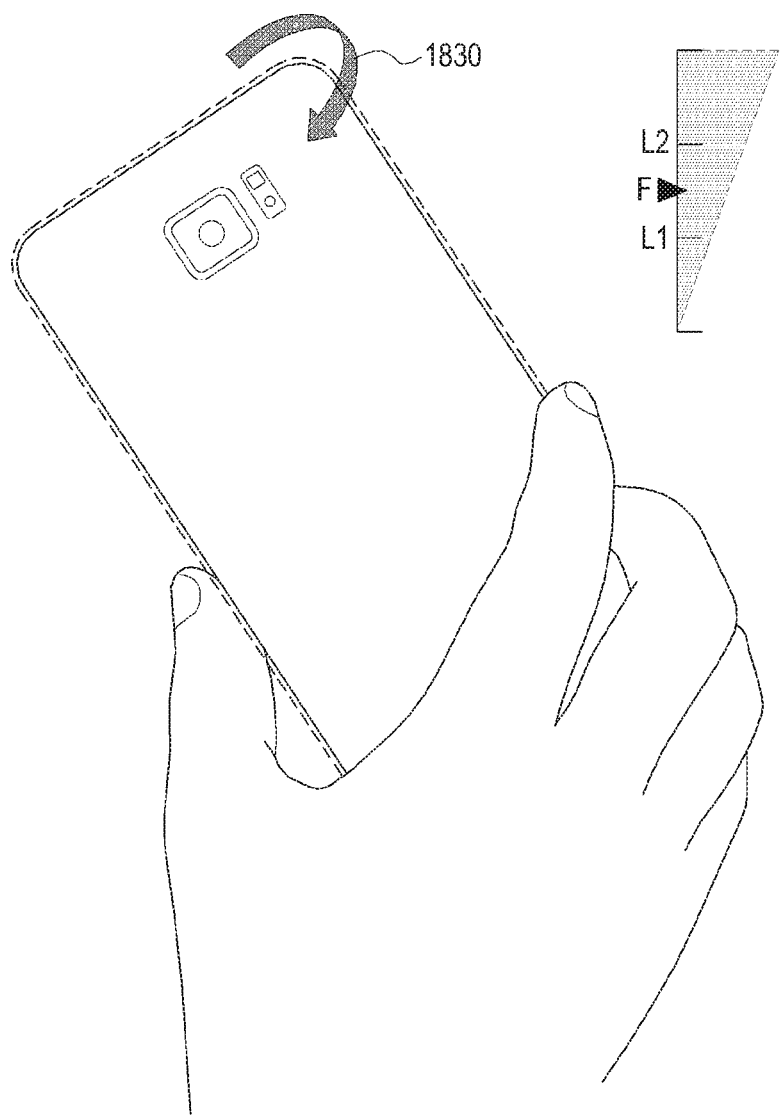
Figure 18C:
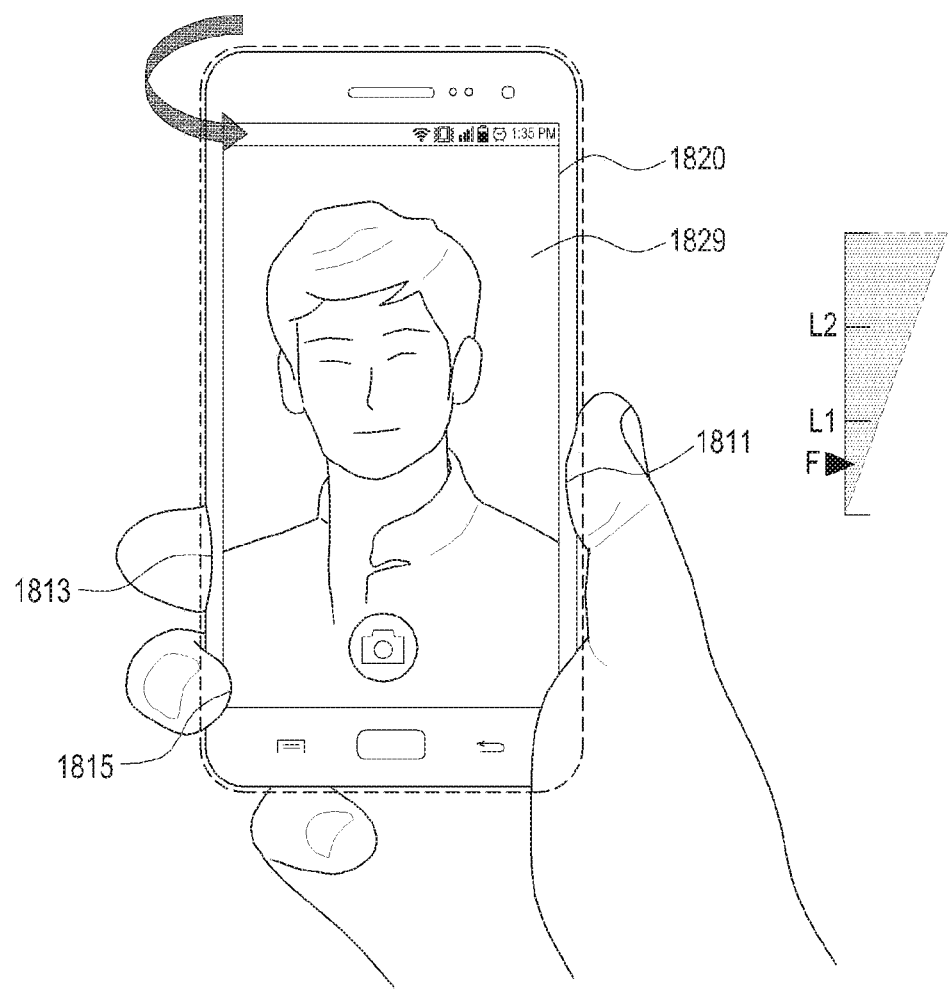

FIGS. 18A, 18B, and 18C are illustrations of UIs on a display of an electronic device according to an embodiment of the present disclosure.

Referring to FIG. 18A, when a pressure signal (a first pressure signal) is detected by at least one pressure sensor arranged in areas of a housing (at least one of areas 1811, 1813, and 1815) in contact with a user's fingers, the electronic device may identify that a pressure value (F) indicated by or included in the currently detected first pressure signal is greater than or equal to the first threshold value (L1). Accordingly, the electronic device may execute a plurality of functions (for example, quick start, a gesture recognition function, or a voice recognition function) set in accordance with the pressure value (F), and generate different UIs 1823, 1825, and 1827 set in accordance with the respective functions. Further, the electronic device may display a part of a first UI 1821 related to a previously executed first function including first items in a first display area of a display 1820, and display newly generated UIs 1823, 1825, and 1827 in respective remaining display areas other than the first display area. The first UI 1821 may be displayed in the first display area of the display 1820, with a second pixel value of screen coordinates (0, 1280) as a start position. Further, the other UIs 1823, 1825, and 1827 may be simultaneously or sequentially displayed.

Referring to FIGS. 18B and 18C, the electronic device may continuously detect the first pressure signal, as illustrated in FIG. 18A, and detect a gesture input through a gesture recognition function executed in connection with the newly generated UI 1825 in a state in which the first UI 1821 and the other UIs 1823, 1825, and 1827 are maintained on the display. When the gesture input is detected, the electronic device may execute the operation of the function set in accordance with the gesture input, for example, a camera function, remove the first UI 1821, and display a UI 1829 related to the camera function on the display 1820. Thereafter, the pressure value (F) of the detected pressure signal may be a signal less than the first threshold value, and no pressure signal may be detected by at least one pressure sensor. Further, the electronic device may remove the UIs 1821, 1823, 1825, and 1827 displayed on the display 1820 as illustrated in FIG. 18A, and may display only the UI 1829 related to the camera function on the display 1820. In addition, the electronic device may stop the previously executed functions and may execute only the camera function.

Figure 19A:
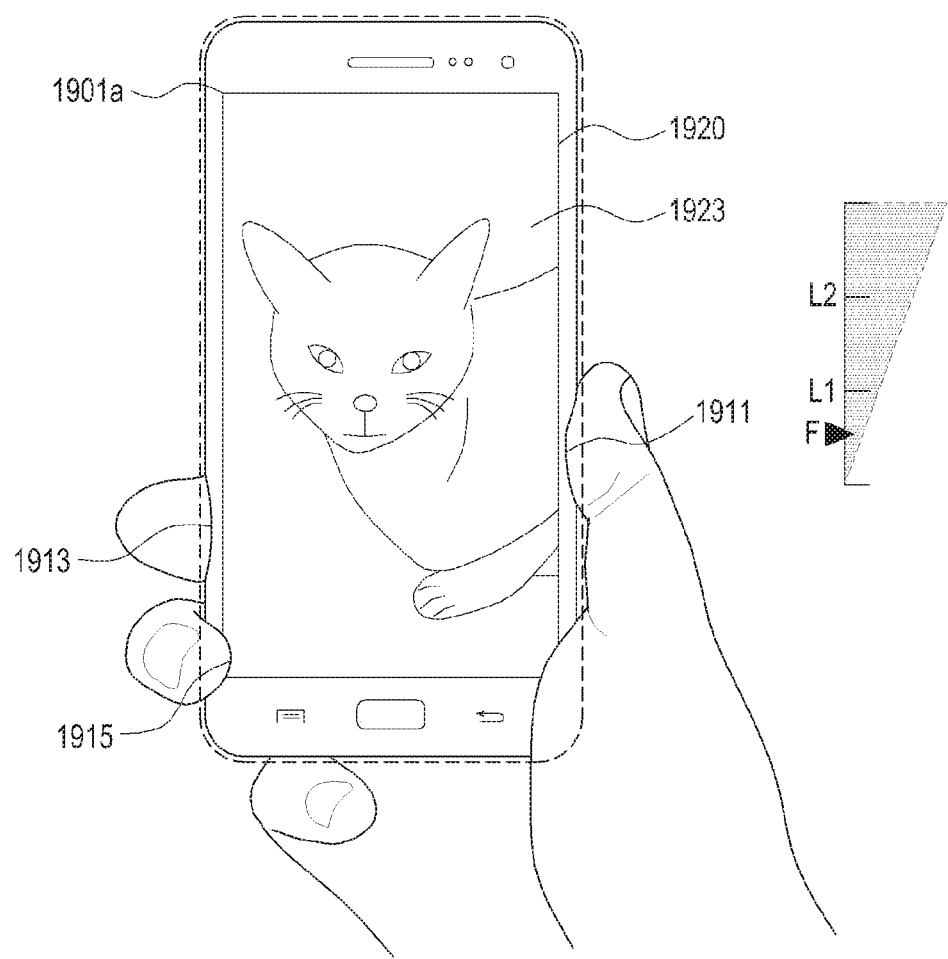
FIGS. 19A and 19B are illustrations of UIs on a display of an electronic device according to an embodiment of the present disclosure.
Figure 19B:
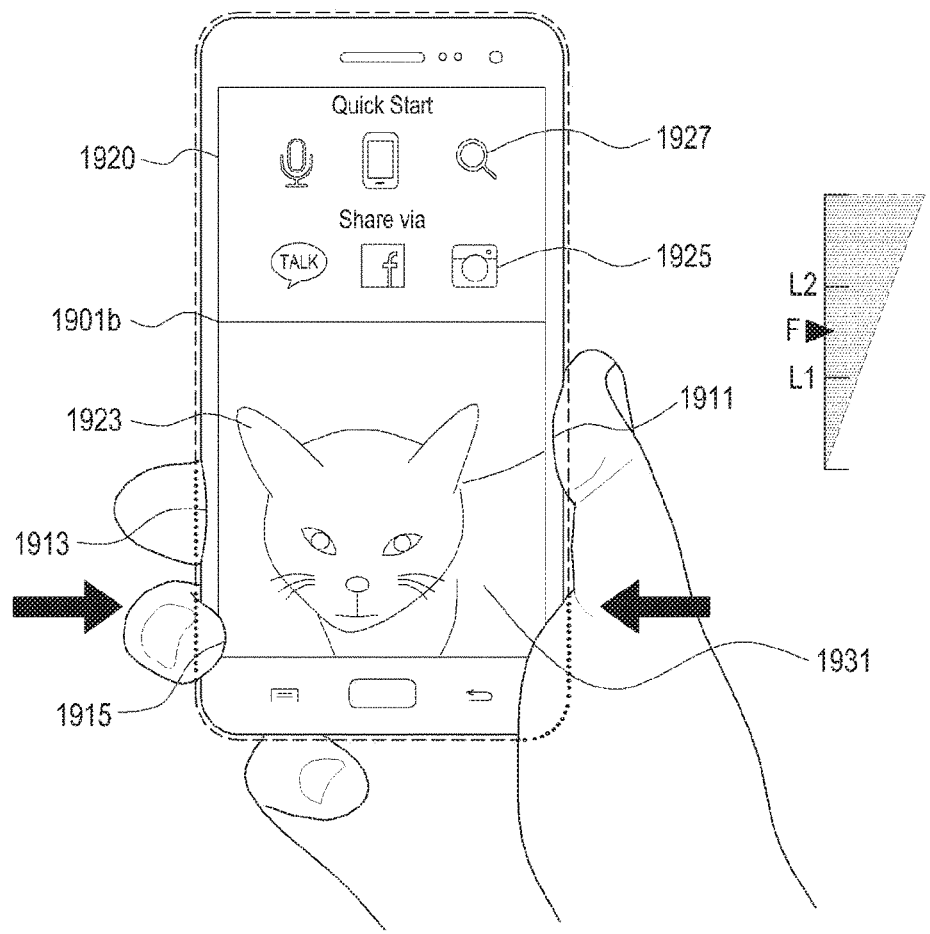

FIGS. 19A and 19B are illustrations of UIs on a display of an electronic device according to an embodiment of the present disclosure.

Referring to FIGS. 19A and 19B, when a selection of at least one of the items displayed on a display 1920 is detected, the electronic device may display a UI 1923 including the selected item 1931 on the display 1920. The displayed UI 1923 may be displayed in a display area with, for example, a pixel value of particular screen coordinates (0, 0) as a start position.

Referring to FIG. 19B, the electronic device may detect a pressure signal (a first pressure signal) through at least one pressure sensor arranged in areas of the housing (at least one of areas 1911, 1913, and 1915) in contact with the user's fingers. Accordingly, while performing a plurality of second functions (for example, quick start and a sharing function (share via)), the electronic device may display a plurality of items (i.e., buttons or applications) 1925 and 1927 related to the second functions in a second display area of the display 1920 with a first pixel value of particular coordinates (0, 0) 1901a on the screen as a start position. In this case, the first UI 1923 may be displayed in a first display area of the display 1920 with a second pixel value of particular coordinates (0, 1280) 1901b on the screen as a start position. The second UI may be determined based on the first UI. For example, the electronic device may execute the sharing function (share via) as the second function which may directly share the first UI, based on the first UI (for example, image content selected in a gallery application), and display the item 1925 including items related to the executed sharing function.

Figure 20A:
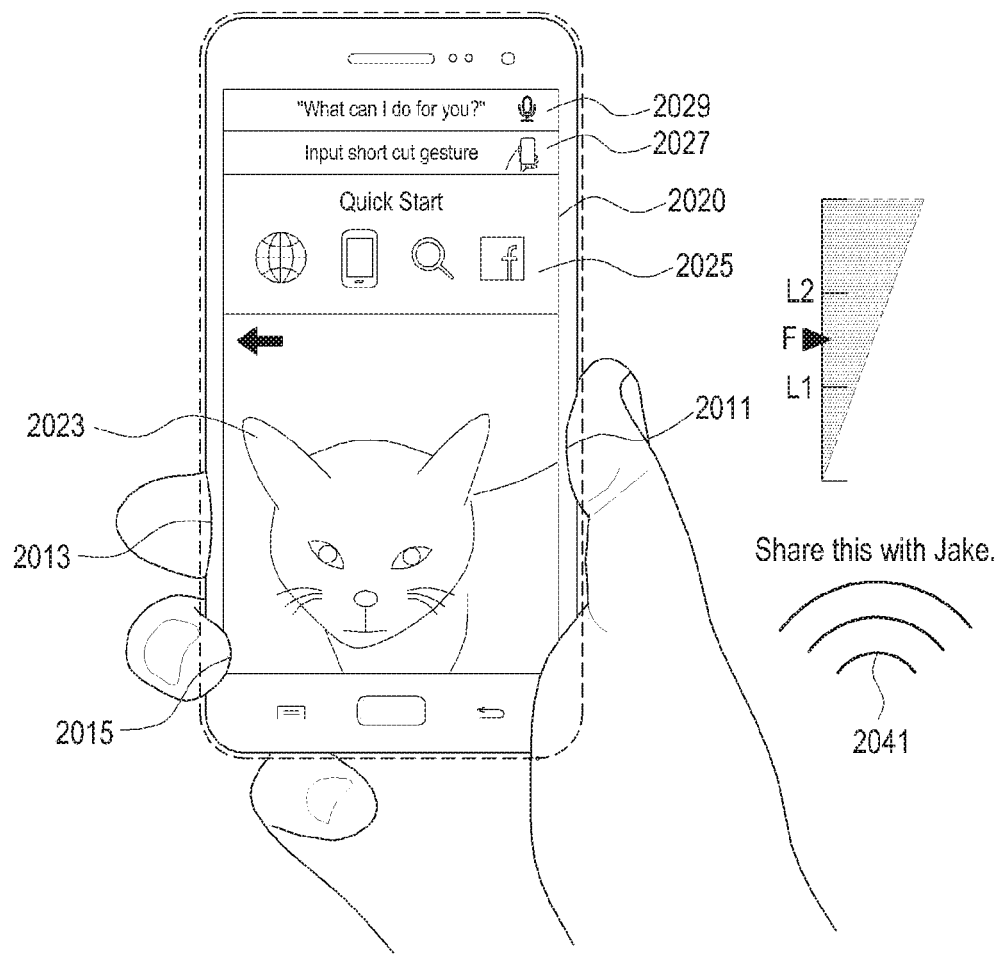
FIGS. 20A and 20B are illustrations of UIs on a display of an electronic device according to an embodiment of the present disclosure.
Figure 20B:
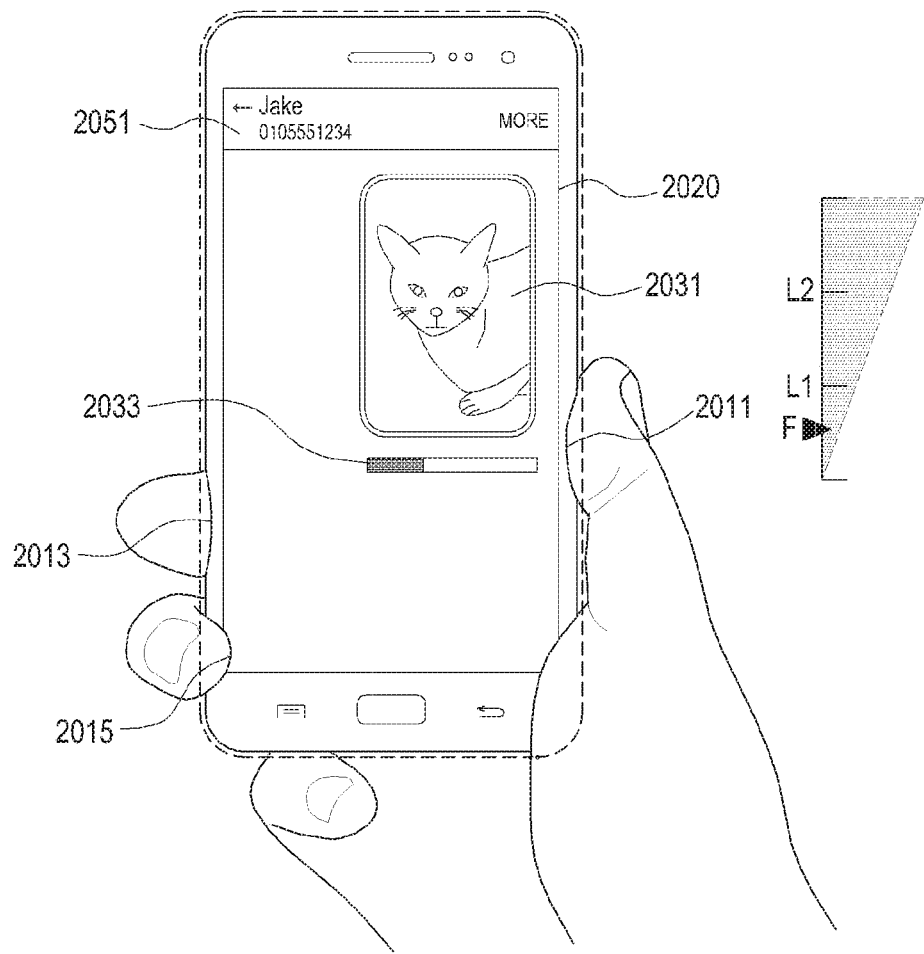

FIGS. 20A and 20B are illustrations of UIs on a display of an electronic device according to an embodiment of the present disclosure.

Referring to FIG. 20A, the electronic device may display a first UI 2023 and a plurality of second UIs 2025, 2027, and 2029 on a display 2020. Further, the electronic device may perform each of the functions related to the plurality of displayed second UIs 2025, 2027, and 2029. For example, when the function related to the specific second UI 2029 is a voice recognition function, the electronic device may receive a voice 2041 through a voice recognition means such as a microphone.

Further, as illustrated in FIG. 20B, the electronic device may perform a third function for transmitting an item 2031 included in the first UI 2023 based on the voice input, and may display a third UI 2051 including items 2031 and 2033 related to the third function on the display 2020.

Figure 21:
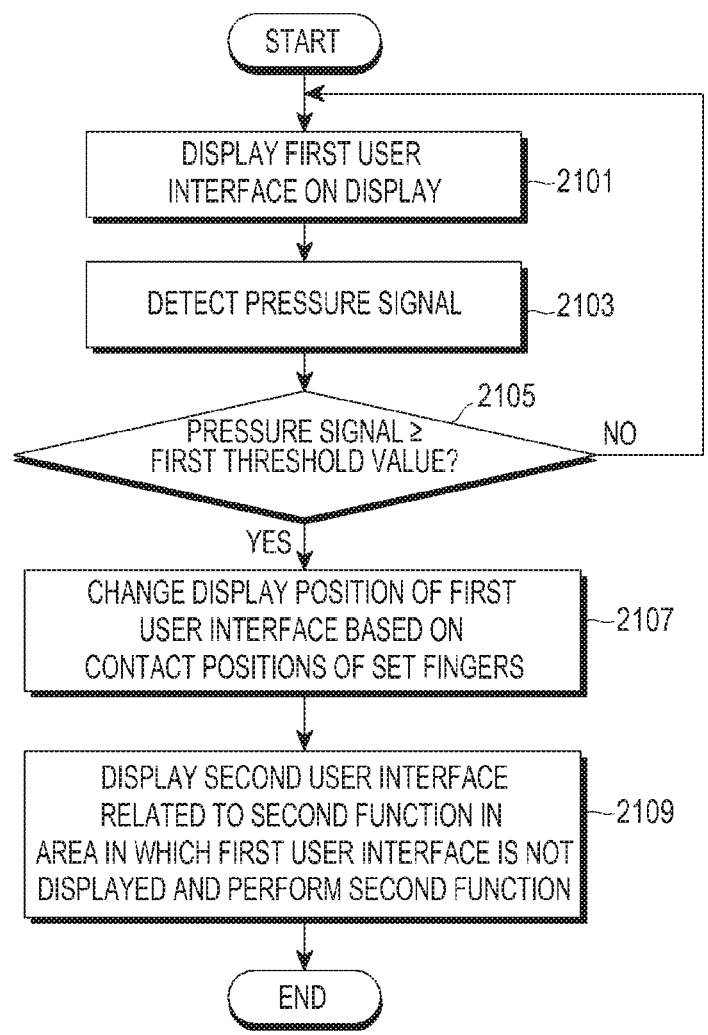
FIG. 21 is a flowchart of an operation procedure of an electronic device according to an embodiment of the present disclosure.

FIG. 21 is a flowchart of an operation procedure of an electronic device according to an embodiment of the present disclosure.

Referring to FIG. 21, the operation procedure of the electronic device may be one of the various embodiments of the present disclosure based on FIG. 10.

When a plurality of UIs is displayed on a display, the electronic device (for example, the electronic device 101 of FIG. 1, the electronic device 203 of FIGS. 3AA-3EB, or the electronic device 400 of FIGS. 4A and 4B) may display the UIs, for example, in the form of stacked layers or in the form of multiple screens.

In step 2101, the electronic device may display a first UI including at least one first item on the display. The first UI may be, for example, a lock screen or a home screen initially displayed after the electronic device is booted when power is applied, or an application screen displayed according to the execution of a particular application (or function). Further, the electronic device may perform a first function related to the first UI. In this case, the first function may be, for example, a function executed before a grip is identified or a function executed in response to the identified grip, which corresponds to a function related to the first UI.

In step 2103, the electronic device may detect a pressure signal indicating a level of pressure (for example, intensity, level, or position) applied to the sensor module (for example, the same as or similar to the sensor modules 203 of FIGS. 3AA to 3EB) installed in at least one area of the housing through at least one sensor (for example, the pressure sensor) in the state in which the first UI is displayed. According to an embodiment of the present disclosure, when a grip by a user's hand is identified, the electronic device may identify housing areas in contact with a partial area of the fingers or palm of the identified grip. The electronic device may identify a pressure value to be compared with a preset threshold value based on pressure signals detected by at least one pressure sensor arranged in the identified housing areas. For example, when the fingers come into contact with three areas of the housing areas in which the pressure sensors are installed, the processor of the electronic device may identify a pressure value included in each pressure signal detected by the pressure sensors installed at positions of the three areas or adjacent positions. The electronic device may select a pressure value having the greatest value among the identified pressure values, an average value of all the identified pressure values, or a pressure value received from the pressure sensor at a particular position set in accordance with the corresponding grip type as the pressure value to be compared with the threshold value.

In step 2105, the electronic device may determine whether the detected pressure signal, that is, the pressure value identified by the pressure signal, is greater than or equal to the first threshold value (for example, a preset value indicating a pressure intensity, level or position) in the state in which the first UI is displayed.

When the detected pressure signal is less than the first threshold value based on the result of the determination, the electronic device may perform step 2101 again. On the other hand, when the detected pressure signal is greater than or equal to the first threshold value, the electronic device may perform step 2107.

In step 2107, the electronic device may change the display position of the first UI based on, for example, contact positions or forms of the set fingers among the gripping fingers.

In step 2109, the electronic device may perform a second function, and display a second UI related to the second function in an area in which the first UI is not displayed.

Figure 22A:
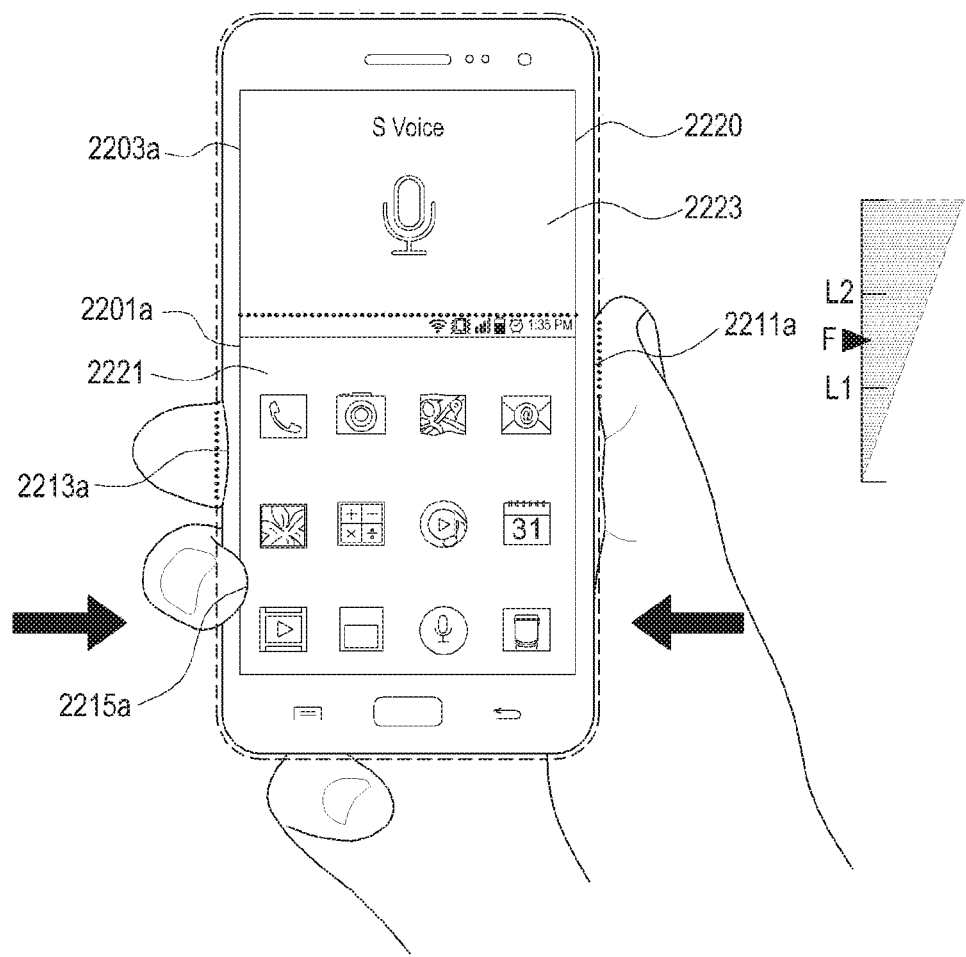
FIGS. 22A and 22B are illustrations of UIs on a display of an electronic device according to an embodiment of the present disclosure.
Figure 22B:
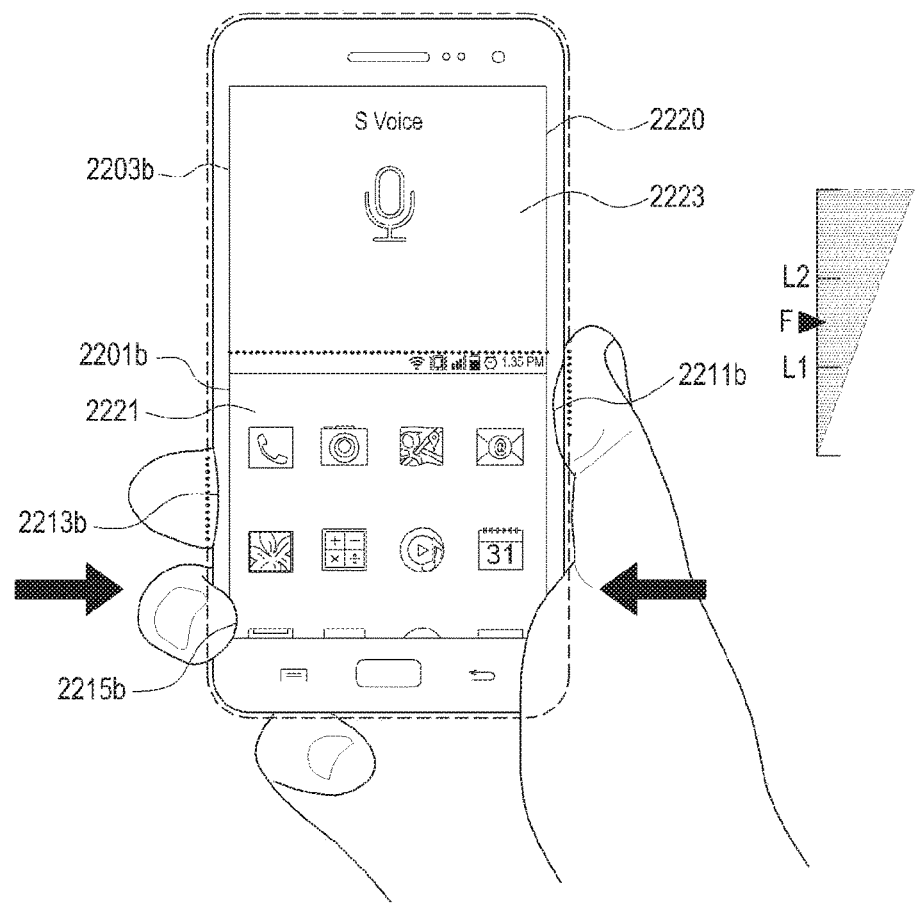

FIGS. 22A and 22B are illustrations of UIs on a display of an electronic device according to an embodiment of the present disclosure.

Referring to FIG. 22A, the electronic device may detect, for example, a pressure signal (a first pressure signal) by at least one pressure sensor arranged in areas of a housing (at least one of areas 2211a, 2213a, and 2215a) in contact with a user's fingers. In this case, the electronic device may identify that a pressure value (F) indicated by or included in the first pressure signal is greater than or equal to the first threshold value (L1) and less than the second threshold value (L2). Accordingly, while performing a second function (for example, a voice recognition function), the electronic device may display a second UI 2223 related to the second function in a second display area 2203a of a display 2220 with, for example, a first pixel value of particular screen coordinates (0, 0) as a start position. In this case, the first UI 2221 may be displayed in a first display area 2201a of the display 2220 with, for example, a second pixel value of particular screen coordinates (0, 1280) as a start position.

Referring to FIG. 22B, in the state in which the first UI 2221 and the second UI 2223 are displayed as illustrated in FIG. 22A, the electronic device may identify that the contact areas due to the grip type of the user's fingers have changed from areas of the housing 2211a, 2213a, and 2215a to other areas of the housing (at least one of areas 2211b, 2213b, and 2215b. Further, the electronic device may identify the change in the grip type through at least one pressure sensor arranged in the areas of the housing 2211b, 2213b, and 2215b, a touch sensor, or various sensors capable of identifying the grip by the user's fingers. When the grip type is changed, the electronic device may control display positions, sizes, or forms of the first display area 2201a and the second display area 2203a as illustrated in FIG. 22A based on the areas of the housing areas 2211b, 2213b, and 2215b corresponding to the changed contact areas, and display the controlled first display area 2201b and second display area 2203b on the display 2220. For example, the electronic device may display the first display area 2201b in a lower area 2211b based on a contact position of a particular finger (for example, the area 2211b of the housing) and display the second display area 2203b in an upper area 2211b based on the contact position of the particular finger (for example, the area 2211b of the housing).

Figure 23A:
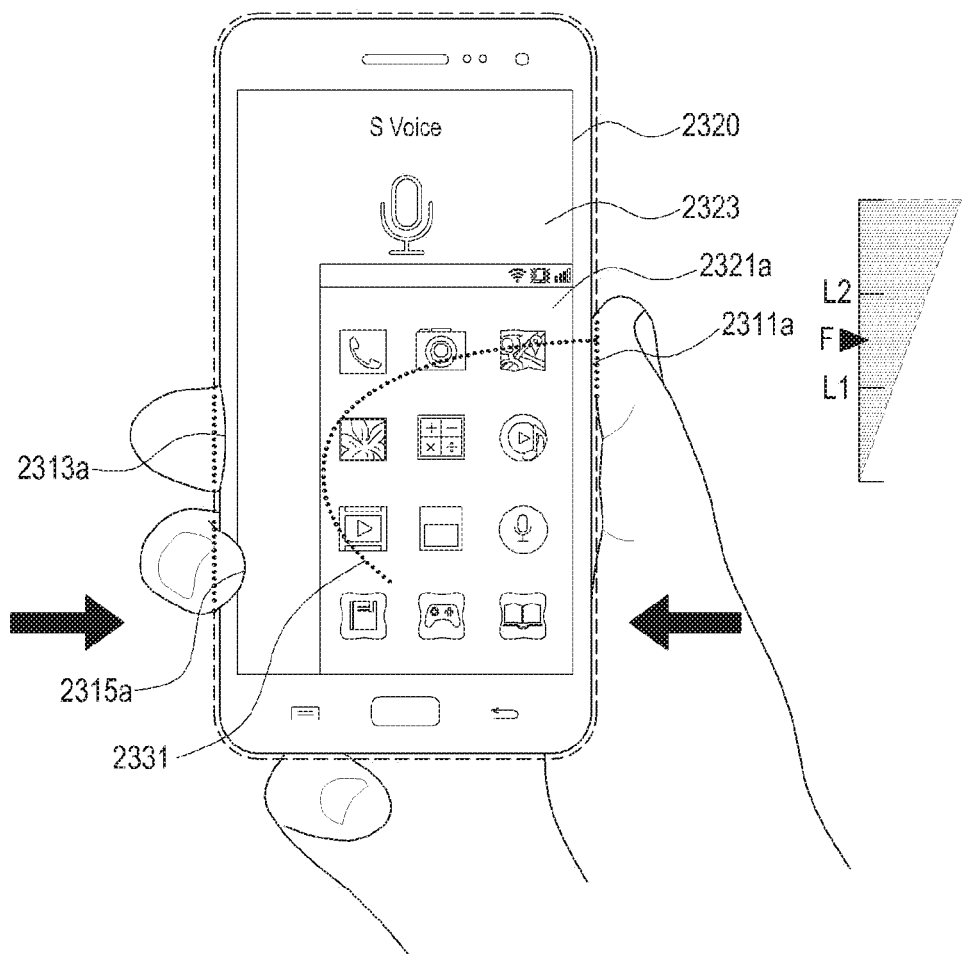
FIGS. 23A and 23B are illustrations of UIs on a display of an electronic device according to an embodiment of the present disclosure.
Figure 23B:
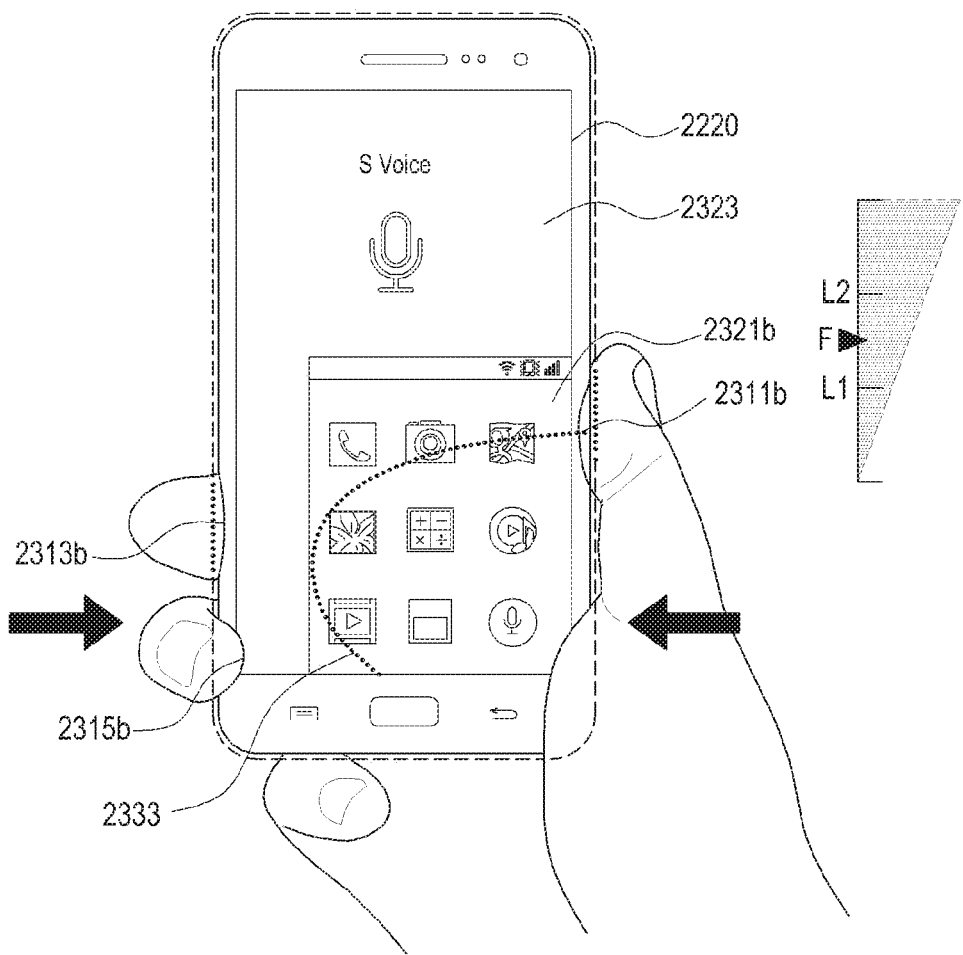

FIGS. 23A and 23B are illustrations of UIs on a display of an electronic device according to an embodiment of the present disclosure.

Referring to FIG. 23A, in a state in which a first UI 2321a and a second UI 2323 are displayed on a display 2320, the electronic device may detect, for example, a pressure signal (a first pressure signal) by at least one pressure sensor arranged in areas of the housing (at least one of areas 2311a, 2313a, and 2315a) in contact with the user's fingers. In this case, the electronic device may identify that a pressure value (F) indicated by or included in the first pressure signal is greater than or equal to the first threshold value (L1) and less than the second threshold value (L2). In order to use a one-hand mode, the electronic device may move the display position of the first UI 2321 in a direction of the area 2311a of the housing, and may change the display position of the first UI 2321 or reconfigure the first UI 2321 such that first items are located within a movement range 2331 of the fingers in contact with the area 2311a of the housing. In this case, the electronic device may recognize a grip type by the fingers in contact with the areas of the housing 2311a, 2313a, and 2315a, estimate the movement range of at least one of the fingers according to the recognized grip type, and display the first UI 2321a within the estimated finger movement range 2331.

Referring to FIG. 23B, in the state in which the first UI 2321b and the second UI 2323 are displayed as illustrated in FIG. 23A, the electronic device may identify that the contact areas due to the grip type of the user's fingers have changed from areas of the housing 2311a, 2313a, and 2315a to other areas of the housing 2311b, 2313b, and 2315b. Further, the electronic device may identify the change in the grip type through at least one pressure sensor arranged in the areas of the housing 2311b, 2313b, and 2315b, a touch sensor, or various sensors capable of identifying the grip by the user's fingers. In this case, in order to user the one-hand mode, the electronic device may move the display position of the first UI 2321b in a direction of the area 2311b of the housing, and change the display position such that first items are located within a particular finger movement range 2333. Accordingly, the electronic device may display the first UI 2321b in the newly reconfigured first display area or the display area into which the first display area was changed.

Figure 24A:
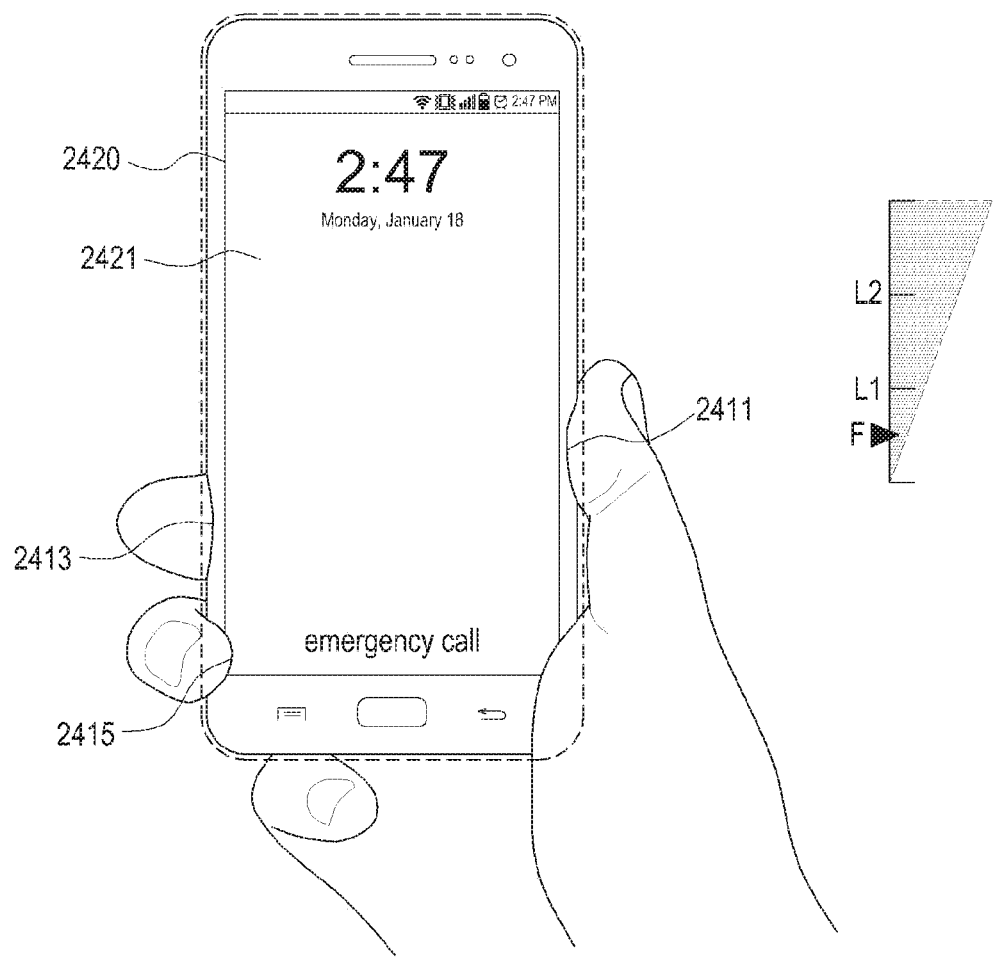
FIGS. 24A and 24B are illustrations of UIs on a display of an electronic device according to an embodiment of the present disclosure.
Figure 24B:
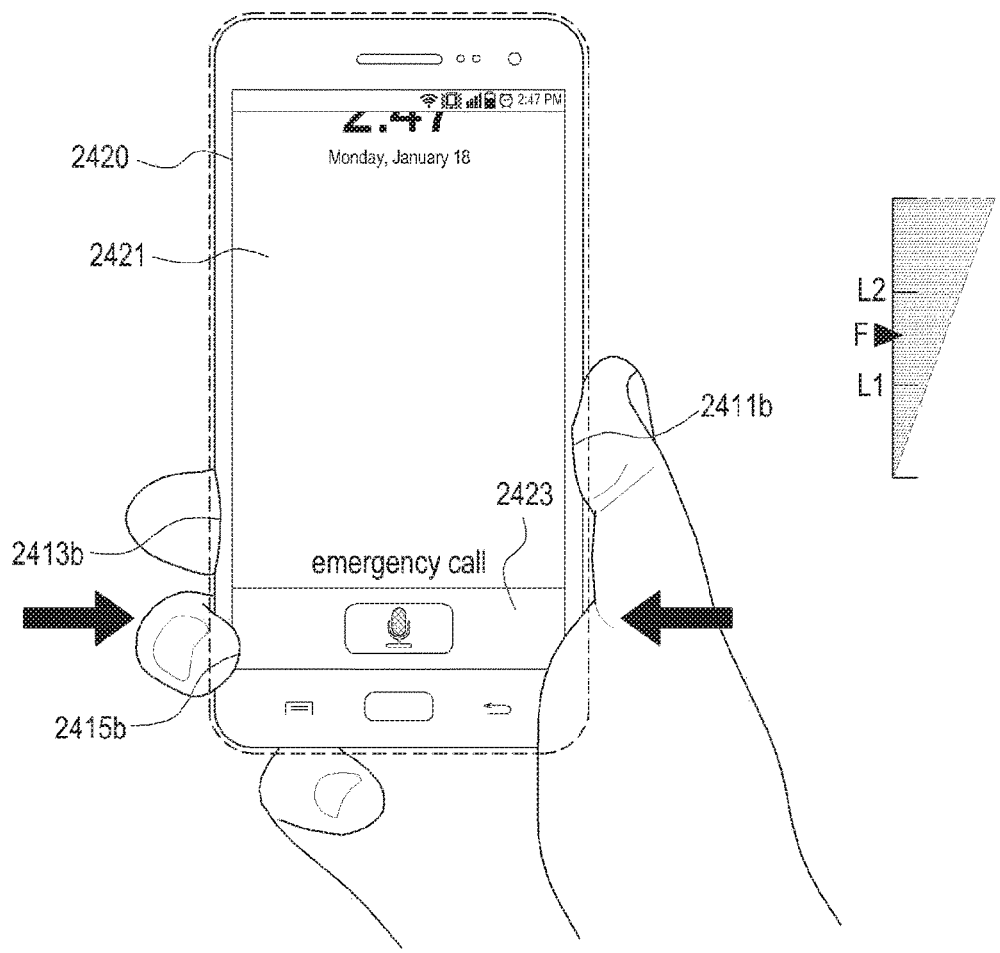

FIGS. 24A and 24B are illustrations of UIs on a display of an electronic device according to an embodiment of the present disclosure.

Referring to FIG. 24A, the electronic device may perform a first function for a lock screen in a lock screen state, and display a first UI 2421 related to the first function on a display 2420. The electronic device may identify a grip by a user's fingers through at least one pressure sensor arranged in areas of the housing 2411, 2413, and 2415, a touch sensor, or various sensors capable of identifying the grip by the user's fingers.

Referring to FIG. 24B, the electronic device may detect a pressure signal through at least one pressure sensor arranged in areas of the housing (at least one of areas 2411b, 2413b, and 2415b) in the lock screen state in which the first UI 2421 is displayed as illustrated in FIG. 24A. In this case, the electronic device may identify that a pressure value (F) indicated by or included in the currently detected pressure signal is greater than or equal to the first threshold value (L1) and less than the second threshold value (L2). Further, the electronic device may move and display the first UI 2421 currently displayed on the display 2420 in the lock screen state in, for example, an upward direction, and may display a second UI 2423 related to a second function in an area (for example, a lower area of the display) in which the first UI 2421 is not displayed. For example, the second function may be a voice recognition function, and the second UI 2423 may be a UI indicating a voice input related to the voice recognition function.

Figure 25A:
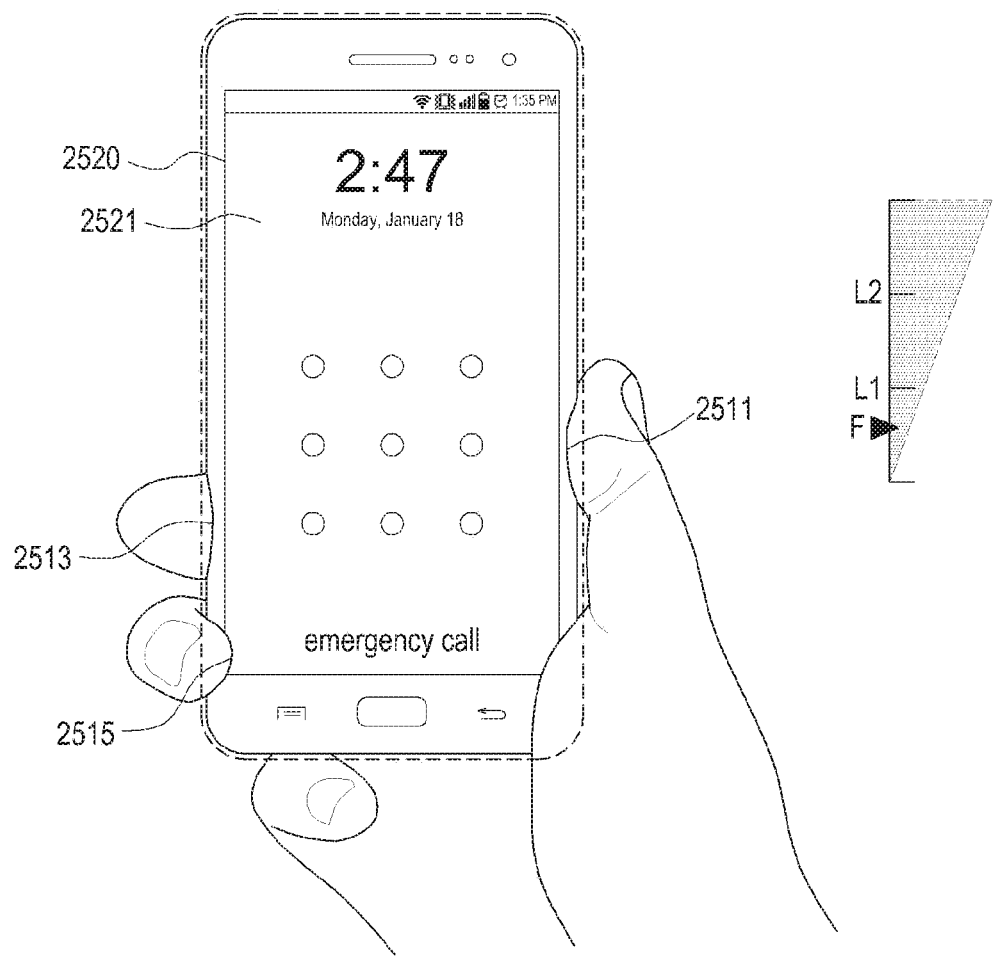
FIGS. 25A and 25B are illustrations of UIs on a display of an electronic device according to an embodiment of the present disclosure.
Figure 25B:
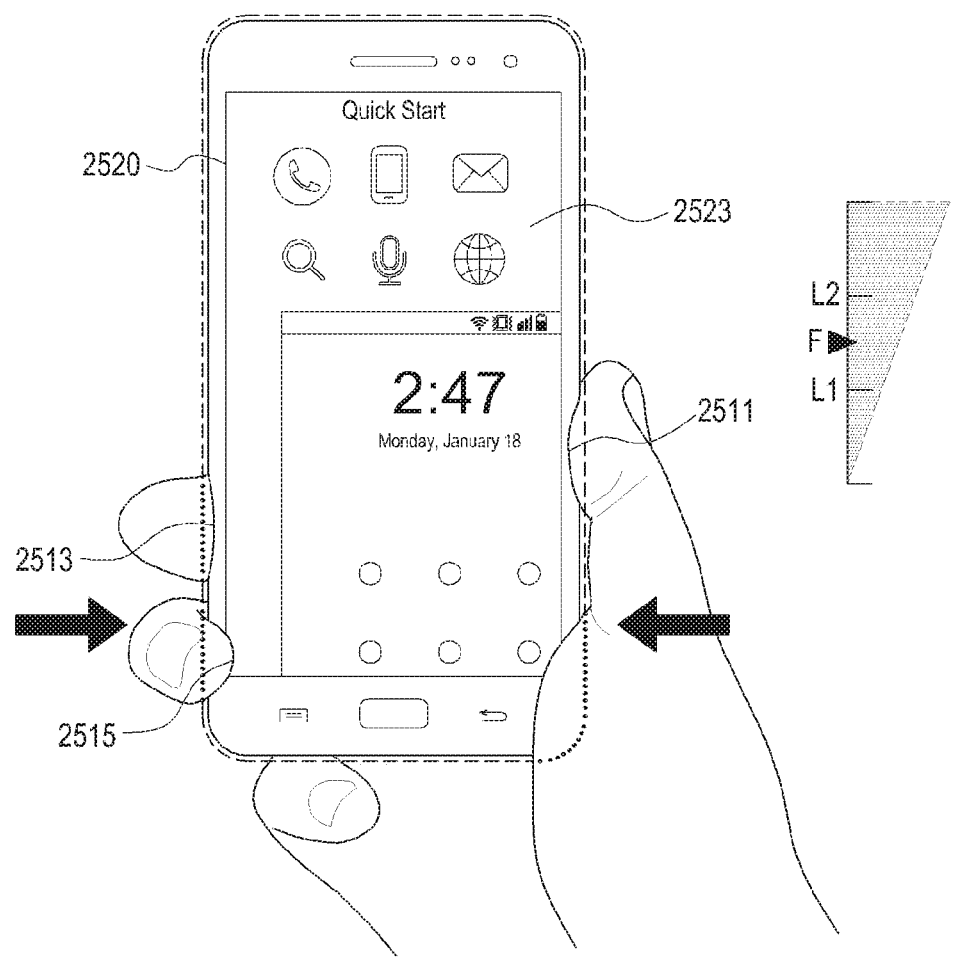

FIGS. 25A and 25B are illustrations of UIs on a display of an electronic device according to an embodiment of the present disclosure.

Referring to FIG. 25A, the electronic device may perform a first function for a lock screen in a lock screen state, and may display a first UI 2521 (for example, a UI for inputting a password) related to the first function on a display 2520. The electronic device may identify a grip by the user's fingers through at least one pressure sensor arranged in areas of the housing 2511, 2513, and 2515, a touch sensor, or various sensors capable of identifying the grip by the user's fingers.

Referring to FIG. 25B, the electronic device may detect a pressure signal through at least one pressure sensor arranged in areas of the housing (at least one of areas 2511, 2513, and 2515) in the lock screen state in which the first UI 2521 is displayed, as illustrated in FIG. 25A. In this case, the electronic device may identify that a pressure value (F) indicated by or included in the currently detected pressure signal is greater than or equal to the first threshold value (L1) and less than the second threshold value (L2). Further, the electronic device may move and display the first UI currently displayed on the display 2520 in the lock screen state in, for example, a downward direction, and display a second UI 2523 related to a second function in an area (for example, an upper area of the display) in which the first UI 2521 is not displayed. In order to use the one-hand mode, the electronic device may change and display the first UI 2521 to be close to the area 2511 of the housing, and may perform an operation in an unlocked state.

Figure 26A:
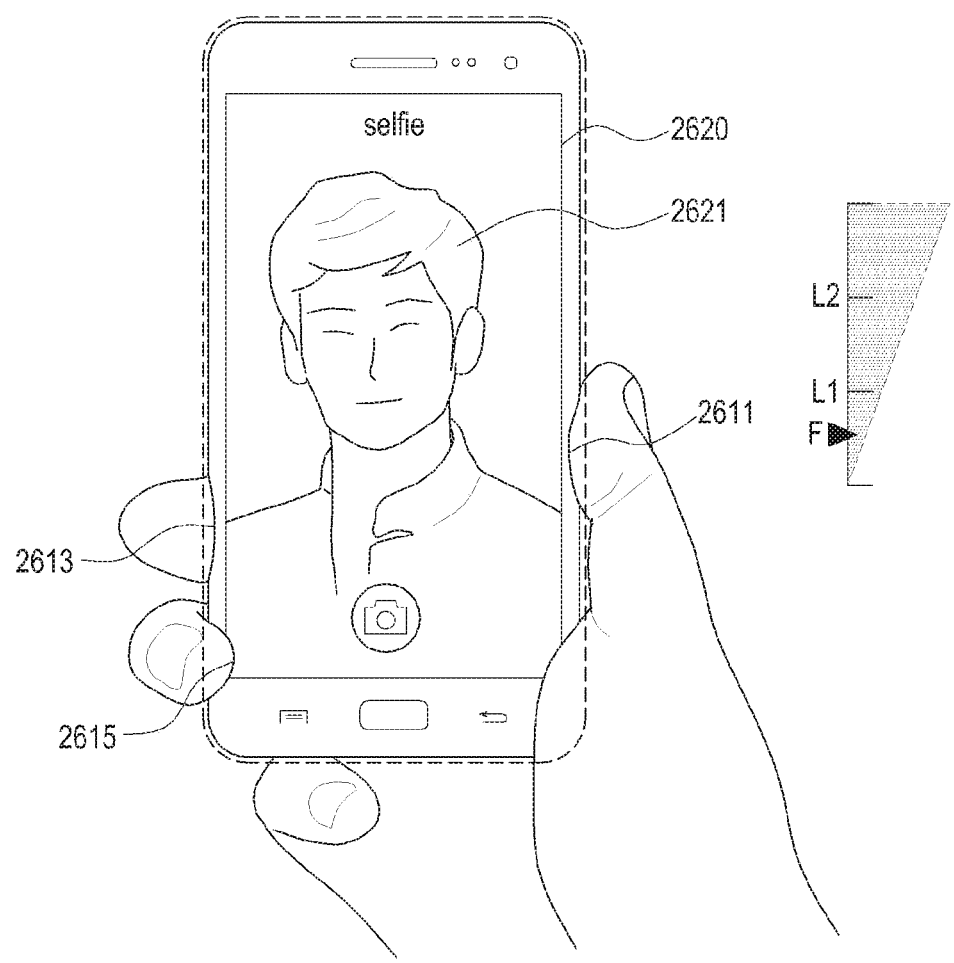
FIGS. 26A, 26B, and 26C are illustrations of UIs on a display of an electronic device according to an embodiment of the present disclosure.
Figure 26B:
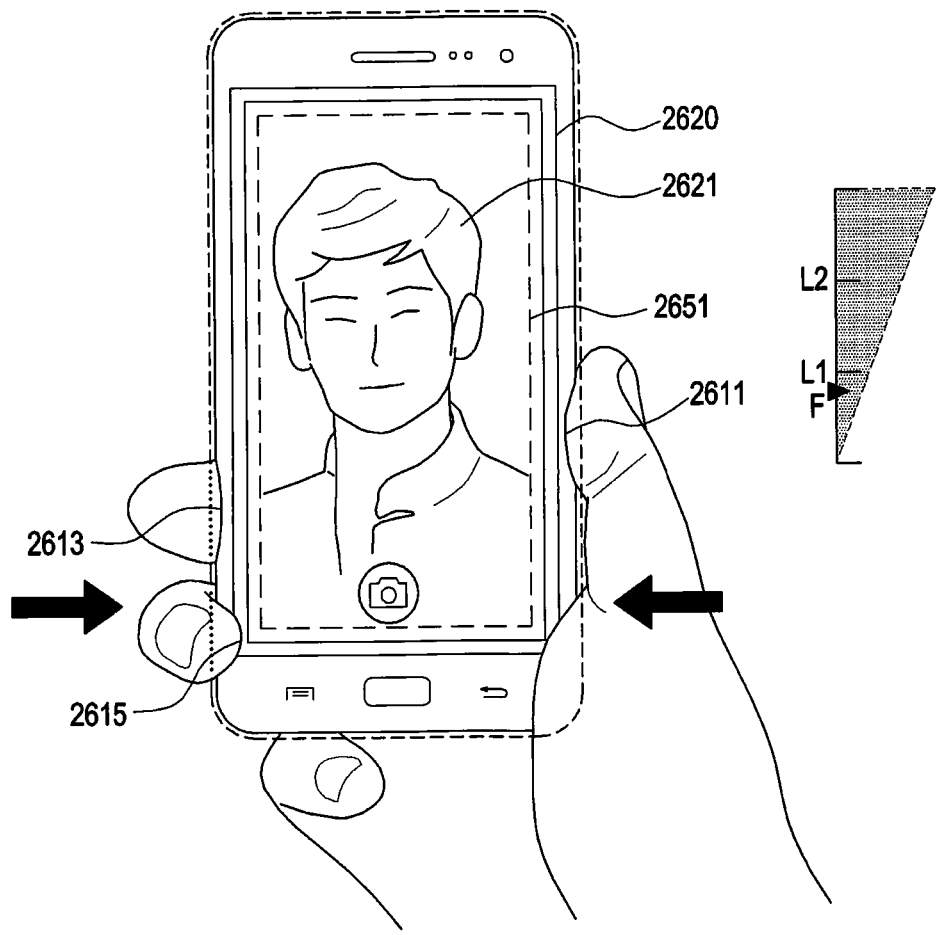
Figure 26C:
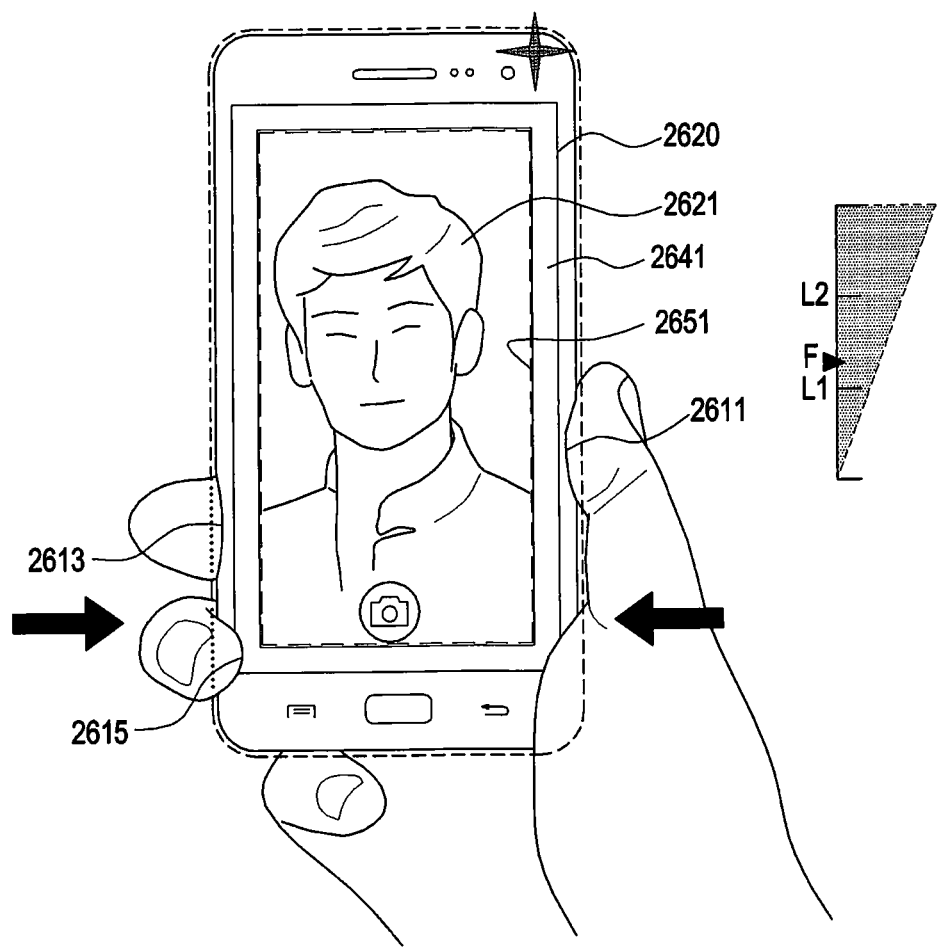

FIGS. 26A, 26B, and 26C are illustrations of UIs on a display of an electronic device according to an embodiment of the present disclosure.

Referring to FIG. 26A, the electronic device may perform a first function (for example, a camera (a selfie) function), and may display a first UI 2621 related to the first function on a display 2620. The electronic device may identify a grip by a user's fingers through at least one pressure sensor arranged in areas of the housing 2611, 2613, and 2615, a touch sensor, or various sensors capable of identifying the grip by the user's fingers.

Referring to FIG. 26B, in the state in which the first UI 2621 is displayed as illustrated in FIG. 26A, the electronic device may detect a pressure signal through at least one pressure sensor arranged in areas of the housing (at least one of areas 2611, 2613, and 2615). In this case, the electronic device may identify that a pressure value (F) indicated by or included in the currently detected pressure signal is less than or equal to the first threshold value (L1). When a pressure signal less than or equal to the first threshold value (L1) is detected, the electronic device may change a display form of the first UI 2621 according to a control input of the first function (a selfie function). According to an embodiment of the present disclosure, the electronic device may display a guide line 2651 according to the detection of the input while executing the camera function. Further, the electronic device may display an object (an outline), which comes closer to the guide line 2651, in the edge of the display according to the intensity of the detected pressure.

Referring to FIG. 26C, in a state in which the first UI 2621 as illustrated in FIG. 26B is displayed, the electronic device may detect a pressure signal through at least one pressure sensor arranged in areas of the housing 2611, 2613, and 2615. In this case, the electronic device may identify that a pressure value (F) indicated by or included in the currently detected pressure signal is greater than or equal to the first threshold value (L1) and less than the second threshold value (L2). As the pressure signal greater than or equal to the first threshold value (L1) and less than the second threshold value (L2) is detected, the electronic device may capture the first UI 2621 currently displayed on the display 2620, for example, a displayed image according to capturing by the camera. According to an embodiment of the present disclosure, the electronic device may capture a received image when a thickness of a frame 2641 at the edge of the first UI 2621 becomes thicker and the frame 2641 finally touches the guide line as the pressure signal smaller than the first threshold value (L1) (for example, 0 to L1) is detected. According to various embodiments, when the first function related to the first UI corresponds to a particular function according to a preset type or characteristic, the electronic device may not perform the operation of displaying a second UI and may maintain the display of the first UI.

A method of controlling an electronic device according to an embodiment of the present disclosure may include an operation of displaying a first UI including at least one first item on a display of the electronic device, an operation of detecting at least one of a level and a position of pressure by an external object through at least one pressure sensor, an operation of displaying a second UI including at least one second item at least partially based on at least one of the detected level and position while controlling or not controlling the first UI, and an operation of displaying the first UI in a state before the controlling at least partially based on a change in at least one of the detected level and the position and removing the second UI.

According to an embodiment of the present disclosure, the method may further include an operation of removing the first UI from an area in which the first UI is displayed at least partially based on a state of the electronic device and displaying a third UI.

According to an embodiment of the present disclosure, the state may be associated with a screen displayed on the display and/or an application program executed when at least one of the level and the position of the pressure is detected.

According to an embodiment of the present disclosure, the method may further include an operation of displaying the second UI in a first display area (portion) of the display and controlling the first UI to fit a second display area of the display.

According to an embodiment of the present disclosure, the method may further include an operation of controlling the first UI by resizing, moving, shifting, rearranging, and/or scrolling at least one first UI or the at least one first item.

According to an embodiment of the present disclosure, the method may further include an operation of displaying the second UI along with at least a part of the controlled first UI before removing the second UI.

According to an embodiment of the present disclosure, the first UI may include a home screen and the at least one first item including an icon indicating an application program, and the second UI includes a menu (menu pane), and one or more graphic elements indicating at least one of at least one phone application program, an email application program, a browser application program, a search application program, a voice recognition application program, and a program selected by a user.

According to an embodiment of the present disclosure, the first UI may include a UI of the application program and the at least one first item related to the application program, and the second UI may include a menu (menu pane) and one or more graphic elements indicating at least one of at least one phone application program, an email application program, a browser application program, a search application program, a voice recognition application program, a program selected by a user, and a function related to an application program.

According to an embodiment of the present disclosure, the second UI may include at least one text indicating a user's instruction to perform the operation of the electronic device.

Figure 27:
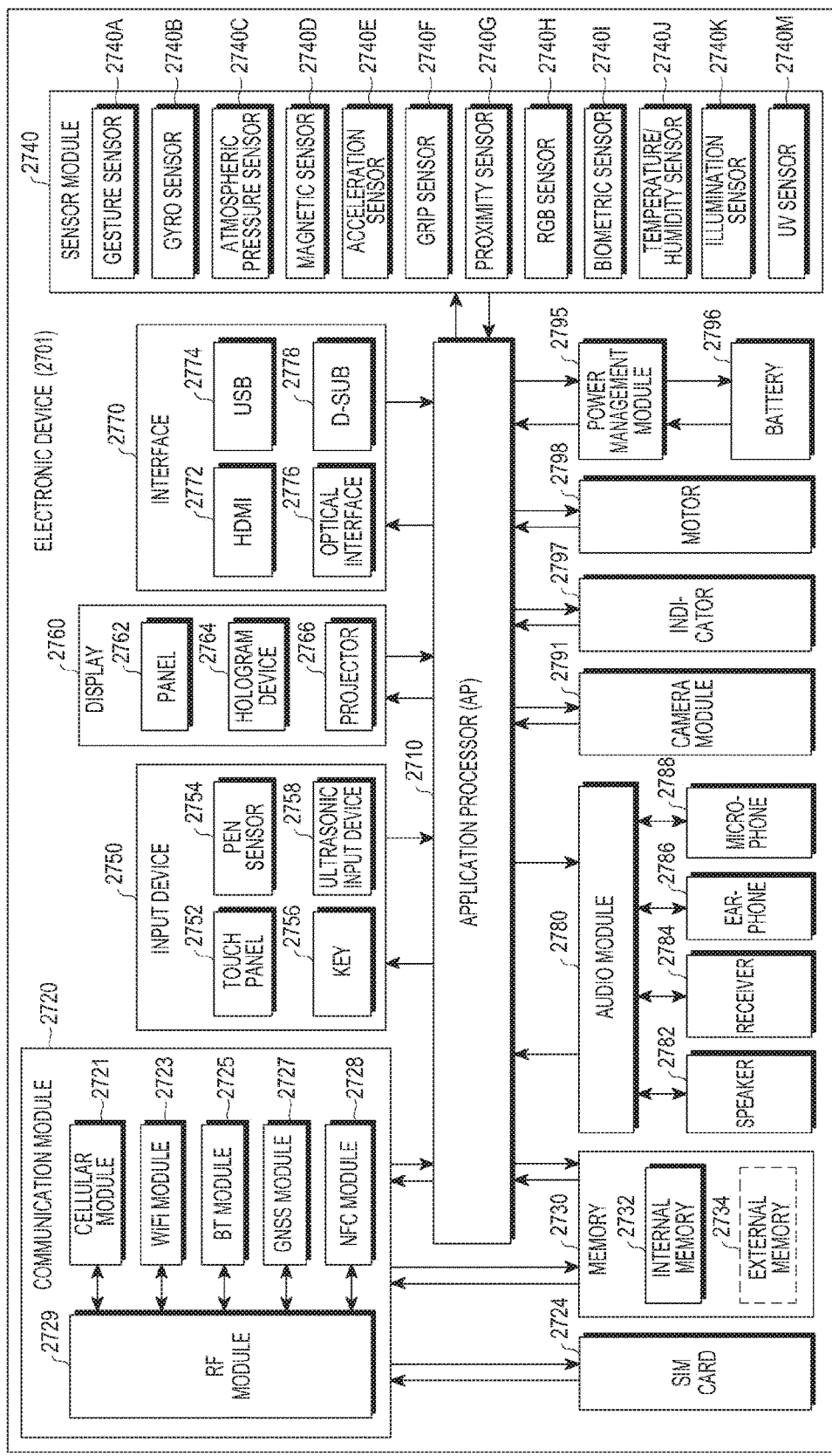
FIG. 27 is a block diagram of an electronic device according to an embodiment of the present disclosure.

FIG. 27 is a block diagram of an electronic device 2701 according to an embodiment of the present disclosure.

Referring to FIG. 27, the electronic device 2701 may include, for example, the whole or part of the electronic device 101 illustrated in FIG. 1. The electronic device 2701 may include at least one processor 2710 (for example, an AP), a communication module 2720, a subscriber identification module (SIM) card 2724, a memory 2730, a sensor module 2740, an input device 2750, a display 2760, an interface 2770, an audio module 2780, a camera module 2791, a power management module 2795, a battery 2796, an indicator 2797, and a motor 2798. The processor 2710 may control a plurality of hardware or software elements connected thereto and may perform various data processing and operations by driving an OS or an application program. The processor 2710 may be embodied, for example, as a system on chip (SoC). According to an embodiment of the present disclosure, the processor 2710 may further include a graphics processing unit (GPU) and/or an image signal processor (ISP). The processor 2710 may also include at least some (for example, a cellular module 2721) of the elements illustrated in FIG. 27. The processor 2710 may load, in volatile memory, instructions or data received from at least one of the other elements (for example, non-volatile memory), process the loaded instructions or data, and store the resultant data in the non-volatile memory.

The communication module 2720 may have a configuration that is the same as, or similar to, that of the communication interface 170. The communication module 2720 may include, for example, a cellular module 2721, a WiFi module 2723, a BT module 2725, a GNSS module 2727, an NFC module 2728, and an RF module 2729. The cellular module 2721 may provide, for example, a voice call, a video call, a text message service, an Internet service, or the like through a communication network. According to an embodiment of the present disclosure, the cellular module 2721 may identify and authenticate the electronic device 2701 within a communication network using the SIM card 2724. The cellular module 2721 may perform at least some of the functions that the processor 2710 may provide. The cellular module 2721 may include a CP. At least some (for example, two or more) of the cellular module 2721, the WiFi module 2723, the BT module 2725, the GNSS module 2727, and the NFC module 2728 may be included in one IC or IC package. The RF module 2729, for example, may transmit/receive a communication signal (for example, an RF signal). The RF module 2729 may include, for example, a transceiver, a power amplifier module (PAM), a frequency filter, a low noise amplifier (LNA), an antenna, and the like. At least one of the cellular module 2721, the WiFi module 2723, the BT module 2725, the GNSS module 2727, and the NFC module 2728 may transmit/receive an RF signal through a separate RF module. The SIM card 2724 may include, for example, an embedded SIM, and may contain unique identification information (for example, an integrated circuit card identifier (ICCID)) or subscriber information (for example, an international mobile subscriber identity (IMSI)).

The memory 2730 (for example, the memory 130) may include, for example, an internal memory 2732 or an external memory 2734. The internal memory 2732 may include, for example, at least one of a volatile memory (for example, a dynamic RAM (DRAM), a static RAM (SRAM), a synchronous DRAM (SDRAM), and the like) and a non-volatile memory (for example, a one-time programmable ROM (OTPROM), a programmable ROM (PROM), an erasable PROM (EPROM), an electrically erasable PROM (EEPROM), a mask ROM, a flash ROM, a flash memory, a hard disc drive, or a solid state drive (SSD)). The external memory 2734 may include a flash drive, for example, a compact flash (CF) drive, an SD, a micro-SD, a mini-SD, an (xD), a multimedia card (MMC), a memory stick, and the like. The external memory 2734 may be functionally and/or physically connected to the electronic device 2701 through various interfaces.

The sensor module 2740 may, for example, measure a physical quantity or detect an operating state of the electronic device 2701 and may convert the measured or detected information into an electrical signal. The sensor module 2740 may include, for example, at least one of a gesture sensor 2740A, a gyro sensor 2740B, an atmospheric pressure sensor 2740C, a magnetic sensor 2740D, an acceleration sensor 2740E, a grip sensor 2740F, a proximity sensor 2740G, a color sensor 2740H (for example, a red, green, blue (RGB) sensor), a biometric sensor 2740I, a temperature/humidity sensor 2740J, an illumination sensor 2740K, and an ultraviolet (UV) light sensor 2740M. Additionally or alternatively, the sensor module 2740 may include, for example, an electronic nose (e-nose) sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2740 may further include a control circuit for controlling one or more sensors included therein. In an embodiment of the present disclosure, the electronic device 2701 may further include a processor, which is configured to control the sensor module 2740, as a part of the processor 2710 or separately from the processor 2710 in order to control the sensor module 2740 while the processor 2710 is in a reduced power or sleep state.

The input device 2750 may include, for example, a touch panel 2752, a (digital) pen sensor 2754, a key 2756, or an ultrasonic input device 2758. The touch panel 2752 may be, for example, at least one of a capacitive type, a resistive type, an infrared type, and an ultrasonic type. Furthermore, the touch panel 2752 may further include a control circuit. The touch panel 2752 may further include a tactile layer to provide a tactile reaction to a user. The (digital) pen sensor 2754 may include, for example, a recognition sheet that is a part of, or separate from, the touch panel. The key 2756 may include, for example, a physical button, an optical key, or a keypad. The ultrasonic input device 2758 may detect ultrasonic waves, which are generated by an input tool, through a microphone 2788 to identify data corresponding to the detected ultrasonic waves.

The display 2760 (for example, the display 160) may include a panel 2762, a hologram device 2764, a projector 2766, and/or a control circuit for controlling them. The panel 2762 may be implemented to be, for example, flexible, transparent, or wearable. The panel 2762, together with the touch panel 2752, may be configured as one or more modules. According to an embodiment of the present disclosure, the panel 2762 may include a pressure sensor (or a force sensor), which may measure the strength of pressure of a user's touch. The pressure sensor may be implemented so that it is integrated with the touch panel 2752 or implemented by one or more sensors separate from the touch panel 2752. The hologram device 2764 may show a three-dimensional image in the air using light interference. The projector 2766 may display an image by projecting light onto a screen. The screen may be located, for example, in the interior of, or on the exterior of, the electronic device 2701. The interface 2770 may include, for example, an HDMI 2772, a USB 2774, an optical interface 2776, or a D-sub-miniature (D-sub) interface 2778. The interface 2770 may be included, for example, in the communication interface 170 illustrated in FIG. 1. Additionally or alternatively, the interface 2770 may include, for example, a mobile high-definition link (MHL) interface, an SD card/MMC interface, or an Infrared Data Association (IrDA) standard interface.

The audio module 2780 may convert, for example, sound into an electrical signal, and vice versa. At least some elements of the audio module 2780 may be included, for example, in the input/output interface 145 illustrated in FIG. 1. The audio module 2780 may process sound information that is input or output through, for example, a speaker 2782, a receiver 2784, an earphone 2786, the microphone 2788, and the like. The camera module 2791 is a device that can take a still image and a moving image. According to an embodiment of the present disclosure, the camera module 2791 may include one or more image sensors (for example, a front sensor or a rear sensor), a lens, an ISP, or a flash (for example, an LED or xenon lamp). The power management module 2795 may manage, for example, the power of the electronic device 2701. The power management module 2795 may include a power management integrated circuit (PMIC), a charger IC, or a battery gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the remaining charge in the battery 2796 and a voltage, current, or temperature while charging. The battery 2796 may include, for example, a rechargeable battery and/or a solar battery.

The indicator 2797 may indicate a particular state (for example, a booting state, a message state, a charging state, and the like) of the electronic device 2701 or a part (for example, the processor 2710) thereof. The motor 2798 may convert an electrical signal into a mechanical vibration and may generate a vibration, a haptic effect, or the like. The electronic device 2701 may include a mobile TV support device (for example, a GPU) that can process media data according to a standard such as digital multimedia broadcasting (DMB), digital video broadcasting (DVB), mediaFlo™, or the like. Each of the above-described component elements of hardware according to the present disclosure may be configured with one or more components, and the names of the corresponding component elements may vary based on the type of electronic device. In an embodiment of the present disclosure, an electronic device 2701 may omit some elements or may further include additional elements, or some of the elements of the electronic device may be combined with each other to configure one entity, in which case the electronic device may perform the functions of the corresponding elements in the same way as before the combination.

Figure 28:
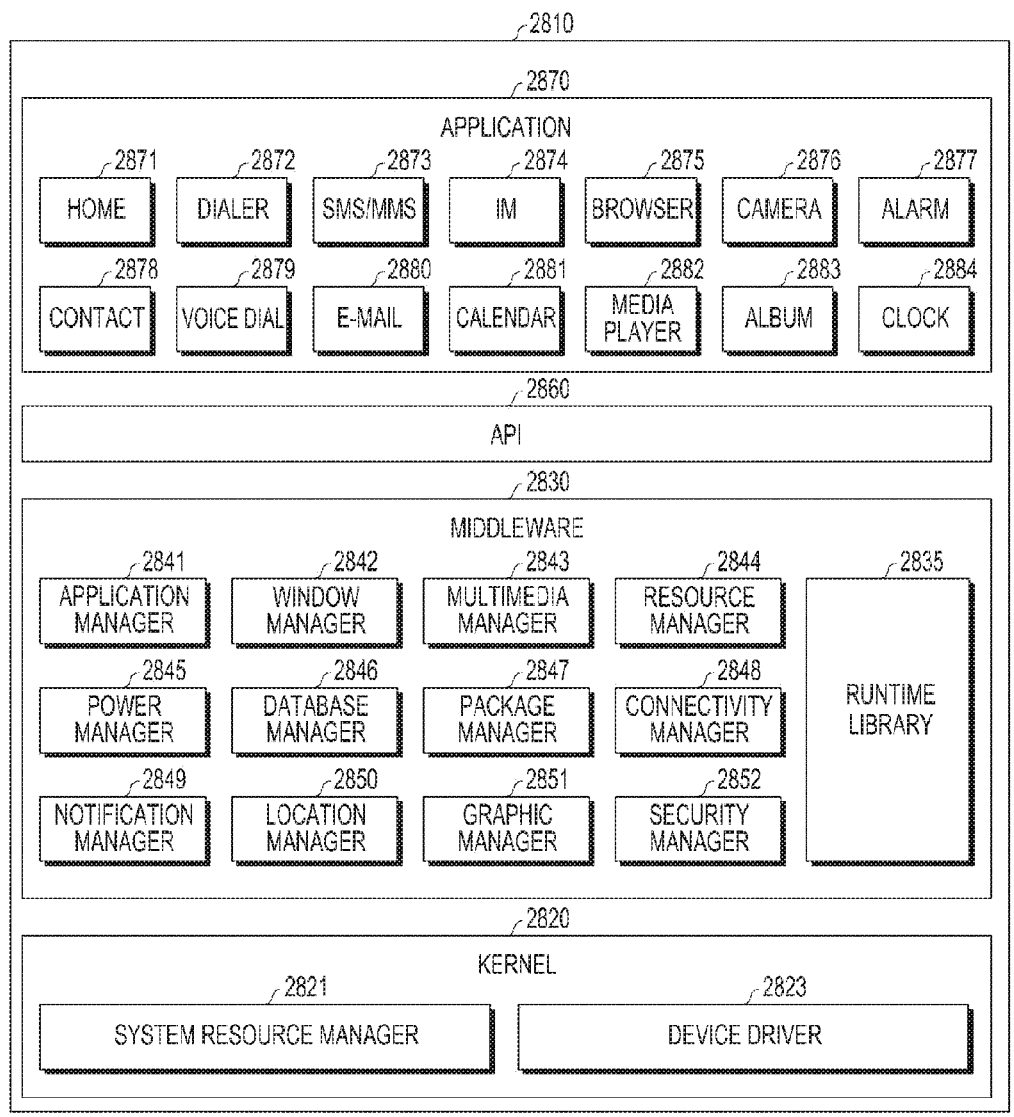
FIG. 28 is a block diagram of a program module according to an embodiment of the present disclosure.

FIG. 28 is a block diagram of a program module 2810 according to an embodiment of the present disclosure.

Referring to FIG. 28, the program module 2810 (for example, the program 140) may include an OS that controls resources relating to an electronic device (for example, the electronic device 101) and/or various applications (for example, the application programs 147) that are driven on the OS. The OS may include, for example, Android®, iOS®, Windows®, Symbian®, Tizen®, or Bada™.

The program module 2810 may include a kernel 2820 (for example, the kernel 141), middleware 2830 (for example, the middleware 143 in FIG. 1), an API 2860 (for example, the API 145), and/or application 2870 (for example, the application programs 147). At least a part of the program module 2810 may be preloaded on the electronic device, or may be downloaded from an external electronic device (for example, the electronic device 102 or 104 or the server 106).

The kernel 2820 may include, for example, a system resource manager 2821 and/or a device driver 2823. The system resource manager 2821 may control, allocate, or retrieve system resources. According to an embodiment of the present disclosure, the system resource manager 2821 may include a process manager, a memory manager, or a file-system manager. The device driver 2823 may include, for example, a display driver, a camera driver, a BT driver, a shared memory driver, a USB driver, a keypad driver, a WiFi driver, an audio driver, or an inter-process communication (IPC) driver. For example, the middleware 2830 may provide a function required by the application 2870 in common, or may provide various functions to the application 2870 through the API 2860 to enable the application 2870 to use the limited system resources within the electronic device. The middleware 2830 may include at least one of a runtime library 2835, an application manager 2841, a window manager 2842, a multimedia manager 2843, a resource manager 2844, a power manager 2845, a database manager 2846, a package manager 2847, a connectivity manager 2848, a notification manager 2849, a location manager 2850, a graphic manager 2851, and a security manager 2852.

The runtime library 2835 may include, for example, a library module that a compiler uses in order to add a new function through a programming language while the application 2870 is being executed. The runtime library 2835 may manage input/output, manage memory, or process arithmetic functions. The application manager 2841 may manage, for example, the life cycles of the application 2870. The window manager 2842 may manage GUI resources used for a screen. The multimedia manager 2843 may identify formats required for reproducing various media files, and may encode or decode a media file using a codec suitable for the corresponding format. The resource manager 2844 may manage source code of the application 2870 or space in memory. The power manager 2845 may manage, for example, capacity or power of a battery, and may provide power information required for operating the electronic device. According to an embodiment of the present disclosure, the power manager 2845 may operate in conjunction with a basic input/output system (BIOS). The database manager 2846 may, for example, generate, search, or change databases to be used by the application 2870. The package manager 2847 may manage installation or update of an application that is distributed in the form of a package file.

The connectivity manager 2848 may manage, for example, a wireless connection. The notification manager 2849 may provide an event (for example, an arrival message, an appointment, a proximity notification, and the like) to a user. The location manager 2850 may manage, for example, location information of the electronic device. The graphic manager 2851 may manage a graphic effect to be provided to a user and a UI relating to the graphic effect. The security manager 2852 may provide, for example, system security or user authentication. The middleware 2830 may include a telephony manager for managing a voice or video call function of the electronic device or a middleware module that is capable of forming a combination of the functions of the above-described elements. The middleware 2830 may provide specialized modules according to the type of OS. Furthermore, the middleware 2830 may dynamically remove some existing elements, or may add new elements. The API 2860 is, for example, a set of API programming functions, and may be provided with different configurations depending on the OS. For example, in the case of Android® or iOS®, one API set may be provided for each platform, and in the case of Tizen®, two or more API sets may be provided for each platform.

The application 2870 may include, for example, one or more applications that can perform functions, such as a home application 2871, a dialer application 2872, an SMS/MMS application 2873, an instant messaging (IM) application 2874, a browser application 2875, a camera application 2876, an alarm application 2877, a contacts application 2878, a voice dialer application 2879, an e-mail application 2880, a calendar application 2881, a media player application 2882, an album application 2883, a clock application 2884, a health care application (for example, measuring exercise quantity or blood glucose level), provision of environmental information (for example, atmospheric pressure, humidity, or temperature information), and the like. According to an embodiment of the present disclosure, the application 2870 may include an information exchange application that can support the exchange of information between the electronic device and an external electronic device. The information exchange application may include, for example, a notification relay application for relaying certain information to an external electronic device or a device management application for managing an external electronic device. For example, the notification relay application may relay notification information generated in the other applications of the electronic device to an external electronic device, or may receive notification information from an external electronic device and provide the received notification information to a user. The device management application may install, delete, or update the functions (for example, turning on/off the external electronic device itself (or some elements thereof) or adjusting the brightness (or resolution) of a display) of an external electronic device that communicates with the electronic device or applications executed in the external electronic device. The application 2870 may include applications (for example, a health care application of a mobile medical appliance) that are designated according to the attributes of an external electronic device. The application 2870 may include applications received from an external electronic device. At least a portion of the program module 2810 may be implemented (for example, executed) by software, firmware, hardware (for example, the processor 120 in FIG. 1), or a combination of two or more thereof, and may include a module, a program, a routine, an instruction set, or a process for performing one or more functions.

The term "module" as used herein may indicate a unit consisting of hardware, software, or firmware, and may, for example, be used interchangeably with the terms "logic", "logical block", "component", "circuit", and the like. The term "module" may indicate an integrated component, or a minimum unit for performing one or more functions or a part thereof. The term "module" may indicate a device that is mechanically or electronically implemented and may include, for example, an application specific integrated circuit (ASIC), a field-programmable gate array (FPGA), or a programmable-logic device, which is known or may be developed, for performing certain operations. At least some devices (e.g., modules or functions thereof) or methods (e.g., operations) according to various embodiments of the present disclosure may be implemented by an instruction which is stored in a non-transitory computer-readable storage medium (e.g., the memory 130 in FIG. 1) in the form of a program module. The instruction, when executed by a processor (e.g., the processor 120 in FIG. 1), may cause the one or more processors to execute the function corresponding to the instruction. The non-transitory computer-readable storage medium may include a hard disk, a floppy disk, a magnetic medium (e.g., a magnetic tape), an optical media (e.g., a compact disc ROM (CD-ROM), a DVD), a magneto-optical media (e.g., a floptical disk), an internal memory, etc. The instruction may include code generated by a complier or code that can be executed by an interpreter. The operations performed by modules, programming modules, or other elements according to an embodiment of the present disclosure may be performed in a sequential, parallel, repetitive, or heuristic manner, and some of the operations may be performed in different orders or omitted, or other operations may be added.

According to an embodiment of the present disclosure, a non-transitory computer-readable recording medium having programs recorded therein to be executed on a computer is provided. The programs may include executable instructions that, when executed by a processor, cause the processor to display a first UI including at least one item on a display, and when a first pressure signal detected by at least one pressure sensor is received, to display at least a part of a second UI including at least one second item and the first UI on the display.

Various embodiments disclosed herein are provided merely to easily describe technical details of the present disclosure and to facilitate understanding of the present disclosure, but are not intended to limit the present disclosure. Therefore, it is intended that all modifications and changes or modified and changed forms based on the present disclosure fall within the scope of the present disclosure, as defined by the appended claims and their equivalents.

What is claimed is:

1. An electronic device, comprising:
   a housing including a first surface facing a first direction, a second surface facing a direction opposite the first direction, and lateral sides surrounding a space between the first surface and the second surface;
   a touch screen display;
   at least one pressure sensor configured to detect a level of pressure by an external object within a predetermined distance to at least two areas facing each other on the lateral sides;
   a memory; and
   at least one processor electrically connected to the touch screen display, the pressure sensor, and the memory,
   wherein the memory stores instructions which, when executed, cause the at least one processor to:
   control the touch screen display to display a first user interface (UI) related to a first function including at least one first item,
   detect a first pressure signal through the at least one pressure sensor,
   when the detected first pressure signal is greater than or equal to a first preset threshold value, control the touch screen display to display a second UI related to a second function in a first display area where the first UI is not displayed, the second UI including at least one second item,
   control the first UI to fit into a second display area of the touch screen display,
   detect a second pressure signal through the at least one pressure sensor, and
   when the detected second pressure signal is greater than or equal to a second preset threshold value being greater than the first preset threshold value, control the touch screen display to display a third UI related to a third function in the first display area or the second display area,
   wherein the first display area is independent from the second display area.

2. The electronic device of claim 1, wherein the at least one processor is configured to remove the first UI from an area in which the first UI is displayed at least partially based on a state of the electronic device, and control the touch screen display to display the third UI.

3. The electronic device of claim 1, wherein the state is associated with a screen displayed on the touch screen display or an application program executed when the level of the pressure is detected.

4. The electronic device of claim 1, wherein the at least one processor is further configured to control the first UI by resizing, moving, shifting, rearranging, or scrolling at least one first UI or the at least one first item.

5. The electronic device of claim 4, wherein the at least one processor is further configured to control the touch screen display to display the second UI along with at least a part of the controlled first UI before removing the second UI.

6. The electronic device of claim 1, wherein the first UI includes a home screen and the at least one first item including an icon indicating an application program, and the second UI includes a menu, and one or more graphic elements indicating at least one of at least one phone application program, an email application program, a browser application program, a search application program, a voice recognition application program, and a program selected by a user.

7. The electronic device of claim 1, wherein the first UI includes a UI of the at least one application program and the at least one first item related to the at least one application program, and the second UI includes a menu and one or more graphic elements indicating at least one of at least one phone application program, an email application program, a browser application program, a search application program, a voice recognition application program, a program selected by a user, and a function related to an application program.

8. The electronic device of claim 1, wherein the second UI includes at least one piece of text indicating a user's instruction to perform an operation of the electronic device.

9. A method of controlling an electronic device, the method comprising:
controlling a touch screen display of the electronic device to display a first user interface (UI) related to a first function including at least one first item;
detecting a first pressure signal through at least one pressure sensor;
when the detected first pressure signal is greater than or equal to a first preset threshold value, controlling the touch screen display to display a second UI related to a second function in a first display area where the first UI is not displayed, the second UI including at least one second item;
controlling the first UI to fit into a second display area of the touch screen display;
detecting a second pressure signal through the at least one pressure sensor; and
when the detected second pressure signal is greater than or equal to a second preset threshold value being greater than the first preset threshold value, controlling the touch screen display to display a third UI related to a third function in the first display area or the second display area,
wherein the first display area is independent from the second display area.

10. The method of claim 9, further comprising removing the first UI from an area in which the first UI is displayed at least partially based on a state of the electronic device and displaying the third UI.

11. The method of claim 9, wherein the state is associated with a screen displayed on the touch screen display or an application program executed when the level of the pressure is detected.

12. The method of claim 9, further comprising controlling the first UI by resizing, moving, shifting, rearranging, or scrolling at least one of the first UI or the at least one first item.

13. The method of claim 9, further comprising displaying the second UI along with at least a part of the controlled first UI before removing the second UI.

14. The method of claim 9, wherein the first UI includes a home screen and the at least one first item includes an icon indicating an application program, and the second UI includes a menu, and one or more graphic elements indicating at least one of at least one phone application program, an email application program, a browser application program, a search application program, a voice recognition application program, and a program selected by a user.

15. The method of claim 9, wherein the first UI includes a UI of an application program and the at least one first item related to the application program, and the second UI includes a menu and one or more graphic elements indicating at least one of at least one phone application program, an email application program, a browser application program, a search application program, a voice recognition application program, a program selected by a user, and a function related to the application program.

16. The method of claim 9, wherein the second UI includes at least one piece of text indicating a user's instruction to perform an operation of the electronic device.

17. A non-transitory computer-readable recording medium having programs recorded therein to be executed on a computer, the programs including executable instructions which, when executed by a processor, cause the processor to:
control a touch screen display to display a first user interface (UI) related to a first function in a first display area, the first UI including at least one item;
detect a first pressure signal through at least one pressure sensor;
when the detected first pressure signal is greater than or equal to a first preset threshold value, control the touch screen display to display a second UI related to a second function in a first display area where the first UI is not displayed, the second UI including at least one second item;
control the first UI to fit into a second display area of the touch screen display;
detect a second pressure signal through the at least one pressure sensor; and
when the detected second pressure signal is greater than or equal to a second preset threshold value that is greater than the first preset threshold value, control the touch screen display to display a third UI related to a third function in the first display area or the second display area,
wherein the first display area is independent from the second display area.

* * * * *